(12) United States Patent
Gage et al.

(10) Patent No.: US 8,630,966 B2
(45) Date of Patent: Jan. 14, 2014

(54) TEMPORALLY DYNAMIC ARTIFICIAL NEURAL NETWORKS

(75) Inventors: Fred H. Gage, La Jolla, CA (US); James Bradley Aimone, San Diego, CA (US); Janet Wiles, St. Lucia (AU)

(73) Assignee: Salk Institute for Biological Studies, LaJolla, CA (US)

( * ) Notice: Subject to any disclaimer, the term of this patent is extended or adjusted under 35 U.S.C. 154(b) by 1024 days.

(21) Appl. No.: 12/657,748

(22) Filed: Jan. 27, 2010

(65) Prior Publication Data

US 2010/0235310 A1    Sep. 16, 2010

Related U.S. Application Data

(60) Provisional application No. 61/147,645, filed on Jan. 27, 2009.

(51) Int. Cl.
*G06N 3/08*    (2006.01)
(52) U.S. Cl.
CPC ..................................... *G06N 3/082* (2013.01)
USPC .......................................................... 706/25
(58) Field of Classification Search
None
See application file for complete search history.

(56) References Cited

PUBLICATIONS

Butz, Markus et al.; "A theoretical network model to analyse neurogenesis and synaptogenesis in the denate gyrus"; 2006; Elsevier; Neural Networks 19 (2006); pp. 1490-1505.*
Chambers, Andrew et al.; "Simulated Apoptosis/Neurogenesis Regulates Learning and Memory Capabilities of Adaptive Neural Networks"; 2004; Nature Publishing Group; Neuropsychopharmacology (2004) 29; pp. 747-758.*
Egmont-Petersen, M. et al.; "Image processing with neural networks—a review"; 2002; Pergamon; Pattern Recognition 35 (2002) pp. 2279-2301.*
Perotti, Juan I. et al.; "A scale-free neural network for modelling neurogenesis"; 2006; Elsevier; Physica A 371 (2006); pp. 71-75.*

* cited by examiner

*Primary Examiner* — Jeffrey A Gaffin
*Assistant Examiner* — Stanley K Hill
(74) *Attorney, Agent, or Firm* — Baker Botts, L.L.P.

(57) ABSTRACT

An apparatus, article and method containing an artificial neural network that, after training, produces new trainable nodes such that input data representative of a first event and input data representative of a second event both activate a subset of the new trainable nodes. The artificial neural network can generate an output that is influenced by the input data of both events. In various embodiments, the new trainable nodes are sequentially produced and show decreasing trainability over time such that, at a particular point in time, newer produced nodes are more trainable than earlier produced nodes. The artificial neural network can be included in various embodiments of methods, apparatus and articles for use in predicting or profiling events.

22 Claims, 24 Drawing Sheets

TEMPORALLY DYNAMIC ARTIFICIAL NEURAL NETWORKS

CROSS-REFERENCE TO RELATED APPLICATIONS

This application claims the benefit of Provisional Patent Application No. 61/147,645, filed Jan. 27, 2009, which is incorporated by reference herein.

STATEMENT REGARDING FEDERALLY SPONSORED RESEARCH OR DEVELOPMENT

This invention was made with Government support from NSF Temporal Dynamics of Learning Center, and under Grant No. NS-050217 from the National Institutes of Health. The Government has certain rights in this invention.

BACKGROUND

1. Field of the Invention

The invention relates to artificial neural networks, and apparatus, articles and methods involving artificial neural networks.

2. Related Art

The dentate gyrus (DG) is one of two brain regions with substantial neurogenesis throughout the lifetime of mammals (Altman and Das, 1965; Eriksson et al., 1998). In rats, thousands of new granule cells (GC) are born into the existing circuitry every day (Cameron and McKay, 2001), though only a fraction of these cells survive to become fully functional neurons (Kempermann et al., 2003). Each newborn neuron undergoes a maturation process lasting several months, developing electrical properties that are highly similar to developmentally born GC and forming synaptic contacts with the same afferent and efferent neurons (Esposito et al., 2005; van Praag et al., 2002; Zhao et al., 2006). While these adult-born neurons ultimately appear identical to those born in utero and post-natally, the maturation process progresses through states that make immature neurons distinct from mature GC. The integration of new neurons into the existing circuitry involves complex mechanisms for synaptogenesis (Toni et al., 2008; Toni et al., 2007) and is accompanied by distinct physiological properties, including lower threshold and higher amplitude long-term potentiation (LTP) (Ge et al., 2007; Schmidt-Hieber et al., 2004) and potentially greater excitability (Esposito et al., 2005). Furthermore, there is a pronounced relationship between behavior and neurogenesis. Physical activity, environmental enrichment, and learning increase proliferation and survival of new neurons (Gould et al., 1999; Kempermann et al., 1997; van Praag et al., 1999) whereas age and stress adversely affect the neurogenesis process (Gould et al., 1991; Kuhn et al., 1996). Anti-depressants have been shown to stimulate proliferation and require neurogenesis for their function (Sahay and Hen, 2007). The regulation of survival appears to be particularly dependent on activity, as new neurons pass through a critical period for survival that requires NMDA activation and that benefits strongly from environmental enrichment (Tashiro et al., 2007; Tashiro et al., 2006).

Despite this increasing understanding of how new neurons integrate into the functional DG network, it is still unclear what the function of this process is. Computational studies have demonstrated how neurogenesis may affect memory formation (Aimone and Wiskott, 2008; Becker, 2005; Chambers et al., 2004; Deisseroth et al., 2004; Wiskott et al., 2006). While the functional implementation of neurogenesis differs greatly between models, ultimately most of these computational results suggest that, without this addition of new neurons, new information might be encoded in a manner that disrupts previous memories. Conversely, numerous behavioral studies (using a range of knockdown techniques) investigating the role of new neurons on several different hippocampal memory tasks have reported mixed results (Leuner et al., 2006). For example, at least three separate studies have demonstrated that rodents with reduced neurogenesis showed impaired performance on the Morris water maze (Dupret et al., 2008; Snyder et al., 2005; Zhang et al., 2008), but no differences in water maze performance were seen in several other studies using different (and in one case the same) knockdown techniques (Saxe et al., 2006; Shors et al., 2002).

The difficulty in observing a strong knockdown phenotype on classic hippocampal memory tasks, combined with the observation that the DG may only be required for certain hippocampus-dependent behaviors (McHugh et al., 2007; Nakashiba et al., 2008), suggests that neurogenesis may not be critical to many of the functions that the hippocampus has classically been assigned. Rather than suggesting that neurogenesis has no cognitive relevance, it is important to consider an alternative: that new neurons provide functions that have not previously been described for the hippocampus. For example, in a recent communication, the inventors described a hypothesis for how immature neurons may alter the DG's function of reducing similarity between information sent to the hippocampus (i.e., pattern separation) by being more active than fully mature GC. Such increased participation over transient periods could be the source of the temporal associations seen in long-term memory (Aimone et al., 2006).

SUMMARY

To address questions about neurogenesis function, a computational model of the DG system is developed that incorporates many of the aforementioned features of the maturation process. The analysis of the model is principally focused on the pattern separation function of the DG, which has been predicted theoretically (McNaughton and Morris, 1987; O'Reilly and McClelland, 1994; Treves and Rolls, 1992) and examined using behavioral and physiological approaches (Bakker et al., 2008; Jung and McNaughton, 1993; Kesner et al., 2004; Leutgeb et al., 2007; McHugh et al., 2007). Because most theories about DG function pre-dated the wide acceptance of adult neurogenesis, they do not account for the role of continuous GC addition to the network. Therefore, a theoretical basis for how neurogenesis may affect this pattern separation function is also developed.

In one aspect, an artificial neural network is provided that, after training, produces new trainable nodes such that input data representative of a first event and input data representative of a second event both activate a subset of the new trainable nodes. In various embodiments, the trainability of the new trainable node decreases over time. Due to this decreasing trainability, the artificial neural network can sequentially produce new trainable nodes such that, at a particular point in time, newer produced nodes are more trainable than earlier produced nodes. The artificial neural network can generate an output that is influenced by the input data of both the first and second events. The artificial neural network can be included in various methods, apparatus, and articles for use in predicting or profiling events.

In another aspect, a method of predicting a future event is provided. The method includes providing a trained artificial neural network that produces new trainable nodes such that input data representative of a first event and input data representative of a second event both activate a subset of the new trainable nodes. The method also includes generating from the artificial neural network an output that is influenced by the input data of both events; and predicting a future event based on the output of the artificial neural network.

In a further aspect, a method of profiling a user-defined event is provided. The method includes providing a trained artificial neural network that produces new trainable nodes such that input data representative of a first event and input data representative of a second event both activate a subset of the new trainable nodes. The method also includes generating from the artificial neural network an output that is influenced by the input data of both events; and profiling a user-defined event based on the output of the artificial neural network.

For some embodiments of either method, the input data representative of a first event and the input data representative of a second event are each representative of a person or a physical object.

In another aspect, a computer system for predicting a future event is provided. The system includes: system memory; a trained artificial neural network stored on the system memory and configured to produce new trainable nodes such that input data representative of a first event and input data representative of a second event both activate a subset of the new trainable nodes, and wherein an output of the artificial neural network is influenced by the input data of both events; and one or more processors configured to implement the trained artificial neural network. The computer system can predict a future event based on outputs of the artificial neural network.

Also provided is a computer system for profiling an event. The system includes: system memory; a trained artificial neural network stored on the system memory and configured to produce new trainable nodes such that input data representative of a first event and input data representative of a second event both activate a subset of the new trainable nodes, and wherein an output of the artificial neural network is influenced by the input data of both events; and one or more processors configured to implement the trained artificial neural network. The computer system can profile a user-defined event based on outputs of the artificial neural network.

In a further aspect, a computer-readable storage medium with computer executable instructions stored thereon is provided, the stored instructions for performing a method of predicting a future event. The method includes: providing a trained artificial neural network that produces new trainable nodes such that input data representative of a first event and input data representative of a second event both activate a subset of the new trainable nodes; generating from the artificial neural network an output that is influenced by the input data of both events; and predicting a future event based on the output of the artificial neural network.

Also provided is a computer-readable storage medium with computer executable instructions stored thereon, the instructions for performing a method of profiling a user-defined event. The method includes: providing a trained artificial neural network that produces new trainable nodes such that input data representative of a first event and input data representative of a second event both activate a subset of the new trainable nodes; generating from the artificial neural network an output that is influenced by the input data of both events; and profiling a user-defined event based on the output of the artificial neural network.

In various embodiments of the methods, the computer systems and the computer-readable storage media, the future event or the user-defined event relates to information processing, or to an activity having observable dynamics over long time scales. In the various embodiments, a future event or user-defined event can relate to: a) demand for or usage of area codes, zip codes, telephones, cell phones, internet services, power infrastructure, or traffic patterns and flow; b) dynamics of financial systems, stock markets, commodities markets, or options markets; c) profiling systems for use in homeland security, advertising, or medical records applications; d) data compression or encryption; e) sports forecasting; f) weather forecasting; g) genomic analysis; h) brain networks or brain network modeling; i) robotics; or j) military applications.

Various embodiments of the methods, the computer systems and the computer-readable storage media can include each of the following features or any combination of the following features: new trainable nodes are continually produced; the trainable nodes are trainable for a predetermined time period; after being produced, new trainable nodes show decreasing trainability over time; the new trainable nodes are sequentially produced such that, at a particular point in time, newer produced nodes are more trainable than earlier produced nodes.

In some embodiments of the methods, the computer systems and the computer-readable storage media, a trainable artificial neural network is provided instead of a trained network. When subsequently trained, the artificial neural network then produces new trainable nodes such that input data representative of a first event and input data representative of a second event both activate a subset of the new trainable nodes.

In another aspect, a method of predicting the function of a developing neural cell is provided. The method includes providing a trained artificial neural network that produces new trainable nodes such that input data representative of a first event and input data representative of a second event both activate a subset of the new trainable nodes, wherein one or more parameters of the artificial neural network correspond to neuronal biological properties. The method also includes determining a response of the new trainable nodes to data inputted to the artificial neural network and representing distinct events; and predicting developing neural cell function from the response of the new trainable nodes. Various embodiments can include each of the following features, or any combination of the following features: the developing neural cell is an adult neural cell; the trainable nodes are continually produced; the trainable nodes are trainable for a predetermined time period; after being produced, new trainable nodes show decreasing trainability over time; the new trainable nodes are sequentially produced such that, at a particular point in time, newer produced nodes are more trainable than earlier produced nodes.

In another aspect, a method of adapting a trained artificial neural network to past inputs is provided. The method includes: providing a trained artificial neural network that produces new trainable nodes such that input data representative of a first event and input data representative of a second event both activate a subset of the new trainable nodes; and generating from the artificial neural network an output that is influenced by the input data of both events. In some embodiments, the providing step is repeated multiple times, each time with input data of different events, and the output is further influenced by the input data of different events. In addition, various embodiments can include each of the following features or any combination of the following features: the trainable nodes are continually produced; the trainable nodes are trainable for a predetermined time period; after being produced, new trainable nodes show decreasing trainability over time; the new trainable nodes are sequentially produced such that, at a particular point in time, newer produced nodes are more trainable than earlier produced nodes.

BRIEF DESCRIPTION OF THE DRAWINGS

For a more complete understanding of the present invention, reference is now made to the following descriptions taken in conjunction with the accompanying drawings.

FIG. 5A shows the spatial response of IEC neurons to difference environments, where each column is a separate neuron and the spatial response was measured in the equivalent of a 1 m×1 m square. FIG. 5B shows spatial "grid cell" response of mEC neurons, where the size of the grid is constant between environments, but the rotation and offset changes. FIG. 5C shows the spatial response of a set of GC neurons.

FIG. 6A shows the fraction of new neurons surviving to different ages. Most neuron death occurs in the first two to three weeks. FIG. 6B shows how neuron activity is calculated in the model using a digitized firing rate model. The voltage (lower graph) is calculated for each 25 ms time step. If the voltage surpasses an activation threshold, the firing rate of the neuron is calculated which may lead to a spike at that time. FIG. 6C provides a timeline of afferent synapse formation onto immature granule cells. FIG. 6D provides a timeline of synaptic competition in the model. New neurons initially have a higher percentage of "competitive" synapses, though many of these competitions are completed by the time the neuron is mature. FIG. 6E shows how learning is computed in the model. For each synapse, the spiking of the pre-synaptic neuron is filtered with a STDP curve and compared to the spike-train of the post-synaptic neuron. The temporal covariance of the pre- and post-synaptic neurons is used to determine the amount the synapse learns.

FIG. 9A shows the pattern separation in the NG networks. The full population of GC shows the pattern integration effect at low levels of input similarity (top curve, not including diagonal line), whereas the mature neurons (>6 weeks of age) (bottom curve) remain very effective at pattern separation. FIG. 9B shows that the degree of pattern integration depends on the number of immature neurons that are present in network. The y-axis shows the ratio of GC output similarity to the No NG network for different levels of input similarity (EC-20% top curve; EC-50% middle curve; EC-80% bottom curve).

FIG. 10A shows that the time elapsed between two events as well as the input similarity of the two events both affect the similarity of their encoding by the GC layer. FIG. 10B shows that time between events affects pattern separation in NG networks regardless of whether the inputs vary contextually (IEC inputs) or spatially (mEC inputs). FIG. 10C shows that time between events does not affect pattern separation in No NG networks regardless of whether inputs vary in mEC or IEC.

FIGS. 11A-B show the average firing rate of GCs born at different times in response to the four FEs and the NE in the NG network on day 160 (A) and day 200 (B). The asterisk indicates the group of highly active neurons that responded indiscriminately to all environments. FIGS. 11C-D show the average firing rate of GCs born at different times in response to the four FEs and the NE in the No NG network at day 160 (C) and day 200 (0). The No NG network lacks GCs born after day 120 because neurogenesis was stopped at that time.

FIG. 12A shows pattern separation in aging networks with decreasing neurogenesis (day 120—red; day 520—green). FIG. 12B shows pattern separation in aging networks with constant neurogenesis (day 120—bottom curve; day 520 middle curve, not including diagonal line). FIG. 12C shows the effect of time on pattern integration for aging networks with constant neurogenesis (Day 120—solid line; Day 520—dashed line). FIG. 12D shows pattern separation in stressed networks before (day 120—middle curve), during (day 180—bottom curve), and after (day 280—top curve) stress (diagonal line not included). FIG. 12E shows pattern separation in non-stressed networks at same times (Day 120—bottom curve; day 180—middle curve; day 280—green; diagonal line not included). FIG. 12F shows the effect of time on pattern integration for aging networks with constant neurogenesis (Day 120—solid line; Day 180—dashed line; Day 280—dotted line).

FIG. 13A shows aging of GCs in aged network with constant neurogenesis to familiar environments (FEs) after full growth (gray: >2 Hz; green: '4 Hz; blue: >6 Hz; firing 2 Hz or below not shown). The sizes of dedicated GC populations do not decrease in size with constant neurogenesis. FIG. 13B provides a control for stress network, aged through 280 days without any reduction neurogenesis.

FIG. 14A is a simplified block diagram of network architecture. FIG. 14B is a sketch of newborn granule cell (GC) maturation process implemented in model. FIG. 14C shows growth of the GC layer and cell death. FIG. 14D is a timeline of model growth initialization and growth. FIG. 14 E shows a sample input neuron activity in different environments (Env). Medial entorhinal cortex (mEC) neurons (top) have spatial response, lateral EC (lEC) neurons (bottom) fire at equal rates at all spatial locations. FIG. 14 F is an illustration of how the network is trained and tested. During training (top), model "explores" random paths within an environment. During testing (bottom), network activity is measured in a series of spatial locations that tile the environment.

FIG. 15A is a schematic showing pattern separation experiment. Once grown for 160 days, NG and No NG networks were tested at different locations and environments, each providing a different entorhinal cortex (EC) input to the model. FIG. 15B show the effect of EC similarity (x-axis) on the similarity between DG outputs (y-axis). In networks with neurogenesis (NG, top curve, not including diagonal line), very low input similarity results in relatively higher DG similarity, an effect referred to as pattern integration. Pattern integration does not occur in non-neurogenic networks (No NG, bottom curve). Similarity is measured by the normalized dot product (NDP). The difference between NG and No NG networks was significant (p<0.01). FIG. 15C shows that the decrease in pattern separation with neurogenesis occurs with both spatial (medial EC) and contextual (lateral EC) inputs. FIG. 15 D is a cartoon schematic of pattern integration effect. Two events encoded by similar EC populations activate distinct mature DG neurons, yet activate the same immature neurons.

FIG. 16A is a schematic showing the pattern separation experiment extended over time. The model continued to grow with maturation, neurogenesis and cell death between testing sessions, at which time the response of the model was measured at different environments and spatial locations. FIG. 16B shows the effect of time between events on pattern separation of inputs that are 80% (top), 50% (middle), and 10% (bottom) similar. Note how DG similarities between events separated in time are lower than those tested on the same day. Both the decrease in similarity over time and the interaction between time and NG/No NG groups were significant for each of the input similarity groups (p<0.01). FIG. 16C is a cartoon schematic of temporal separation. Two similar events, when separated by time, will activate distinct mature DG neurons, but also a different population of immature neurons, increasing the separation of the two events.

FIG. 17A is a sample response of a NG network's granule cell (GC) population upon presentation to 400 spatial locations within each familiar environment (FE) and one novel environment (NE) on Day 160 (gray: >2 Hz; green: >4 Hz; blue: >6 Hz; firing 2 Hz or below not shown). Neurons are sorted on the x-axis by age—oldest on the left, youngest on the right. Neurons of similar ages respond to the same environments. FIG. 17B shows the response of the same NG network to the same environments on Day 200. Note the increase of the preferring group to Env 4 and the development of a preferring group to Env 5. The young population of GC that respond to all inputs are labeled with an asterisk ('*') in (A) and (B). Figures C-D show the response of a sample No NG network to the four FEs and one NE on Day 160 (C) and Day 200 (D). Note the failure of the No NG to develop a population of neurons that preferred Env 5. FIG. 17E is a cartoon schematic of DG specialization. Adult-born neurons are involved in the encoding of events during their maturation. Those same adult-born neurons, once mature, are utilized when that event is remembered or experienced again.

FIG. 18A shows a time-course of neurogenesis in aging study. After day 120, networks were grown for 400 days with either decreasing neurogenesis (curved line) or constant neurogenesis (straight line). FIG. 18B shows pattern integration in aging networks, measured by ability of network to separate already dissimilar inputs (input similarity of 10%; p<0.01). FIG. 18C shows the temporal dynamics of pattern integration (input similarity of 10%) in young (solid line) and old (dashed line) networks. Pattern integration depends on time in young networks, but time between events has limited effect on old networks. FIG. 18D shows the response of aged network to familiar environments (FEs) after full growth (gray: >2 Hz; green: >4 Hz; blue: >6 Hz; firing 2 Hz or below not shown). FIG. 18E shows a time-course of neurogenesis in stress study. After day 120, networks had 60 days of decreased neurogenesis followed by full recovery (bottom curve), or no change in neurogenesis (top line). FIG. 18F shows pattern integration in stressed networks, measured by ability of network to separate already dissimilar inputs (input similarity of 10%; p<0.01). FIG. 18G shows temporal dynamics of pattern integration (input similarity of 10%) before (solid line), during (dashed line), and after (dotted line) stressful experience. FIG. 18H shows the response of stressed network to familiar environments (FEs) after full growth.

FIG. 19A shows distinct events (different shapes) occurring at different times (labeled Time 1, Time 2, and Time 3). The events are colored by the time that they are presented. The different events that are experienced will tune the maturing neurons to eventually fire specifically to those events. FIG. 19B shows that, while immature, the new neurons associate events that occur around the same time (pattern integration). Events encoded at distinct times (Time 1 and Time 2) activate different neurons (temporal separation). FIG. 19C shows that the young neurons that matured at time 1 (colored red) will later specify new dimensions specifically tuned to the same events they experienced when young. If the events that occurred during their maturation are re-experienced, the red neurons will be utilized to increase the dimensionality of the memory that is formed.

DETAILED DESCRIPTION

Figure 1:
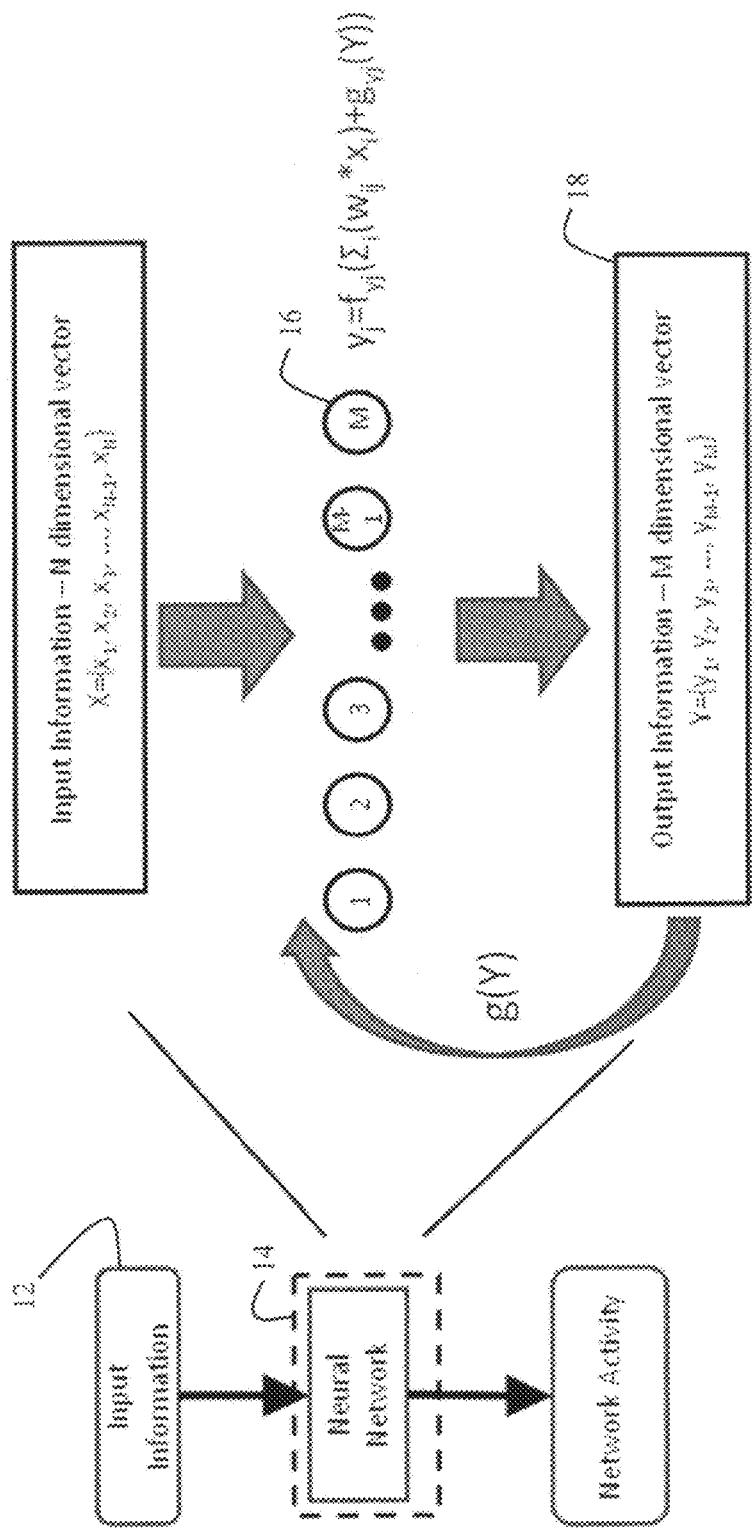
FIG. 1 is flow chart showing basic processing of an artificial neural network.

Embodiments of the present invention provide a trained artificial neural network in which new trainable nodes are produced. Referring to FIG. 1, input information 12 can be any high dimensional (N-dimensions) signal. For example, the input can be derived from multiple sensors which detect different events at a given time. Within the artificial neural network 14, individual nodes 16 (or neurons) transform input information. Output activity is an M-dimensional signal 18 that represents a projection of the N-dimensional input. The artificial neural network is a multiple layer network consisting of a large primary layer and several feedback layers. In essence, each node is an independent function whose input is a weighted sum of the input information and other nodes, and the output is a nonlinear transformation of the summed input.

Figure 2:
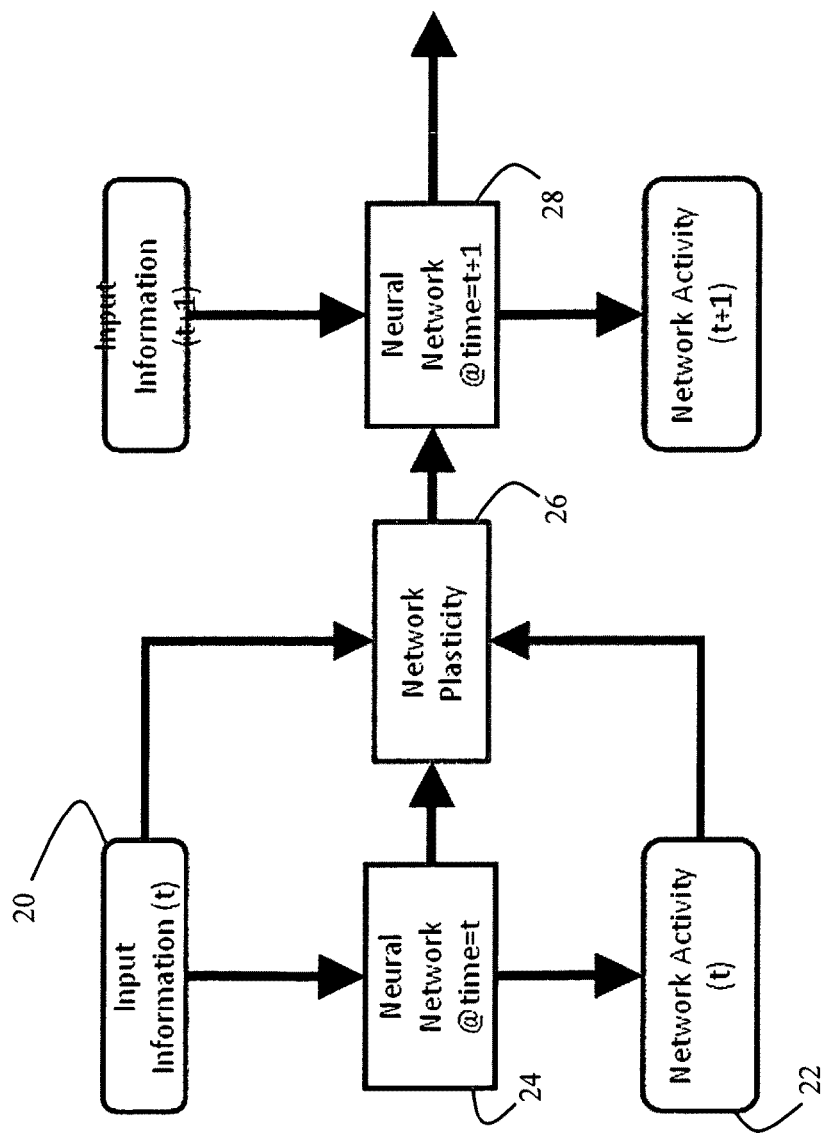
FIG. 2 is a schematic drawing showing changes in network architecture over time.
Figure 3:
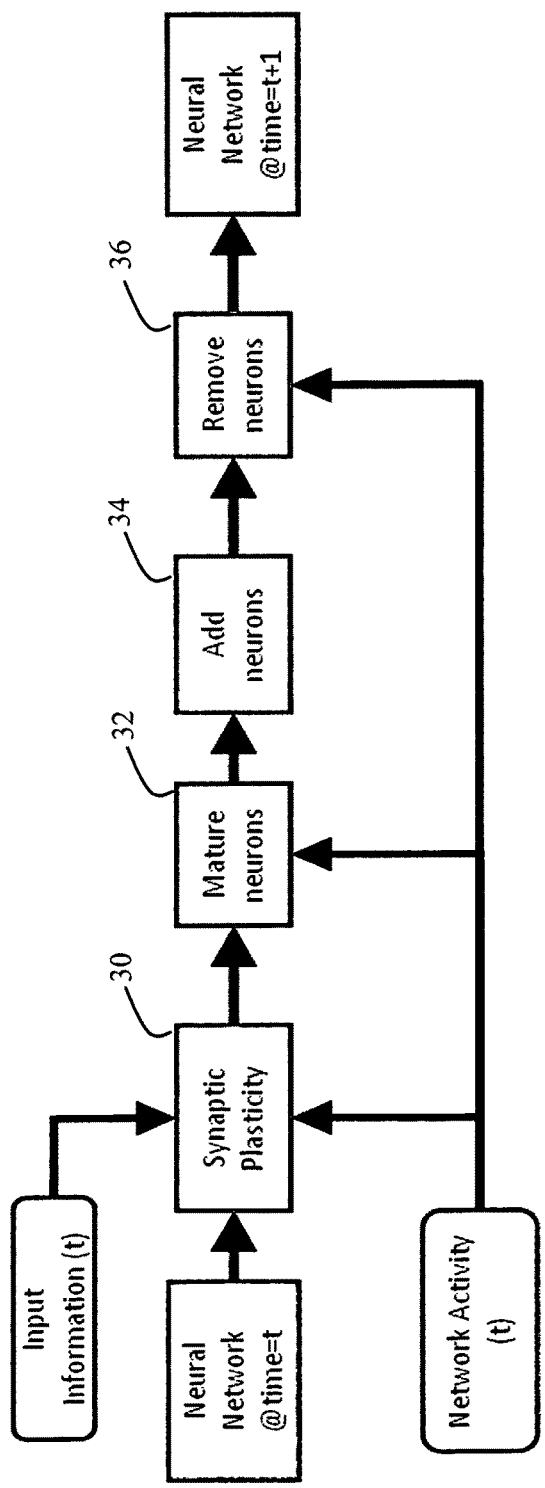
FIG. 3 is a schematic drawing showing network plasticity functions.

In various embodiments, the network architecture of the artificial neural network changes over time. As shown in FIG. 2, input information 20, network activity 22, and outputs of the artificial neural network 24 at time=t can affect network plasticity 26 such that the artificial neural network 28 at time=t+1 is structurally different from the artificial neural network at the previous time. Referring to FIG. 3, network plasticity can be based on the processes of synaptic plasticity 30, node maturation 32, node addition 34, or node removal 36, or any combination thereof. These processes can be further broken down into sub-processes. The term "plasticity" refers to the ability of the network, node or synapse to change behavior or functioning based on exposure to events.

Formally, synaptic plasticity can be represented by a change in the weight (w) of a synaptic connection, maturation of a node can be represented by a change in the information transformation function of the node, and nodes added or removed from the network can be represented by a change in the output M-dimensional vector. In embodiments of the invention, each of the following or any combination of the following can occur: synapses in the network can experience learning that correlates inputs and outputs; immature nodes in the network can mature over time based on their activity; new nodes can be added or removed from the network.

According to various embodiments, a node of the artificial neural network is a function that acts on current inputs, and is defined by past inputs (a result of the network plasticity). A new node added to the network will be a function only of inputs presented after the node was "born" or produced.

Also, in various embodiments, plasticity is limited to new nodes. Once a node "matures," it ceases to incorporate information about inputs into its function. Thus, a new node is trainable, but becomes less and less trainable over time. Because different nodes are born and mature at different times, each node in effect represents a distinct temporal function of past inputs.

In embodiments of the invention, a collection of nodes (the architecture of the network) is continually changing based on experience. This can yield a network specialized or customized to its past inputs. As described in the Examples below, embodiments of the artificial neural network can adapt to two events, separated by an interval of time, by having the two events activate the same population of immature nodes. Activation of the same immature nodes allows the artificial neural network to associate the two events, even if the events are separated in time. In contrast, two events separated by a longer time interval activate different populations of immature nodes, and do not lead to an association between the two separated events. Unlike previous artificial neural networks, "old" information can be preserved in embodiments of the present invention since most or all of the learning can be performed by young, immature nodes. This allows the embodiments to adapt to specific environments and to learn new relationships over long time periods.

Various embodiments of the invention may be useful for profiling or predicting a variety of events in a diverse number of fields. For example, embodiments may be used for predicting or profiling events in the field of information processing. Events may be predicted or profiled where any information enters a network with temporal dependencies. Specific non-limiting examples include predicting or profiling an effect of city expansion on one more parameters describing area codes or zip codes, for example, usage, demand for, changes in territory served or covered. Additional non-limiting examples include predicting or profiling demands on, or usage of telephones, cell phones, internet services, power infrastructure, traffic patterns and flow.

Embodiments of the invention may be used to predict or profile events in systems that have substantial dynamics over long time scales. For example, certain embodiments may be used to predict or profile events in various finance systems. i.e., in stock markets, commodities markets, options markets, and the like. Some embodiments may be used for profiling or predicting information in profiling systems, i.e., information stored in network architecture as opposed to explicitly in database. Such methods have application in homeland security, in advertising, in medical records. and the like. Furthermore, some embodiments may be useful in data compression and/or encryption.

Various embodiments may be useful in forecasting, for example in the field of sports and sporting events. Additionally, certain embodiments may be useful in forecasting weather. optionally with spatial encoding. Some embodiments may be useful in the field of biotechnology, for example, for genomics analysis and for profiling brain networks and brain network modeling. Also, embodiments of the invention may be useful in the field of robotics, for example, for a neural-inspired controller used to process new spatial information and associations.

The present invention may be better understood by referring to the accompanying examples, which are intended for illustration purposes only and should not in any sense be construed as limiting the scope of the invention as defined in the claims appended hereto.

Example 1

This prospective example involves targeted advertising. The goal is to develop an artificial intelligence device that captures relevant statistics about customer preferences and needs. For example, the basic data can be a collection of a user's past search history from an Internet search engine or a customer's purchase history from a store's preferred customer card. The input vector is N different categories of search terms or purchase history objects, with T time points to collect the data.

Figure 4:
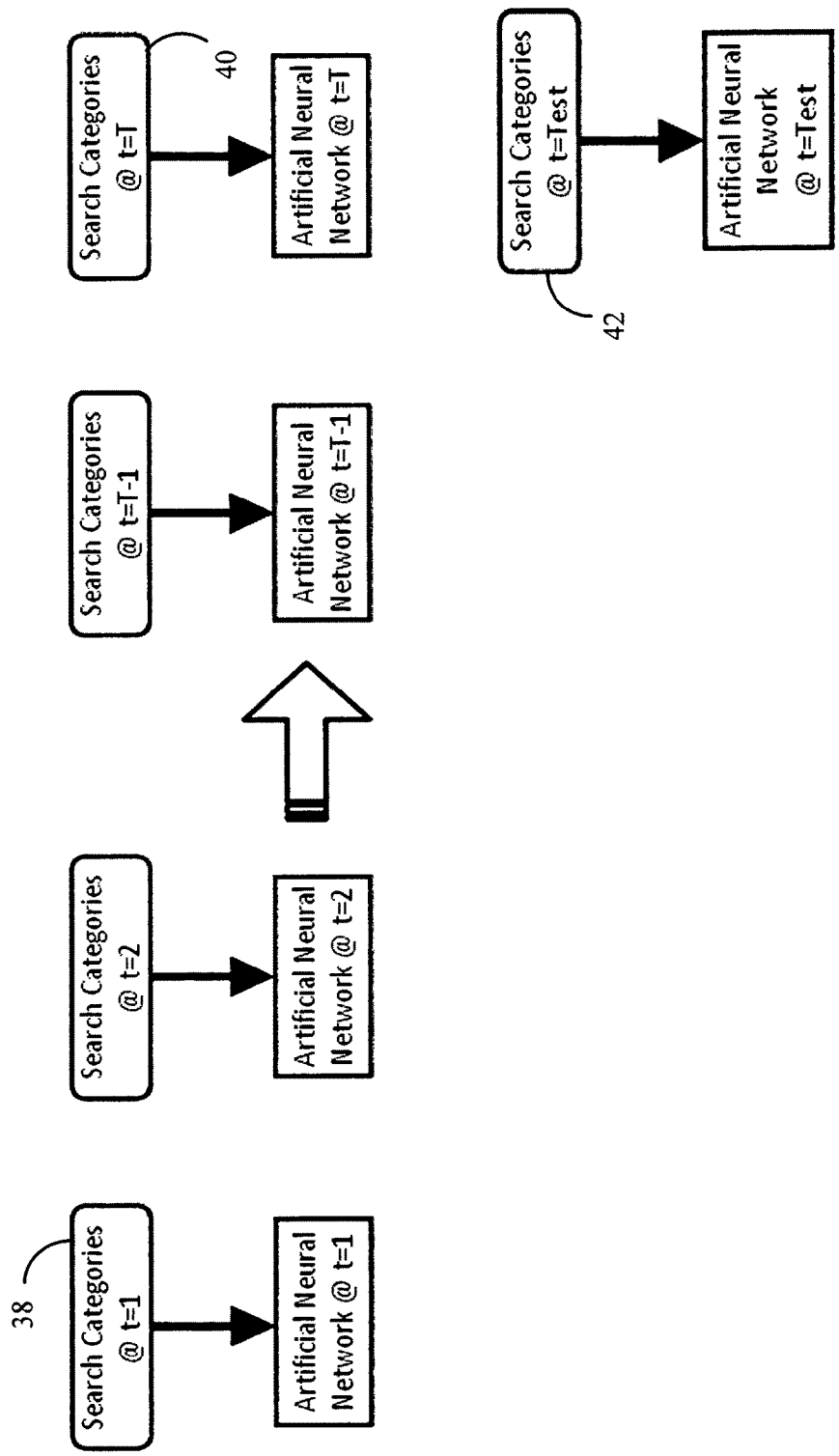
FIG. 4 is a schematic drawing showing network learning over time.

An artificial neural network according to the present invention is trained by entering search categories or purchaser history as input information to the artificial neural network. Search categories or purchaser history from different time points are entered. After training, the network will respond to a new signal by reconstructing other inputs that originally occurred around the same time. Referring to FIG. 4, which concerns an instance of targeted advertising based on search categories, the network is trained by inputting search categories from different time points, from first search categories 38 at t=1 to last search categories 40 at t=T. Upon testing with new search categories 42 at t=Test as input, the response of the network will help reconstruct other inputs occurring around the same time as the new search categories input.

A search engine is equipped with the trained artificial intelligence device. As provided, new nodes are added at a regular rate (1/day) and remain plastic for 14 days. The artificial neural network records searches by a user who periodically searches a range of items. As a result, items searched on the same day will activate, and be learned by, the same population or subset of immature nodes. In contrast, when items are searched many days apart, different items will be learned by different immature nodes. Thus, the temporal relationship between the user's search terms will be captured.

Example 2

In this prospective example, the search engine of Example 1 is employed by a user to search "gifts for son." Two days later, "baseball gloves" is searched by the user. As a result, new nodes will learn to respond to both "son" and "baseball", and this will happen even if the first search did not lead to, or include, baseball-related items. This information from the artificial neural network can be used to specialize the results of the user's subsequent searches for "son" to include results for "baseball" items. In addition, the artificial neural network will generalize away false links. Thus, if "gifts for son" is searched twice a year, around Christmas and a birthday, while "baseball" is searched only in the summer, then "baseball" will eventually be more strongly associated with other summer-related searches.

Example 3

A theoretical basis for how neurogenesis might affect pattern separation function in the dentate gyrus (DG) was developed. Of particular interest is the question of whether a neurogenic DG provides any functional benefit apart from that proposed for the non-neurogenic DG. Any such insights, in turn, could influence the design of new behavioral and physiological tasks that are necessary for fully understanding the role of new neurons in cognition.

In this example, we will describe several distinct theoretical results from our study. First, we examined how neurogenesis affects the similarity between DG outputs when tested with a simple pattern separation experiment. Second, we looked at how the dynamics of the neurogenesis process affect pattern separation over time. Third, we used the model to show how the addition of new neurons shapes the way that the DG will encode different contexts in the future as well as in the present. Finally, we investigated how changes in neurogenesis rate that are observed in clinical conditions may affect these functions.

Expanded Description of Model

We developed a six-layer neural network model to investigate the role of adult neurogenesis in the pattern separation ability of the DG. The following pages describe the underlying architecture and functions of the model.

Section I. General Model Structure and Timeline

Scales of Simulation

Simulations were performed on a 6-layer neural network model of the dentate gyrus (referred to here as "the model" or "the network"). Each layer contained many individually simulated neurons. Two of these layers (lEC and mEC) served as input layers. There were 11 different sets of connections between different layers.

Timeline of Model Simulation

Building the Model

Prior to simulation, the model is initially generated with a population of immature GC neurons and full populations of all other cell layers. All connections that are independent of the GC layer were initialized at onset, while all connections involving the GC layer are formed during simulation. Initialization:

1> Load basic model parameters
2> Initialize all neuron layers (section II)
3> Initialize non-GC connections (section II).

"Growing" the Model

The model was then simulated with a specific input structure for many events to permit the original neurons GC layer to mature and further GC neurons to be born (neurogenesis). This is referred to as "growing" the model. Section VII describes the nature of the input structure A full run through the model during training takes the following form:

1> Load model
2> Determine how inputs will look in experiment (Section VII)
3> Advance through time—each full loop through model considered an "event"
   1. Update all neurons' physiology properties based on age and connectivity (section IV)
   2. Calculate inputs for event (or time-vector of inputs) (section VII)
   3. Compute neuronal activity (see section III)
      1. Neuronal activity was calculated for a series discrete time "steps"
   4. Synaptic Learning (see section V)
   5. Mature immature neurons (section IV)
   6. Add new neurons (section IV)
   7. Cell death (section VI)
4> Export grown model & activity history.

Experiments

The model was tested within different environments at many different locations. During testing, there was no neurogenesis, maturation, learning or cell death (a "static" model) so there is no interaction between different test trials. Section VII describes the nature of the input structure.

A full run through the model during training takes the following form:

1> Load model
2> Determine how inputs will look in experiment (Section VII)
3> Simulate model at different locations
   a. Update all neurons' physiology properties based on age and connectivity (section IV)
   b. Calculate inputs for event at current position (section VII)
   c. Compute neuronal activity (see section III)
      i. Neuronal activity was calculated for a series discrete time "steps"
4> Export grown model & activity history.

Table I shows the General Model Parameters. The parameters are: $Evt_{Day}$ is the number of simulated events in each day; $Evt_{Week}$ is the number of simulated events in each week; $t_{step}$ is the length of each discrete time-interval for which activity is calculated; $t_{event}$ (training) is the length of time that each event is simulated during training; $t_{event}$ (testing) is the number of time that each event is simulated during testing; Range is the septotemporal extent of the model used in these experiments.

TABLE 1

| Parameter | Value |
| --- | --- |
| $Evt_{Day}$ | 10 events |
| $Evt_{Week}$ | 70 events |
| $t_{step}$ | 25 ms |
| $t_{event}$ (training) | 10 s |
| $t_{event}$ (testing) | 500 ms |
| Range | 40% |

Simulation Details

Simulations and all subsequent analysis was performed using MATLAB 7.4 running on a Linux platform and were performed on a cluster of four Dell Precision 490n machines (2×Dual Core Xeon 5130 2 Ghz; 16 GB RAM), for a total of 16 independent processors using the MATLAB Distributed Computing Engine.

The model contains involves considerable usage of random variables. Random numbers were either generated from a uniform distribution, using the rand( ) function in MATLAB, or from a Gaussian distribution, using the randn( ) function in MATLAB, which returns a random value from a normal distribution with mean 0 and standard deviation of 1. To attain a random value, η, from a different Gaussian distribution (mean=μ, standard deviation=σ), we used the following equation $$\eta(\mu,\sigma)=\mu+\sigma \times randn(\ ) \quad (1)$$

The random seed was initialized to a unique value (current date/time) prior to all simulations.

Statistics

For each of the simulation runs described below, eight different model networks were generated and simulated independently. While the initialization parameters were the same for each network, the environments used and their growth differed across runs, resulting in considerably different networks at the point at which they were examined.

Figure 9:
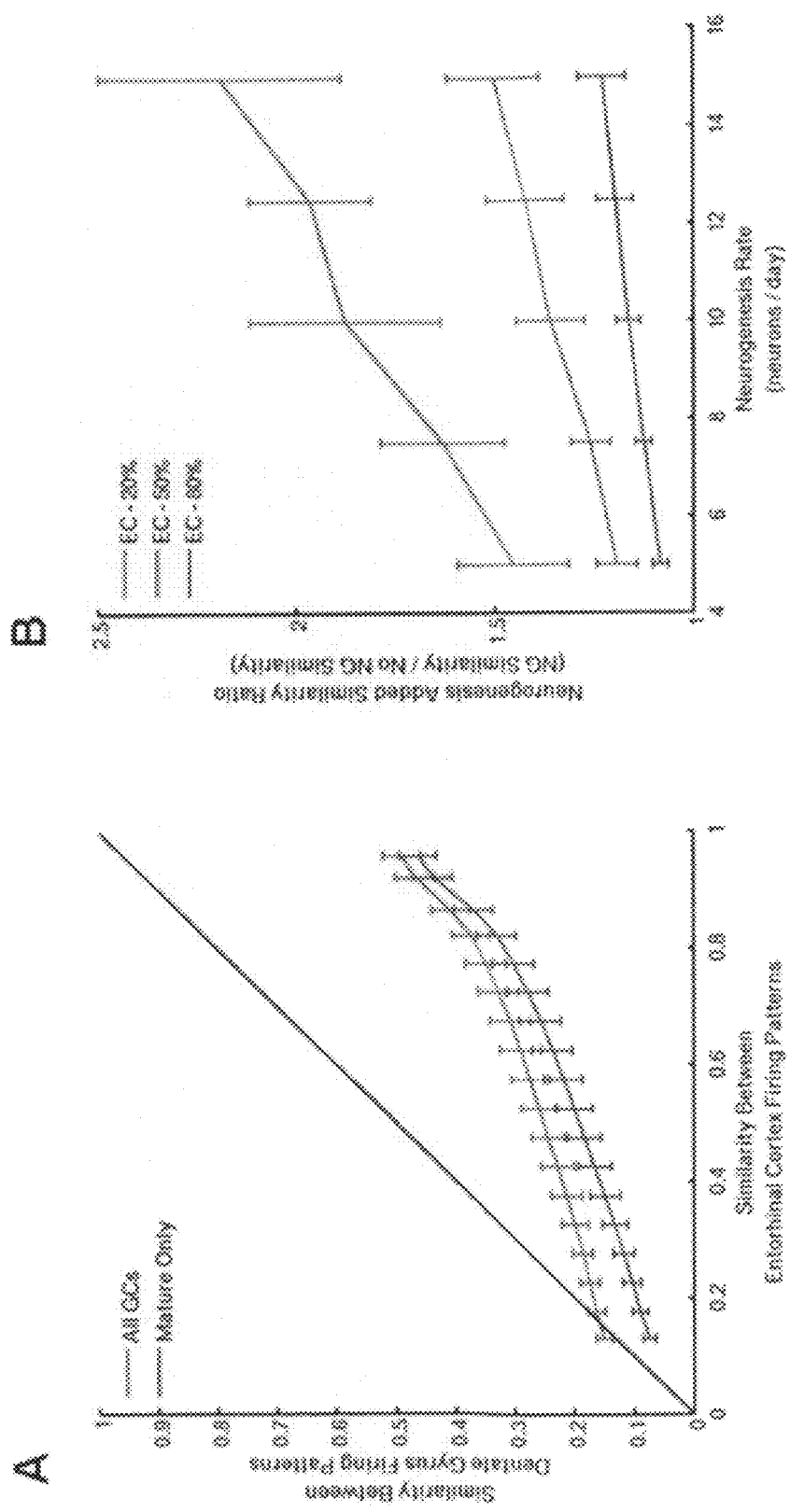
FIG. 9 is a panel illustrating pattern separation.
Figure 12:
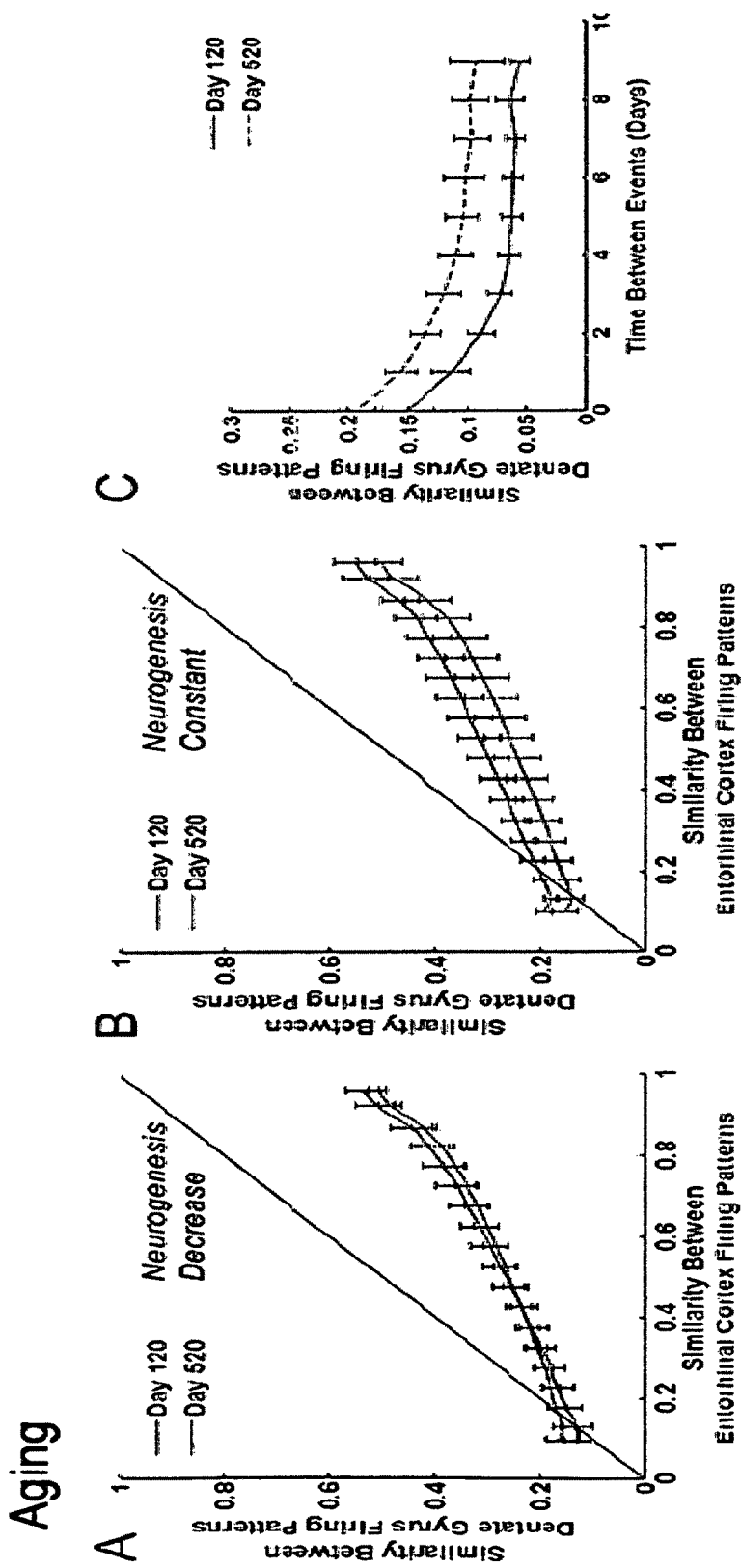
FIG. 12 is a panel showing aging and stress of artificial neural networks.
Figure 12:
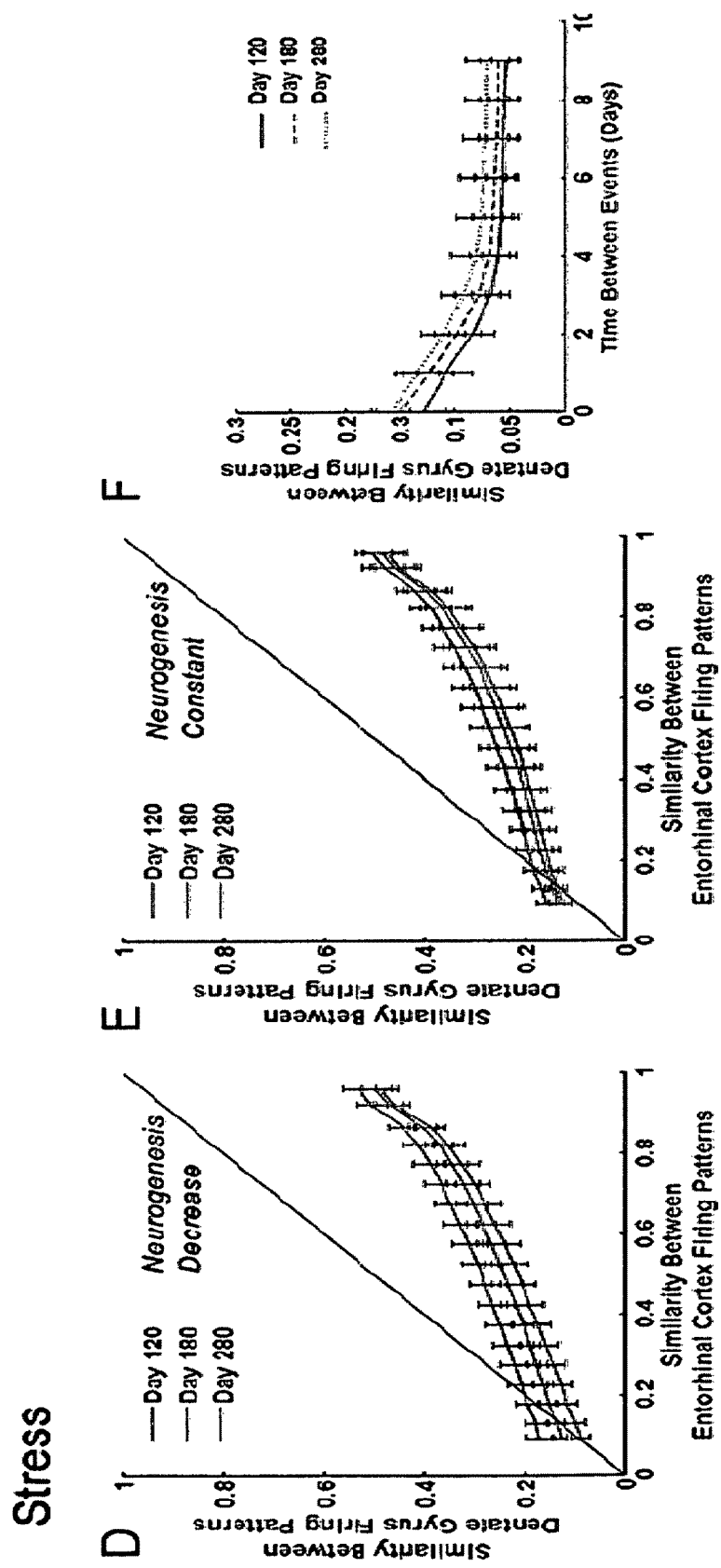

Error bars plotted in the data represent the standard deviation across the different model networks (see FIGS. 9 and 12, for example).

Section II. Overview of Model Structure

Figure 14:
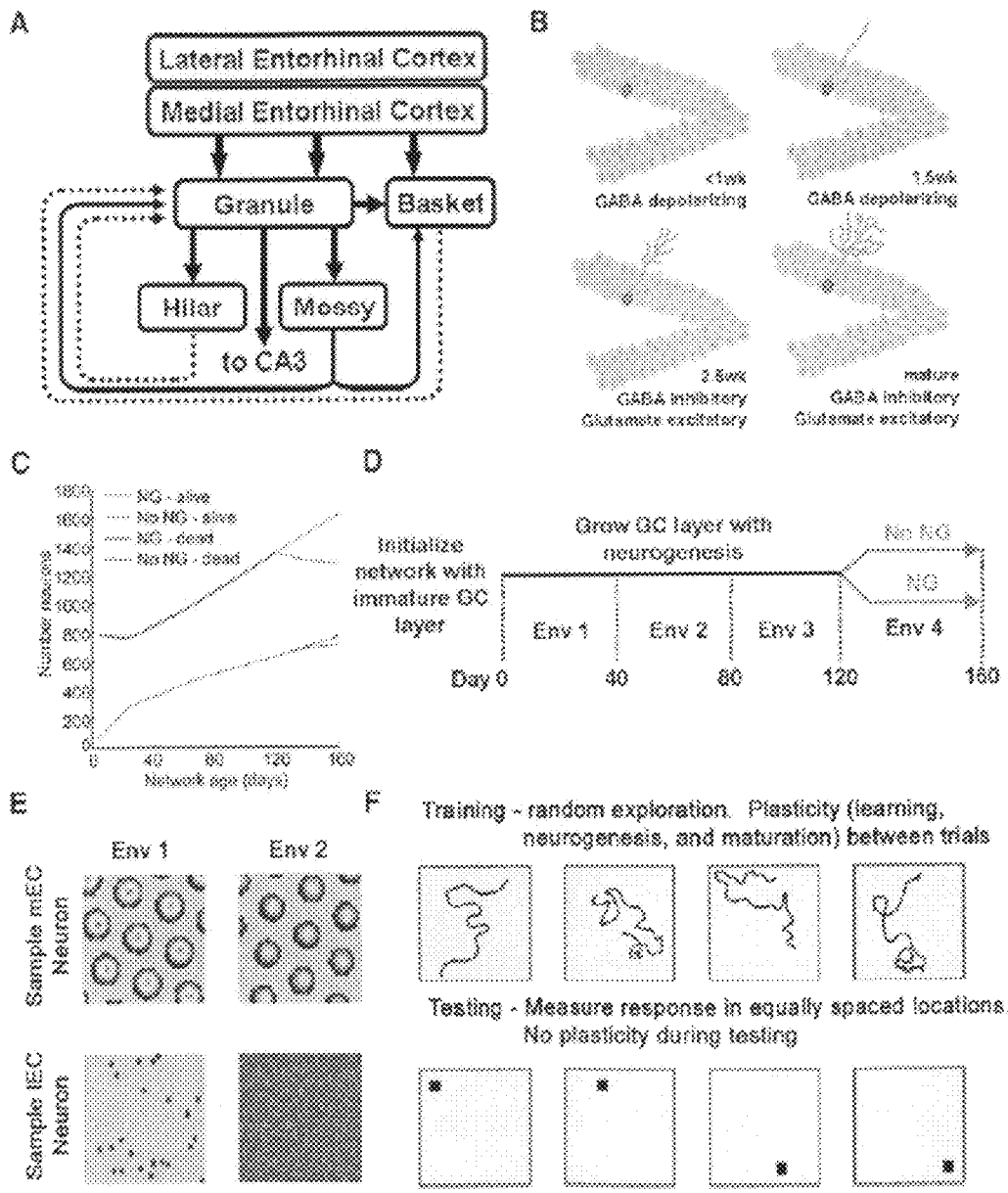
FIG. 14 is an illustration providing an overview of a neural network model.

The computational dentate gyrus was set up as a six layer neural network model in MATLAB, with each layer representing a cell-group within the DG-Hilus circuit or one of its inputs (see FIG. 14A). Each layer consisted of many individual nodes, or neurons, the number of which was scaled down appropriately from actual rat cell counts (see Table II).

Note on neuron and connection parameters: Several groups have previously modeled the dentate gyrus computationally and each of these studies has settled on different levels of criteria in determining which neurons to use and how to interpret the limited anatomy and physiology data. Because it is difficult to ascertain the completeness of much of this data, we tend to err on the side of not include those neurons and connections that we have severely limited knowledge. For instance, there are many interneuron types in the DG that, being relatively rare, have only been characterized by a handful of anatomical studies without any known examination of physiology or function. While these neurons undoubtedly have functional consequences in the network, not enough is known to incorporate into the model. Likewise, there are descriptions of synaptic connectivity that are thus not sufficient to incorporate into the model. For example, sometimes the existence of a connection is anecdotal or qualitative with functional relevance unclear (e.g., mossy cell dendrites entering molecular layer), and other times the extent to which a physiology finding can be generalized is vague (e.g., CA3 input back onto mossy cells). As the functional consequences of this information becomes clear, we will be able to incorporate it into this work.

Neuron Initialization and Parameters:

Each neuron in the model was defined by a set of physical and physiology parameters and has a set of dynamic variables used to calculate activity within events. For non-neurogenic cell layers, many of the physiology parameters were uniform across like neurons, but because neurogenesis introduces heterogeneity, the physiology parameters were tracked separately for each neuron within the GC layer.

Physical Parameters

The following physical parameters were determined for each individual neuron and were stable within events, but may be dynamic over longer periods of time due to maturation:

$\chi_x$ is the relative dorsal-ventral axis position ($0 \leq \chi_x \leq 1$);
$\chi_y$ is the relative transverse axis position ($0 \leq \chi_y \leq 1$);
$\chi_y$ is the within layer depth ($0 \leq \chi_z < 1$);
$\delta_x$ is the spatial radius (dorsal-ventral axis) of the dendritic arborization ($0 \leq \delta_x \leq 0.2$);

$\delta_y$ is the spatial radius (transverse axis) of the dendritic arborization ($0 \leq \delta_z \leq 0.2$);
$\delta_z$ is the dendritic length ($0.1 \leq \delta_z \leq 3$).

For non-neurogenic neuron layers, the neurons were uniformly distributed along the dorsal-ventral axis ($\chi_x$), and have randomly distributed in the $\chi_y$ and $\chi_z$ axes. All non-neurogenic neurons have fully developed dendritic arborizations: $\delta=\delta_{MAX}$.

For the neurogenic layer (the GC layer), when the model is initialized a bulk population of immature neurons were provided. As with other cell layers, the neurons were uniformly distributed along the dorsal-ventral axis ($\chi_x$), and have randomly distributed in the $\chi_y$ and $\chi_z$ axes. However, the immature GC neurons have no dendritic arborization: $\delta=\delta_{MIN}$. The maturation process used to grow the dendrites is described below. Subsequent neurons added to the layer were provided with random $\chi_x$ and $\chi_y$ locations, though they were biased to the inner GC layer ($\chi_z<\text{mean}(\chi_z)$) and also have minimum dendrites.

The neurogenic layer also tracks several other physical parameters over time:

Age is the age of the neuron (weeks);
$R_{mem}$ is the membrane resistance (G-Ohms; estimated from number of synapses);
Vol is the approximate volume of the neuron (estimated from size of neuron).

These parameters were not directly used in calculating activity, but were important for calculating maturation-dependent physiology parameters (see below).

TABLE II

| | Neuron Numbers | | | |
|---|---|---|---|---|
| Cell Layer | Cell Number ($N_{layer}$) | Actual Cell Number (approximate) | Neurogenesis rate (cells/day) | Death rate ($k_{death}$) (for inactive neurons only) |
| lEC | 200 | 100,000 | — | — |
| mEC | 200 | 100,000 | — | — |
| BC | 120 | 10,000 | — | — |
| MC | 220 | 30,000 | — | — |
| HI | 220 | 30,000 | — | — |
| GC | 800 (start) ~1600 (test) | 1,000,000 | 10/day (~15%/month) | .0015 (~1.5%/day) |

Physiology Parameters

The following physiology parameters are user-defined values for individual neurons in the model. These parameters were static within an event, but may be dynamic over longer periods of time due to maturation. Their use will be described in subsequent sections:

$V_{Threshold}$ is the voltage (relative to rest) above which the neuron fires;
dF/dV is the change in firing rate for each mV above threshold;
$F_{max}$ is the maximum firing rate for the neuron;
$F_{min}$ is the minimum firing rate for the neuron (neurons that burst);
$E^*_{GABA}$ is a maturation dependent parameter that represent the neuron's relative sensitivity to GABA, relative to glutamate;
$E^*_{Glutamate}$ is the parameter that represent the neuron's relative sensitivity to glutamate and is set to be equal to 1;
τ is the membrane time constant of the neuron;
$Age_{fire}$ is the age at which the immature firing rate is estimated.

For all non-neurogenic cell layers, these neurons were initialized to values in Table II, and they remain constant throughout the study. For the neurogenic cell layer (GC only), most of these parameters were initialized at immature values and slowly approach their mature levels (see section IV)

TABLE III

Neuron Parameters

| Cell Layer | $V_{Threshold}$ (mV) | dF/dV (Hz*/mV) | $F_{max}$ (Hz) | $F_{min}$ (Hz) | $E^*_{GABA}$ | $\tau$ (ms) | $Age_{fire}$ (weeks) |
|---|---|---|---|---|---|---|---|
| lEC | 25 | .008 | 20 | 0 | −1 | 20 | — |
| mEC | 25 | .008 | 20 | 0 | −1 | 20 | — |
| BC | 12 | .043 | 230 | 0 | −1 | 10 | — |
| MC | 20 | .048 | 50 | 0 | −1 | 30 | — |
| HI | 15 | .088 | 69 | 0 | −1 | 30 | — |
| GC - immature | 20 | | 30 | 0 | 2 | ~160 | 4 |
| GC - mature | 35 | .083 | 72 | 20 | −1 | 40 | — |

Clarification Note:
dF/dV is in spikes per time step per mV. Instead of spikes/second, it is in spikes/25 ms.

Activity Variables

The following variables for individual neurons were dynamic within an event and were used to determine the activity of the neurons:

V is the voltage (relative to rest) of neuron i;
f is the firing of neuron in the previous time step;
$P_{Fire}$ is the potential for that neuron to fire in that time step;
κ is a tracking variable that distributes spiking according to the firing rate.

Connection Initialization and Parameters:

Connections in the model were described by a set of static parameters and a set of experience-dependent variables.

General Parameters

First, each synapse type has general parameters describing the structure of the connection within the network. Connections were made using a normal distribution around a target zone. The parameters include:

$\mu_{syn}$ (Target)—The average dorsal-ventral location of the synapse relative to source neuron's soma;
$\sigma_{syn}$ (Range)—The spatial variance of the dorsal-ventral synapse location;
$\rho_{syn,local}$ (Density)—The density of synapses at the center of synapse distribution;
$\rho_{syn,ideal}$ (Ideal Density)—The relative density of synapses in the whole network;
$w_{max}$—The maximum synaptic strength for the connection;
$w_{max,immature}$—The maximum synaptic strength for the connection onto an immature neuron;
$k_{synapse}$—The rate at which synapses mature (independent from neuron maturation rates);
$k_{comp}$ is the rate that synaptic competition winners are determined;
$\delta_{z,syn}$—The size of an immature neuron's dendrite required for that synapse to be formed;
$\delta_{x,max}$ is the spatial width (dorsal-ventral axis) of the dendritic arborization of a fully mature neuron;
$\delta_{y,max}$ is the spatial width (transverse axis) of the dendritic arborization of a fully mature neuron;
$age_{ref}$ is the reference age (weeks) approximating when non-spiny synapses are first present;
$k_{conn}$ is the approximate number of weeks required for connection to fully develop (weeks).

At runtime, the parameters $\mu_{syn}$ and $\sigma_{syn}$ are adjusted for the Range over which the model is simulated. As the model is only simulating a thick slice of the dentate gyrus, rather than the whole structure, the parameters must be rescaled accordingly. The scaling is as follows:

$$\mu_{syn} = \mu_{syn}^0 / \text{Range} \qquad (\text{II. 1})$$

$$\sigma_{syn} = \sigma_{syn}^0 / \text{Range} \qquad (\text{II. 2})$$

Range is a number between 0 and 1, and set to equal 0.4 in these simulations. This serves to make the dendritic arborizations proportionally bigger in the smaller model (e.g., instead of spanning 5% of the DG, a dendritic tree would span 12.5% of the model).

In the case of the long-range MC to GC projection, the scaling of $\mu_{syn}$ and $\sigma_{syn}$ is also constrained by the additional equalities (−0.50≤μsyn≤0.50) and (σsyn≤0.30) to ensure that the source MC neuron targets a region that does not include its own lamina (its upstream granule cells).

Table IV provides connection parameters.

TABLE IV

Connection Parameters (Independent of Model Range)

| Connection | $\mu^0_{syn}$ Target | $\sigma^0_{syn}$ Range | $\rho_{syn,\,local}$ Density | $\rho_{syn,\,ideal}$ | $W_{max}$ (mV) | $W_{max}$-immature | $k_{synapse}$ (%/event) | $k_{comp}$ | $\delta_{2,\,syn}$ | $age_{ref}$ (weeks) | $k_{conn}$ (weeks) |
|---|---|---|---|---|---|---|---|---|---|---|---|
| Granule Cell Afferents | | | | | | | | | | | |
| lEC to GC | 0 | 0.14 | 75% | 0.105 | 1.7 | 1.7 | 0.05 | 0.1 | 3 | 3 | 2.5 |
| mEC to GC | 0 | 0.14 | 75% | 0.105 | 2.2 | 2.2 | 0.05 | 0.1 | 2.5 | 3 | 2.25 |
| MC to GC | +/−0.3 | 0.15 | 50% | 0.15 | 2.8 | 2.8 | 0.05 | 0.1 | 2 | 3 | 4 |
| BC to GC | 0 | 0.2 | 50% | 0.1 | 2.2 | −1.0 | — | — | 0 | 1 | 4 |
| HI to GC | 0 | 0.1 | 100% | 0.1 | 3.0 | −3.0 | — | — | 3 | 2 | 2.5 |
| Basket Cell Afferents | | | | | | | | | | | |
| lEC to BC | 0 | 0.14 | 75% | 0.105 | 2.4 | — | — | — | — | — | — |
| mEC to BC | 0 | 0.14 | 75% | 0.105 | 3.2 | — | — | — | — | — | — |
| MC to BC | +/−0.3 | 0.15 | 50% | 0.15 | 1.7 | — | — | — | — | — | — |
| GC to BC | 0 | 0.05 | 100% | 0.05 | 32.7 | 2.2 | — | — | 1.5 | 2 | 2 |
| Hilar Neuron Afferents | | | | | | | | | | | |
| GC to MC | 0 | 0.05 | 100% | 0.05 | 5.6 | 2.2 | — | — | 1.5 | 2 | 2 |
| GC to HI | 0 | 0.05 | 100% | 0.05 | 5.6 | 2.2 | — | — | 1.5 | 2 | 2 |

Synapse Generation

Synapses were created according to the following equations. Note: because the network is initialized with only immature granule cells, synapses to and from the GC layer were created during the maturation process and not during initialization (see section IV). The following equations describe how synapses were chosen at both times.

For each neuron in the source layer, the number of synapses that the neuron connects to, $N_{synapses}$, is determined by:

$$N_{synapses} = N_{target} \times \rho_{syn,ideal} \quad (II.3)$$

where:
$N_{target}$ is the number of neurons in the target cell layer
$\rho_{syn,ideal}$ is the ideal density of that projection Once the number of synapses required for the source neuron was determined, a set of non-repeating target (or source) neurons were selected by the following equation which was repeated until $_s N_{synapses}$ were found for each neuron $$tar = N_{target} \times \eta(\mu_{syn}, \sigma_{syn}) \quad (II.4)$$

where:
$\eta(\mu_{syn}, \sigma_{syn})$ represents a random number from a Gaussian distribution of standard deviation $\sigma_{syn}$ around the target zone $\mu_{syn}$.

Importantly, only one synapse was permitted between two neurons, if a synapse already existed with the selected neuron equation II.4 was repeated.

Each cell layer was treated as a "circle" in order to eliminate boundary effects in the number of synapses each neuron receives. That is, if a projection field of a neuron extended beyond the edge of the cell layer, the target (or source) neuron was selected from the opposite end of the network, as follows:

$$if(tar > N_{target}) \rightarrow tar = tar - N_{target} \quad (II.5)$$

$$if(tar < 1) \rightarrow tar = N_{target} + tar \quad (II.6)$$

This simplification reduces errors associated with simulating only a "slice" of hippocampus, but precludes the ability to make any conclusions about trans-laminar behavior that may emerge. This approximation will not be needed in larger scale models that extend the full septotemporal length of the hippocampus.

The initial synaptic strength, $w_{i,tar}$, of each synapse from the source neuron i onto its target neuron, tar, was calculated by the following equations:

$$if \begin{cases} spine & w_{i,tar} = 0.1 \leq \eta(0.5, 0.25) \leq 0.9 \\ non\text{-}spine & w_{i,tar} = 1 \end{cases} \quad (II.7)$$

where
spine indicates that the synapse type utilizes dendritic spines (lEC to GC, mEC to GC, MC to GC)
non-spine indicates that the synapses is not spiny
$\eta(0.5, 0.25)$ represents a random number from a Gaussian distribution of standard deviation 0.25 around a mean of 0.5. This value is constrained by an upper limit of 0.9 and a lower limit of 0.1.

Variable Parameters

For spiny synapses (those that are capable of learning), the strength of the synapse, $w_{ij}$, was determined by both a fixed and a variable component that were specific to each synapse and change over time. These parameters were initialized for each synapse between neurons i and j as follows:

$$\tilde{w}_{ij}^{fixed} = 0.5 \times w_{ij} \quad (II.8)$$

$$\tilde{w}_{ij}^{variable} = 0.5 \times w_{ij} \quad (II.9)$$

$$\tilde{w}_{ij}^{lost} = 0.5 \times (1 - w_{ij}) \quad (II.10)$$

$w_{ij}$ is the strength of the connection from neuron i to neuron j
$\tilde{w}_{ij}^{variable}$ is the plastic component of existing synaptic strength
$\tilde{w}_{ij}^{fixed}$ sets the lower limit of strength below which the synapses may not shrink
$\tilde{w}_{ij}^{lost}$ sets the upper limit of strength above which the synapse cannot grow We also ran the network in a local region of the DG, rather than over the full longitudinal axis, in order to better view the orthogonalization by the DG. The pattern separation ability of the DG is thought to be effective even in local areas where most neurons have similar connections, and only the subtle differences lead to activity. To adjust the network for wider/narrower ranges of the hippocampus, the 'range' parameter was scaled accordingly. In addition, connection strengths were modified to account for the different number of resulting synapses (broader network=sparser projections).

Selection of Neuron and Connection Physiology Parameters:

The physiology and cell counts of the modeled neurons in the network are given in Table II, III, and connection parameters are given in Table IV. These physiology properties were estimated from both physiology studies (Soltesz et al., 1995; Lubke et al., 1998; Jinno et al., 2003) and modeling studies (Patton and McNaughton, 1995; Santhakumar et al., 2005). Connectivity was determined by review literature of the dentate gyrus circuit and interneurons (Patton and McNaughton, 1995; Freund and Buzsaki, 1996; Anderson et al., 2007). Finally, synaptic weights were estimated to accurately represent the relative impact of different connections and maintain the network at observed activity levels (Jung and McNaughton, 1993; Leutgeb et al., 2007).

The maturation process of new neurons was also taken from the literature. Generally, the new neurons morphology and physiology was made to closely replicate (Zhao et al., 2006) and (Esposito et al., 2005), respectively.

There are certain caveats to extracting physiology data from the literature. Most physiology studies of dentate gyrus interneurons are from studies using slice recordings from either postnatal or very young adult rats (typically less than 35 days old in the studies cited above). In contrast, studies investigating adult-born neurons use older animals by necessity. Furthermore, there is considerable variation across different studies, and results are not necessarily comparable across different methodologies. Nevertheless, we believe that so long as the relative values of these parameters are consistent with biological system, the specific values of many of these properties are less consequential.

Section III. Computing Activity—Digitized Firing Rate Model

Overview:

We used a model that we refer to as a digitized firing rate model (DFR). In the DFR model, the network was updated at a time scale considerably longer than a normal spiking model, but at shorter intervals than a firing rate model would typically have. We chose to model at this resolution because the physiology of new neurons and many dentate gyms interneurons are not well understood at the high resolution necessary for a conductance based model. However, parameters that would affect firing rate, such as time constants, maximum firing rates, and activation thresholds, are better understood, allowing us to model at a slightly longer time scale.

Basic Function:

The DFR model sums over synaptic inputs over a broad time scale ($t_{step}=25$ ms), calculates the resulting membrane depolarization and estimates a firing rate for that neuron. Then, this firing rate is used to calculate the number of spikes that neuron would have over that 25 ms time. For most neurons in this system, maximum firing rates are sufficiently low as to not result in more than one spike per time step.

Synaptic Inputs:

For each 25 ms time step, the membrane voltage of each neuron ($V_i(t)$), relative to rest, was calculated by the following equation for each neuron i:

$$V_i(t) = e^{-t_{step}/\tau_i} \times V_i(t-1) + \sum_{j=1}^{J} E^*_{Glutamat,e} \times f_j(t-1) \times w_{max} \times w_{ji} + \sum_{k=1}^{K} E^*_{GABA,i} \times f_k(t-1) \times w_{max} \times w_{ki} \quad (III.1)$$

where for each neuron i:
- 'j=1 . . . J' are Glutamatergic neurons;
- 'k=1 . . . K' are GABAergic neurons;
- $\tau_i$ is the membrane time constant of neuron i;
- $E^*_{Glutamate,i}$ and $E^*_{GABA,i}$ are maturation dependent parameters that represent the neuron's sensitivity to glutamate and GABA, respectively;
- $f_j(t-1)/f_k(t-1)$ is the firing of neuron j/k in the previous time step;
- $w_{max}$ is the maximum strength for that synapse type;
- $w_{j,i}(w_{k,i})$ is the relative strength of the connection from neuron j(k) to neuron i.

The first term in equation III.1 is the neuron's settling to its resting potential, and the second and third terms sum over all excitatory (j: 1 to J) and inhibitory (k: 1 to K) neurons that project onto neuron i, weighted by the strength of each synapse ($w_{ij}$ & $w_{ki}$) and the response of neuron i to the neurotransmitter ($E^*_{Glutamate}$ & $E^*_{GABA}$).

Neuronal Activity:

Whether a neuron fires or not (f(t)) was computed by the following equations:

$$\text{if } (V(t) > \Delta V_{threshold}) \rightarrow P_{Fire} = \text{minimum} \begin{pmatrix} F_{Max} \times t_{step}, \\ F_{Min} \times t_{step} + \kappa(t-1) + (V(t) - \Delta V_{threshold}) \times (dF/dV) \end{pmatrix} \quad (III.2)$$

$$\text{if } (V(t) \leq \Delta V_{threshold}) \rightarrow P_{Fire} = \kappa(t-1) \quad (III.3)$$

$$f(t) = \text{round}(P_{Fire}) \quad (III.4)$$

$$\kappa(t) = P_{Fire} - f(t) \quad (III.5)$$

$$\text{if } (V(t) < -10 \text{ mV}) \rightarrow V(t) = -10 \text{ mV} \quad (III.6)$$

$$\text{if } (V(t) > \Delta V_{threshold}) \rightarrow V(t) = \Delta V_{threshold} \quad (III.7)$$

where for each neuron i:
- $P_{Fire}$ is the potential for that neuron to fire in that time step;
- $\Delta V_{Threshold}$ is the voltage (relative to rest) above which the neuron fires;
- $F_{Max}$ is the maximum firing rate for the neuron;
- $F_{Min}$ is the minimum firing rate for the neuron;
- $\kappa$ is a tracking variable that distributes spiking according to the firing rate;
- dF/dV is the change in firing rate for each mV above threshold.

When $P^{Fire}>0.50$, the neuron spikes (f(t)=1; III.4), and the tracking variable $\kappa$ is lowered (III.5), thereby reducing the likelihood of a spike in the next timestep. In the event that $0<P^{Fire}<0.5$, then neuron does not spike (f(t)=0), but the $\kappa$ of the neuron persists until the next time step, making a spike then more probable.

In the model, the K term was randomized within a very narrow range ($\eta(0.025,0.05)$) at the beginning of each event to account for variations in the initial state of the neurons.

Theta:

We assume that the activity in the model is occurring during periods known to exhibit theta rhythm. Theta is believed to be an oscillating inhibitory influence on the network, though the actual mechanism by which it occurs is unclear. We implemented theta by including an 8 Hz oscillating dampening effect on the voltage neurons carry over from one time step to another. This has the effect of gradually "resetting" the network every 125 ms.

$$V_i(t)=V_i(t) \times (1-\text{maximum}(\text{cosine}(\theta_0+(t \times t_{step})/125 \text{ ms}),0)) \quad (III.8)$$

The phase of theta ($\theta_0$) is uniformly random at the beginning of each event.

Section IV. Neurogenesis and Maturation

Overview:

The addition of new neurons to the network is the focus of this study, so we designed this aspect of the model to best reflect what is known about the maturation process.

New neurons were born into the network randomly and in a raw form. Initially, they have no synapses and very unique physiological properties. Over time, the neurons matured by gradually increasing in size, which in turn permitted the gradual addition of new synapses.

Addition of New Neurons.

The model ran at a user-defined neurogenesis rate (New neurons/day). After each activity event, there was a random chance that a new neuron will be added. The new neuron was simply added to the existing layer in a random location, and the sizes of the connection matrices were adjusted accordingly, however with no initial connections. The physiology of the new cells was initialized at levels observed in new neurons (see Example 3, Table III).

General Maturation of Immature Neurons

After each activity event, neurons which are less than 10 weeks of age were considered immature neurons and part of the maturation process. Furthermore, there was an activity dependent aspect to the maturation, as new neurons can only mature if they were effectively being integrated into the network.

During maturation, the following happens to immature neurons:

1. Age of neuron increases—the age of each neuron, Age, is measured in weeks and is updated after each experienced event:

$$\text{Age}_i=\text{Age}_i+1/\text{Evt}_{Week} \quad (IV.1)$$

where i are all neurons that are less than ten weeks old.

2. Neurons grow in size (activity dependent)—the relative size of granule cells was tracked in the model, and used during synapse formation. One parameter tracked how far into the molecular layer the primary dendrite reaches ($\delta_z$), and the other two parameters determined the transverse ($\delta_y$) and longitudinal breadth ($\delta_x$) of the dendritic arborization.

For all neurons i that were depolarized during the previous event, the size of the neuron's apical dendrite grew at a fractional rate:

$$\delta_{z,i} = \delta_{z,i} + 1.5/\text{Evt}_{Week} \quad \text{(IV.2)}$$

The dendrite's arborization (x,y spread) only grew after the apical dendrite reached the molecular layer ($\delta_{z,i} > 2$):

$$\delta_{x,i} = \delta_{x,i} + 0.2/\text{Evt}_{Week} \quad \text{(IV.3)}$$

$$\delta_{y,i} = \delta_{y,i} + 0.2/\text{Evt}_{Week} \quad \text{(IV.4)}$$

(in the model, the full z-extent is arbitrarily 3, and the full x/y radii are 0.2: 20% of the longitudinal axis).

Maturation of Synaptic Connectivity

3. Addition of synapses (size dependent)—Immature neurons became capable of forming synapses at different times in their development. The probability of forming a new synapse was related to both the length ($\delta_z$) and width ($\delta_x$) of the dendritic arborization. The probability that a particular type of synapse will be generated onto or from an immature neuron, i, is given by the following equations:

$$N_{syn,ideal} = \rho_{syn,ideal} \times N_{target/source} \quad \text{(IV.5)}$$

$$\text{if (spine)} \to N^*_{syn,i} = N_{syn,ideal} \times \frac{\delta_{x,i}}{\delta_{x,max}} \quad \text{(IV.6)}$$

$$\text{if (non-spine)} \to N^*_{syn,i} = N_{syn,ideal} \quad \text{(IV.7)}$$

$$\text{if } (\delta_z > \delta_{z,syn}) \to P_{syn} = \frac{(N^*_{syn,i} - N_{syn,i})}{(0.5 \times \text{Evt}_{Week} \times k_{conn})} \quad \text{(IV.8)}$$

where:
- $N_{target/source}$ is the total number of source/target neurons for the connection;
- $\rho_{syn,ideal}$ is the ideal density for that connection;
- spine indicates that the post-synaptic structure of the synapse is a spine; only lEC, mEC and MC inputs onto GC are classified as spiny;
- non-spine indicates that the synapse does not use normal spines; all GC outputs and HI and BC synapses onto GCs are non-spiny;
- $\delta_x$ is the spatial width of the dendritic arborization of neuron i;
- $\delta_{x,max}$ is the spatial width of the dendritic arborization of a fully mature neuron;
- $N_{syn,i}$ is the current number of synapses for the neuron;
- $N^*_{syn,i}$ is the ideal number of synapses for the neuron;
- $N_{syn,ideal}$ is the ideal number of synapses for a fully mature neuron;
- $\delta_z$ is the dendritic length of neuron i;
- $\delta_{z,syn}$ is the minimum dendritic length requirement for each synapses type;
- $k_{conn}$ is the rate of synapse formation;
- $\text{Evt}_{week}$ is the number of simulated events in each week.

For instance basket cells, which target the soma, could synapse early in maturation, whereas EC inputs, which are at the distal ends of dendrites, required the neuron to be fully grown. For spine-based synapses, the extent of the dendritic arborization determines how many synapses are desired. For instance, if a fully mature neuron has 50 synapses, then one with 50% of the "volume" will have a target number of 25 synapses. If the neuron has less than the target number of synapses, it may gain a new synapse, the probability of which scales with the drive. For example, if the neuron has 20 synapses with an ideal of 25, then it will have a strong probability of gaining a new synapse When a new synapse is to be formed, an appropriate neuron in the target/source layer is selected. This selection of the partner neuron is dependent on two factors: the topography of the projection is taken into account (would an axon/dendrite of the partner neuron be nearby the new neuron?) and that there is not already a connection between those two neurons. Once selected, a new synapse is formed between the two neurons and is initialized at a random strength. The equations used were the same as discussed in the connection setup description (Equations II.4-II.10)

4. Addition of Competitive Synapses: For spiny synapses, once a source neuron is selected, there is a possibility that the synapse formed will "compete" with an existing synapse. The probability that this occurs is related to the relative density of the projection and the number of possible competitors. The set of possible competitors for a synapse from projecting neuron j is determined by:

$$S_{PossComp} = \{Syn_j \neq Comp \cup |\chi_{y,j} - \chi_{y,i}| \leq 0.4\} \quad \text{(IV.9)}$$

where:
- $Syn_j$ represents all neurons that receive a synapse from neuron j;
- Comp represents those synapses that are already competing (not allowed for second competition);
- $|\chi_{y,j} - \chi_{y,i}|$ is the transverse distance (within slice) between the possible competitor and the immature neuron i.

Essentially, possible competitors were restricted to those neurons already receiving a non-competitive input from the source neuron, and the immature neuron and possible competitor must be close enough to have overlapping dendritic arborizations.

The goal of IV.9 is to find a set of possible neurons with which a new neuron can try to "compete" synapses from. Equation IV.8 dictates that a new neuron 'i' is to connect to a source neuron 'j'. Possible neurons to compete with must satisfy three criteria: 1) They must receive a synapse from 'j'. $Syn_j$ represents all neurons receiving an input from 'j'. 2) This connection cannot already be competitive. COMP is just a flag that says that the synapse is competitive. 3) The possible competitive neuron and neuron 'i' are within a distance 0.4 along the 'y' dimension (roughly along the transverse axis ('u/v') in the DG)—basically having overlapping dendritic arborizations. That will likely be a smaller list than $Syn_j$ alone, and a random neuron from that list will be picked to have the competitive synapse.

Once the possible list of competitors is chosen, the probability that a competitive synapse is formed, $P_{comp}$, is given by:

$$\rho_{syn} = \frac{N_{Syn,Total}}{N_{Source} \times N_{Target}} \quad \text{(IV.10)}$$

$$\rho_{syn,ratio} = \frac{\rho_{syn}}{\rho_{syn,ideal}} \quad \text{(IV.11)}$$

$$P_{comp} = \frac{N_{PossComp}}{(\rho_{syn,ratio})^2} \quad \text{(IV.12)}$$

where:
- $N_{Syn,Total}$ is the total number of synapses of that connection type;
- $N_{Source}$ is the total number of source neurons for that connection;

$N_{Target}$ is the total number of target neurons for that connection;

$\rho_{syn,ideal}$ is the ideal density for that connection;

$N_{PossComp}$ is the number of neurons in the set available for competition ($S_{PossComp}$);

$P_{comp}$ is then compared to a random number to determine if the new synapse is either competitive with an existing synapse or formed de novo.

$$Syn = \begin{cases} Comp & \text{if } P_{comp} > rand \\ deNovo & \text{if } P_{comp} < rand \end{cases} \quad (IV.13)$$

If the synapses is selected to be competitive, a random neuron from $S_{PossComp}$ is selected to be its competitor.

5. Determining Winner of Competitive Synapses: The ultimate 'winner' of the competition is decided by comparing the relative activities of the two competing neurons, the overall activity level of the cell layer, and the strengths of the synapses. At any given time, only neurons whose activity is below a certain activity threshold are susceptible to losing a connection:

$$f_{thresh} = \mu_f - \sigma_f \quad (IV.14)$$

where:

$f_{thresh}$ is the firing rate below which neurons may lose synapses;

$\mu_f$ is the average firing rate for the cell layer;

$\sigma_f$ is the standard deviation of the cell layer's firing rate.

If one neuron is below threshold, and the other is above this threshold, then the probability that it loses the synapse is given by:

$$P_{lose,1} = \left(\frac{1-w_1}{k_{Comp}}\right) \times e^{-.5 \times \left(\frac{\tilde{f}_1 - \tilde{f}_2}{\sigma_f}\right)^2} \quad (IV.15)$$

where:

$w_1$ is the synaptic weight of the source neuron onto the low-firing neuron $k_{Comp}$ is the rate that synaptic competition winners are determined $\tilde{f}_1$ is the time-weighted average firing rate of the low-firing neuron $\tilde{f}_2$ is the time-weighted average firing rate of the high-firing neuron If both neurons are firing below $f_{thresh}$, then the probability for each to lose is calculated by the following equation (same for both neurons):

$$P_{lose,1} = \left(\frac{1-w_1}{k_{Comp}}\right) \times e^{-.5 \times \left(\frac{\tilde{f}_1 - \mu_f}{\sigma_f}\right)^2} \quad (IV.16)$$

It is possible for both neurons to lose at the same time, though this is rare. Finally, it is also possible that both synapses 'win'—in essence the synapse splits into two separate synapses. This can only occur if both synapses are very strong:

$$\text{if } (\min(w_1, w_2) > 0.5) \rightarrow P_{win,1,2} = \frac{w_1 \times w_2}{.25 \times k_{Comp}} \quad (IV.17)$$

where $w_1$ and $w_2$ are the synaptic weights onto both neurons

When two synapses cease to be competitive, the 'winning' synapses are simply reassigned to being non-competitive, whereas the losing synapses are removed from the network entirely.

6. Maturation of non plastic synapses: Non-spiny synapses, including all inhibitory synapses and GC outputs, are all initialized with a fixed synaptic weight that does not change over time. The age of the immature neuron does impose a bias on the synaptic strength that gradually disappears as the neuron matures. The realized strength of non-spiny synapses, w, is calculated by:

$$bias = \min\left(\frac{Age - Age_{ref} - 0.5 \times k_{conn}}{k_{conn}}, 1\right) \quad (IV.18)$$

$$w = w_{immature} + (1 - bias) \times (w_{mature} - w_{immature}) \quad (IV.19)$$

where bias is the degree that the synapse weight is adjusted due to the neuron's age;

Age is the age of the GC;

$Age_{ref}$ is the age of the neuron when it begins to receive connections of that type;

$k_{conn}$ is the number of weeks that the synapse requires for maturation;

$w_{mature}$ is the strength of the fully mature synapse;

$w_{immature}$ is the strength of the synapse when those synapses first appear on the newborn neurons.

Maturation of Physiology Parameters

Prior to any event being processed by the network, the physiology of each individual neuron is calculated from its age and physical parameters (i.e., size, # of synapses).

Mature granule cells have a standard physiology which is shown in Table III. New neurons, however, have distinct properties during their early maturation (van Praag et al., 2002; Ambrogini et al., 2004; Esposito et al., 2005; Ge et al., 2006; Overstreet-Wadiche and Westbrook, 2006). The properties that have been well described include membrane resistance ($R_{mem}$), capacitance ($C_{mem}$), resting potential ($V_{rest}$), firing rate ($f_{max}$), and response to GABA. Some of these electrical properties can be attributed in part to the physical dimensions of the neuron—for example, capacitance scales with neuron volume and resistance is inversely related to number of synapses. From studies looking at this maturation process, the development of the other key properties to the model can be estimated as well for each neuron:

$$\text{Vol.} = .12 + \max(.05, 2\delta_x) \times \max(.05, 2\delta_y) \times \delta_z \times \frac{N_{Connections}}{N_{Connections,Max}} \quad (IV.20)$$

$$R_{mem} = \quad (IV.21)$$
$$4 - 3.8 * \tanh\left(\frac{N_{Connections,Max}}{2 \times (\max(0, N_{Connections,Max} - N_{Connections}))} - 0.5\right)$$

$$\tau = \frac{\text{Vol} \times R_{mem}}{.12} \times \tau_{mature} \quad (IV.22)$$

$$\text{if } (\tau > 4 \times \tau_{mature}) \rightarrow \tau = 4 \times \tau_{mature} \quad (IV.23)$$

$$E^*_{GABA} = -1 \times E^*_{Glutamate} \times \min(1, Age - 2) \quad (IV.24)$$

-continued $$\Delta V_{threshold} = \Delta V_{threshold,mature} - \left(1 - \frac{Vol}{Vol_{mature}}\right) \times (\Delta V_{threshold,mature} - \Delta V_{threshold,immature}) \quad \text{(IV. 25)}$$

$$F_{Max} = t_{step} \times \left(F_{Max,mature} - \left(\frac{10 - Age}{10 - Age_{fire}}\right) * (F_{Max,mature} - F_{Max,immature})\right) \quad \text{(IV. 26)}$$

$$\text{if } (N_{Spines} = 0) \longrightarrow F_{Max} = 0 \quad \text{(IV. 27)}$$

$$F_{Min} = t_{step} \times \left(F_{Min,mature} - \min\left(1, \left(\frac{10 - Age}{10 - Age_{fire}}\right) * (F_{Min,mature} - F_{Min,mature})\right)\right) \quad \text{(IV. 28)}$$

$$(dF/dV) = \frac{F_{Max}}{(e^{t_{step}/\tau} - 1) \times \Delta V_{threshold}} \quad \text{(IV. 29)}$$

where:

$N_{Connections}$ is the total number of synapses that the neuron makes;

$N_{Connections,max}$ is the total number of synapses that a fully connected neuron would make;

$N_{Spines}$ is the total number of spiny synapses that the neuron makes (lEC, mEC, and MC afferents onto GCs);

Vol is the estimated volume (arbitrary units); proportional to capacitance;

$R_{mem}$ is the estimated membrane resistance (GΩ));

τ is the estimated membrane time constant (ms);

$E^*_{GABA}$ is the relative response to GABA;

$\Delta V_{threshold}$ is the voltage (relative to rest) required for the neuron to reach threshold (mV);

$F_{max}$ is the maximum firing rate of the neuron;

$F_{min}$ is the minimum firing rate of the neuron (i.e., any firing is bursting);

$Age_{fire}$ is the age at which the immature neuron firing rate is estimated;

dF/dV is the change in firing rate for each mV above threshold.

Figure 8:
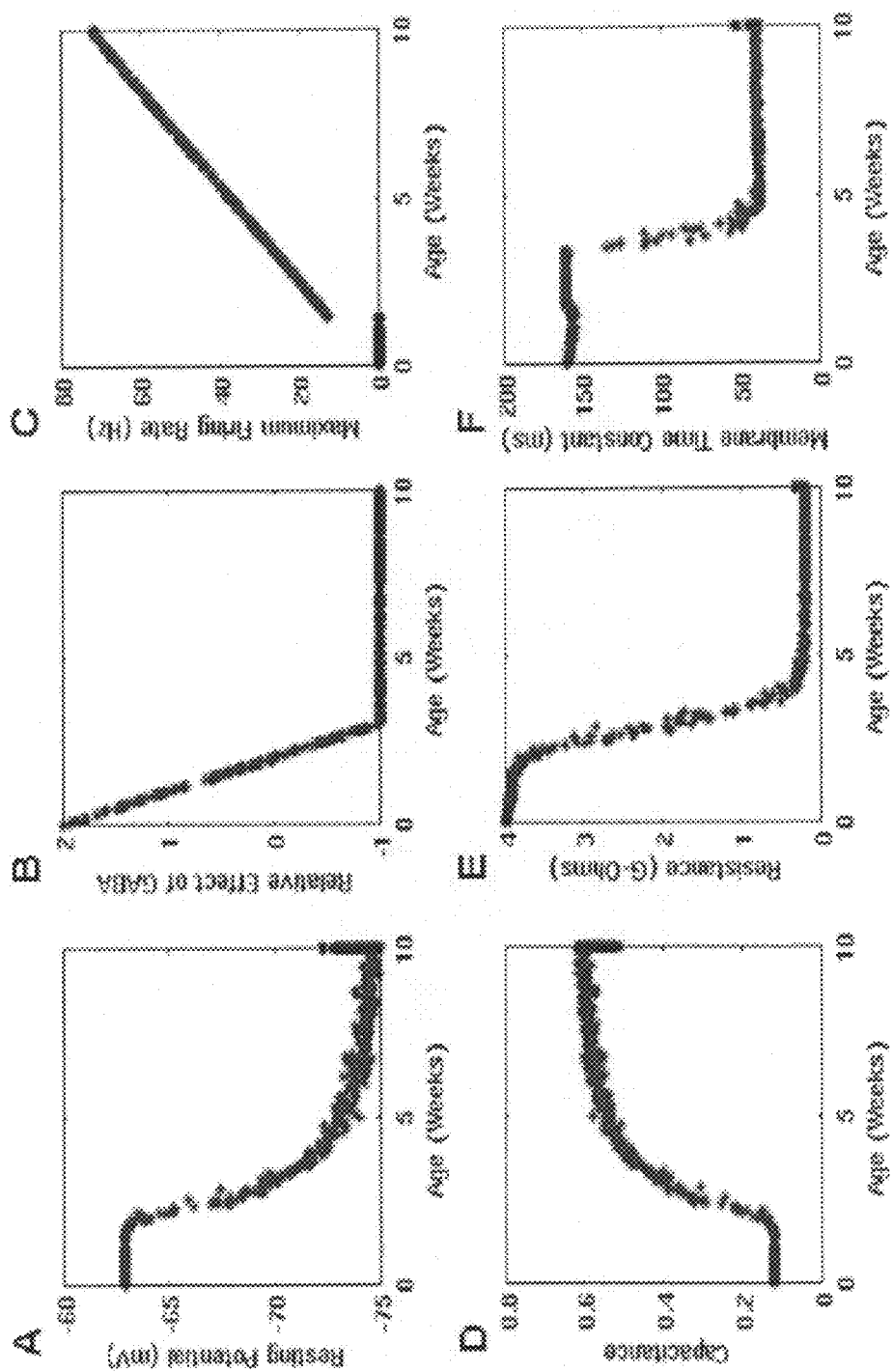
FIG. 8A shows that resting potential decreases as volume increases (see Example 3 equation IV.24, below).
FIG. 8B shows that the relative effect of GABA on immature neurons is age dependent (Example 3 equation IV.23).
FIG. 8C shows that maximum firing rate of neuron increases with age; neurons must receive glutametergic synapses to fire (Example 3 equation IV.25-20).
FIG. 8D shows that membrane capacitance is proportional to the volume of the neuron; the size of the neuron (and the volume) increases with age and the growth of connections (Example 3 equation IV.2-4; IV.20).
FIG. 8E shows that membrane resistance decreases as number of connections increases (Example 3 equation IV.21)
FIG. 8F shows that the membrane time constant i is a function of resistance, volume, and the mature time constant (Example 3 equation IV.22). The maximum T is set at 4 times the time constant of mature neurons.

Because the properties such as synapse number and volume are scaled arbitrarily, the values are computed in without units and then compared to the corresponding values for mature neurons with their known physiology correlates. The physiological maturation of neurons in the model is shown in FIG. 8.

Section V. Network Learning

The dentate gyrus is the site of significant synaptic plasticity, with substantial amounts of LTP having been shown in the perforant path input. In the model, we assume that the synapse classes which are excitatory and on spines experience learning (EC to GC, MC to GC), whereas aspiny neurons and GABAergic synapses do not learn.

Learning Rule:

We used a simple spike-timing covariance learning algorithm to train the network. This STDP learning was implemented after each event by filtering the input layer spike train with a STDP profile, making time before each spike positive and time after each spike negative. This filtered input signal was then compared to spike train of the downstream neuron, and the covariance of the two neurons was used to determine the direction of learning. (Lin et al., 2006)

$$stdp = \{-0.1; -0.3; 0.0; 0.5; 0.15\} \quad \text{(V. 1)}$$

$$\hat{f}_i(t) = stdp(1) \times f_i(t-2) + stdp(2) \times f_i(t-1) + stdp(3) \times f_i(t) + stdp(4) \times f_i(t+1) + stdp(5) \times f_i(t+2) \quad \text{(V. 2)}$$

$$Cov_{ij} = \frac{(\hat{f}_i - \mu_{\hat{f}_i}) \cdot f_j}{\sum_t f_j} \quad \text{(V. 3)}$$

$$\tilde{w}_{ij}^{variable} = w_{ij} - \tilde{w}_{ij}^{fixed} \quad \text{(V. 4)}$$

$$\tilde{w}_{ij}^{free} = 1 - w_{ij} - \tilde{w}_{ij}^{lost} \quad \text{(V. 5)}$$

$$\tilde{w}_{ij}^{possible} = \tilde{w}_{ij}^{free} + \tilde{w}_{ij}^{variable} \quad \text{(V. 6)}$$

$$\tilde{w}_{ij}^{variable} = \tilde{w}_{ij}^{variable} + Cov_{ij} \times (\tilde{w}_{ij}^{possible} - \tilde{w}_{ij}^{variable}) \quad \text{(V. 7)}$$

$$w_{ij} = \tilde{w}_{ij}^{variable} + \tilde{w}_{ij}^{fixed} \quad \text{(V. 8)}$$

where:

$f_i$ is the spike train of the source neuron;

$f_j$ is the spike train of the target neuron;

$\hat{f}_i$ is the STDP filtered signal from the source neuron;

stdp is the spike-timing dependent plasticity filter used;

$Cov_{ij}$ is the covariance between the filtered source neuron trace and the spike train of the target neuron;

$\tilde{w}_{ij}^{variable}$ is the plastic component of existing synaptic strength;

$\tilde{w}_{ij}^{free}$ represents the potential range into which the synapse can grow;

$\tilde{w}_{ij}^{possible}$ is the total potential of the synapse for plasticity;

$\tilde{w}_{ij}^{fixed}$ sets the lower limit of strength below which the synapses may not shrink;

$\tilde{w}_{ij}^{lost}$ sets the upper limit of strength above which the synapse cannot grow.

As dendritic spines mature in the model, their relative level of plasticity decreases. This is accomplished by transferring a portion of the variable strength to fixed strength, and a portion of free strength to lost strength.

$$\tilde{w}_{ij}^{fixed} = \tilde{w}_{ij}^{fixed} + k_{synapse} \times \tilde{w}_{ij}^{variable} \quad \text{(V.9)}$$

$$\tilde{w}_{ij}^{variable} = (1 - k_{synapse}) \times \tilde{w}_{ij}^{variable} \quad \text{(V.10)}$$

$$\tilde{w}_{ij}^{lost} = \tilde{w}_{ij}^{lost} + 0.4 \times k_{synapse} \times \tilde{w}_{ij}^{free} \quad \text{(V.11)}$$

$$\tilde{w}_{ij}^{free} = (1 - 0.4 \times k_{synapse}) \times \tilde{w}_{ij}^{free} \quad \text{(V.12)}$$

Immature Neurons:

Immature neurons have been shown to have a significantly different response to LTP. In particular, the potentiation seen in 4 to 6 week old neurons is considerably higher than that seen before and afterwards (Schmidt-Hieber et al., 2004; Ge et al., 2007). This increased ability for learning is not simulated directly in the model, rather the increased number of younger, more plastic synapses in immature neurons leads to a profile of potential LTP that heavily biases younger neurons.

Section VI. Cell Death

Cell death in the model is limited to the GC layer. This cell death is activity dependent—if a cell fires substantially less than the average activity in the network, there is a small probability that the neuron may die. There is no enforced rate of death, if no cells qualify for dying, then no cells will die. Mature cells can die, but do so rarely.

$$f_{thresh} = \max(\mu_f - 2 \times \sigma_f, 0.25 \times \mu_f) \quad \text{(VI. 1)}$$

$$\text{if} \begin{cases} \text{Age} < 10 \\ \quad \text{or} \quad \text{and} \; (\tilde{f} < f_{thresh}) \\ N_{Spines} < (\mu_{Spines} - \sigma_{Spines}) \end{cases} \rightarrow \quad \text{(VI. 2)}$$

$$P_{Die} = k_{death}$$

where:

$\mu_f$ is the average firing rate of the neuron layer;

$\sigma_f$ is the standard deviation of the firing rates of the neuron layer;

$f_{thresh}$ is the firing rate threshold below which a neuron may die;

Age is the age of the neuron (in weeks);

$N_{Spines}$ is the total number of spiny synapses onto the neuron (lEC, mEC, MC afferents onto GC);

$\mu_{Spines}$ is the average number of spiny synapses onto that type of neuron;

$\sigma_{Spines}$ is the standard deviation of the number of spiny synapses onto that type of neuron;

$\tilde{f}$ is the filtered firing rate of the neuron;

$P_{Die}$ is the probability that the neuron may die;

$k_{death}$ is the rate at which neurons susceptible to death may die.

When a cell dies, its connections are eliminated and the neuron is noted as dead in the network, which precludes the possibility of future growth and activity in the network.

Also, $P_{Die}=0$ for all neurons UNLESS VI.2 is satisfied.

Section VII. Experimental Design

Entorhinal Cortex Inputs

Lateral entorhinal cortex (lEC) neurons were chosen to depolarize at different levels for each environment.

$$V_{lEC} = \left(\left(\frac{\text{abs}(\eta(0,1)) \times \text{abs}(\eta(0,1))}{2}\right) \times \left(\frac{F_{max} \times t_{step}}{df/dV}\right)\right) + V_{thresh} \quad \text{(VII. 1)}$$

where:

$V_{lEC}$ is the depolarization of a lEC neuron for that environment;

$V_{thresh}$ is the depolarization required to fire;

df/dV is the increase in firing rate per unit of increased depolarization (in spikes/timestep);

$F_{max}$ is the maximum firing rate for the neuron (in Hz;)

$\eta(0,1)$ is a random number selected from a Gaussian distribution with a mean of zero and a standard deviation of one. In this equation we force this to be positive.

Medial entorhinal cortex (mEC) inputs were generated using a previously described method (Solstad et al., 2006).

Each mEC neuron was assigned three parameters: grid size/frequency ($\lambda$), grid orientation ($\theta$), and spatial offset ($\phi$). Grid size varied with the dorsal-ventral location of the neuron ($\chi_x$), while orientation and offset were random. As with biological observations, the orientation and offset varied between environments, but the inter-neuronal relationships ($\phi_1$-$\phi_2$ & $\theta_1$-$\theta_2$) remained constant. Therefore, the generation of a new environment involved the random selection of an environmental orientation ($\theta_{env}$) and offset ($\phi_{env}$).

For grid size, the following equation was used, which made grid frequencies range between 1.5 and 3 grids/meter:

$$\lambda = 3 - \chi_x * 1.5; \quad \text{(VII.A1)}$$

In Matlab, the Orientation, $\theta$, was Computed by 2*pi*rand for Each Neuron. Each environment was given a separate random orientation, whereby for neuron 'i' in environment 1:

$$\theta_{i,x} = 2*\pi*\text{rand}$$

$$\theta_1 i = \theta_{1,env} + \theta_i \quad \text{(VII.A2)}$$

A similar computation was performed for the x,y displacements.

$$\phi_{i,x} = \text{rand}; \; \phi_{i,y} = \text{rand}$$

$$\phi_{1,i,x} = \phi_{1,env} + \phi_{i,x} \quad \text{(VII.A3)}$$

The calculation of an mEC neuron's relative response, G, for a spatial location (x,y) is given by:

$$k_1 = \frac{4\pi\lambda}{\sqrt{6}} \times \begin{pmatrix} (\cos(\theta + \frac{\pi}{12}) + \sin(\theta + \frac{\pi}{12})) \times (x - \varphi_x) + \\ (\cos(\theta + \frac{\pi}{12}) - \sin(\theta + \frac{\pi}{12})) \times (y - \varphi_y) \end{pmatrix} \quad \text{(VII. 2)}$$

$$k_2 = \frac{4\pi\lambda}{\sqrt{6}} \times \begin{pmatrix} (\cos(\theta + \frac{5\pi}{12}) + \sin(\theta + \frac{5\pi}{12})) \times (x - \varphi_x) + \\ (\cos(\theta + \frac{5\pi}{12}) - \sin(\theta + \frac{5\pi}{12})) \times (y - \varphi_y) \end{pmatrix} \quad \text{(VII. 3)}$$

$$k_3 = \frac{4\pi\lambda}{\sqrt{6}} \times \begin{pmatrix} (\cos(\theta + \frac{3\pi}{4}) + \sin(\theta + \frac{3\pi}{4})) \times (x - \varphi_x) + \\ (\cos(\theta + \frac{3\pi}{4}) - \sin(\theta + \frac{3\pi}{4})) \times (y - \varphi_4) \end{pmatrix} \quad \text{(VII. 4)}$$

$$G = \frac{2}{3}\left(\frac{\cos(k_1) + \cos(k_2) + \cos(k_3)}{3} + .5\right) \quad \text{(VII. 5)}$$

As with lEC neurons, mEC neurons also have an space-independent environmental bias that this spatial gain is added to.

$$V_{mEC} = G \times \left(\text{abs}\left(.75 + \frac{\text{abs}(\eta(0,1))}{5}\right) \times \left(\frac{F_{max} \times t_{step}}{df/dV}\right) + V_{thresh}\right) \quad \text{(VII. 6)}$$

Input Structure and Experimental Design

During training and growth, each "event" experienced in the model involves the network 'moving' along a path within that context for twenty seconds. The mEC neurons fire according to the spatial location at each instant, whereas the lEC neurons fire at rates determined by the environment's context.

During the testing phase, the network is successively placed in static locations within that environment for either 500 ms. During this time, mEC and lEC firing rates remain constant. These trials completely tile the environment and the responses of the model are recorded for each location.

Paths Taken Through Space

Motion through space was simulated with an ad hoc rule for random movements that is almost certainly not important for the model results and is just meant to sample space in a somewhat biologically realistic manner.

Walking through environments was treated as a combination of random motion with momentum. The virtual "box" was a 1 meter×1 meter square and velocity was set to 0.25 m/s (each time step had a movement of 0.025 s*0.25 m/s=0.00625 m). At each step, its trajectory (dx and dy) were updated by small random components $$dx_{i+1} = 0.1 * n(0,1) + dx_i * (1 + n(0,1)) \quad \text{(VII.A4)}$$

If the path hit a wall (x>1; x<0; y>1; y<0), it reflected like a mirror. For example:

if x>1; dx=-dx  (VIII.A5)

During training, for each event the model took 800 steps during the 20 second simulation within that environment. Within each step, the position was updated, followed by grid cell updates, and then the firing activity of each neuron was calculated.

During testing, there was no motion through the novel or familiar environments. The model was simply simulated the model in individual positions (i.e., x=0.05, y=0.05 for 500 ms; collect all data; x=0.1, y=0.05 for 500 ms; collect all data, etc.)

Growth Phase of Experiment

After the model is initialized with, the model then "grows" in a series of environments. Each environments had a separately calculated lEC activity vector, as well as a random mEC activity vector and shifted grid loci ($\theta_{env}$ and $\phi_{env}$).

Each environment is used for a total of 40 days, which allows considerable growth of the GC layer as well as experience-dependent maturation to the environments. Each day consists of 10 separate training events that consist of the animal moving along a random path for 10 seconds.

Novel Environments

The novel environments were generated the same way as the familiar environments initially were—basically the bias vectors used on the lEC and mEC neurons (Eqns. VII.1 and VII.6) were generated for all the environments independently. (In the long term aging study ONLY, ten of these vectors for each environment would be generated, with the one that was least correlated to the other environments chosen to represent the environment).

Pattern Separation Task

Pattern separation is examined in the model by examining the similarity of the network responses across different sets of EC inputs. In the novel pattern separation task shown in FIG. 15, two initial contexts (lEC patterns) were designed to be nearly orthogonal, and then ten intermediate contexts were designed using varying proportions of neuron activities from each of the environments. This allowed for the examination of several degrees of lEC overlap (contextual similarity). Within each context, the network was tested at many evenly spaced locations to vary mEC input (i.e., spatial similarity). The similarities between responses of each network at these different locations and contexts were then compared to the similarities of the input neurons.

The normalized dot product (NDP) is used to calculate similarity in the model. NDP is determined by comparing the vectors or a neuron layers responses using the following equation:

$$Sim_{i,j} = NDP(X_i, X_j) = \frac{X_i \cdot X_j}{\|X_i\| \times \|X_j\|}$$  (VII. 7)

where X is a 1 by N vector representing the response of the cell layer 'X' to the $i^{th}$ or $j^{th}$ event.

Temporal Separation

The impact of maturation on pattern separation was investigated by extending the pattern separation task over time. After testing the pattern separation ability, the networks then continued to grow within a new environment for the model equivalent of one day (10 events). The networks were then tested on the same test environments. This was repeated for a total of 10 days. After this testing, the similarity of the outputs from different days were compared.

Response to Familiar and Novel Environments

Networks were re-exposed to the environments that they experienced during training (familiar environments; FEs) as well as a novel environment (NE). The response of the network was measured independently for 500 ms at 400 equally spaced locations in each context (forming a 20×20 grid). The response of GCs were summed over the full 500 ms to represent the response to that spatial location.

Each FE as well as the NE was examined in this manner without any learning, neurogenesis, maturation or cell death.

Modulation of Neurogenesis: Aging

Aging was simulated in the computational model by extending the study. Networks were generated as in the earlier studies through three environments (120 days). At the onset of the fourth environment, the neurogenesis rate began to decrease gradually. Every 10 days, the rate of neurogenesis (NG) decreased by the prescribed amount, which in our experiment was 5%.

$$NG(d)=NG(d-10)\times0.95$$  (VII.8)

where d is the current day of the simulation.

Environments were changed every 40 days, as in the other studies. The simulation continued for 400 days (through 10 additional environments).

Pattern separation was measured every 40 days, including the onset of the study at day 120. The two environments used to examine pattern separation were held constant throughout the study. In addition, unlike the experiments described above, the test environment was not entirely random, but biased slightly to ensure that the environment used for each network was unique from all of the familiar environments to reduce the effects of specific network learning from biasing the results. Ten potential test environments were selected, and the one with the minimal overlap (measured by NDP—eq. VII.7) with the 13 training environments was chosen to use as the first test environment. The vector representing this environment was then shuffled to create the second environment for the pattern separation experiment.

The temporal dynamics of the pattern separation was measured at both day 120 (before the age-related decrease in neurogenesis) and at the end of the experiment (day 520).

Modulation of Neurogenesis: Stress

Stress was simulated as an acute decrease in neurogenesis rate from 10 neurons/day to 2.5 neurons/day on day 120. This decreased rate was maintained for 60 days, at which time the rate increased back to 10 neurons/day. The simulation continued through day 280, for a total of seven 40-day environments. The rate of neurogenesis (NG) was measured in new neurons/day according to the following equations:

$$\text{if } \begin{cases} 0 < d < 120 & NG = 10 \\ 120 < d < 180 & NG = 2.5 \\ 180 < d < 280 & NG = 10 \end{cases}$$  (VII. 9)

where d is the day of the simulation.

Environments were changed every 40 days, and the simulation continued through day 280.

Pattern separation was measured every 5 days, starting with the onset of the study at day 120. Similar to the aging study, pattern separation was measured using the same test environments at each time-point, which were chosen to be distinct from the training environments. The temporal dynamics of pattern separation were measured at onset, just prior to neurogenesis recovery (day 180), and at the end of the study (day 240).

Example 4

This example provides an application of the artificial neural network described in Example 3.

Adult neurogenesis in the hippocampus leads to the incorporation of thousands of new granule cells into the dentate gyms every month, but its function remains unclear. Here we present computational evidence that indicates that adult neurogenesis may make three separate but related contributions to memory formation. First, immature neurons introduce a degree of similarity to memories learned at the same time, a process we refer to as pattern integration. Second, the extended maturation and change in excitability of these neurons make this added similarity a time-dependent effect, supporting the possibility that temporal information is included in new hippocampal memories. Finally, our model suggests that the experience-dependent addition of neurons results in a dentate gyms network well suited for encoding new memories in familiar contexts while treating novel contexts differently. Taken together, these results indicate that new granule cells may affect hippocampal function in several unique and previously unpredicted ways.

Experimental Procedures
Overview of Model

Simulations and all subsequent analyses were performed using MATLAB 7.4 running on a Linux platform and were performed on a cluster of four Dell Precision 490n machines (2×Dual Core Xeon 5130 2 Ghz; 16 GB RAM), for a total of 16 independent processors using the MATLAB Distributed Computing Engine.

Model Architecture

Figure 6:
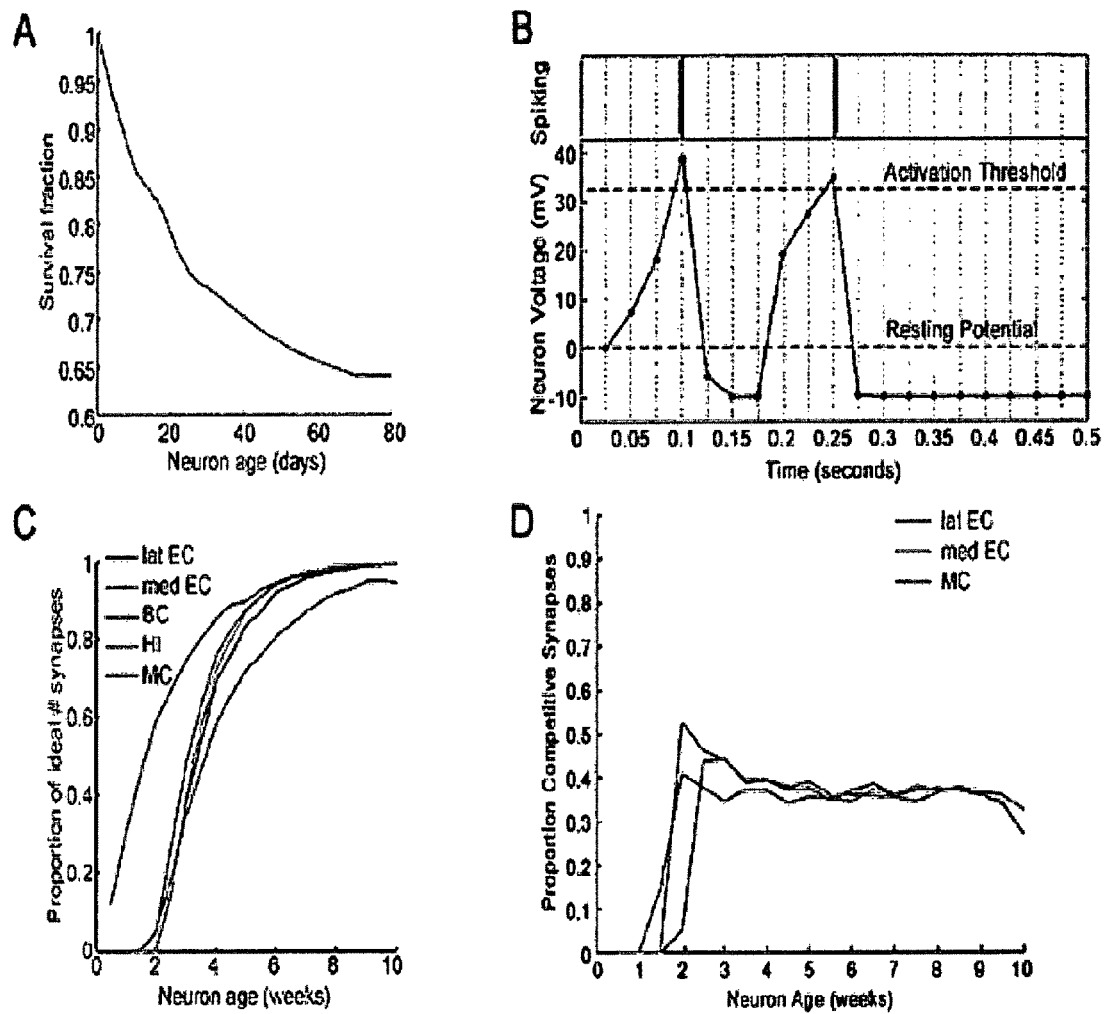
FIG. 6 is an illustration describing model behavior.
Figure 6:
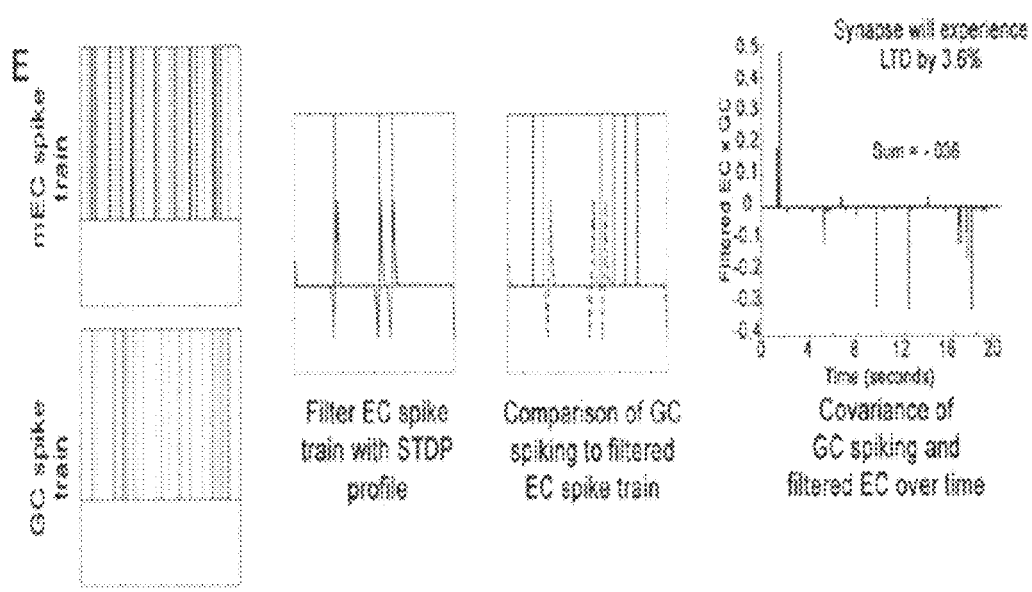
Figure 7:
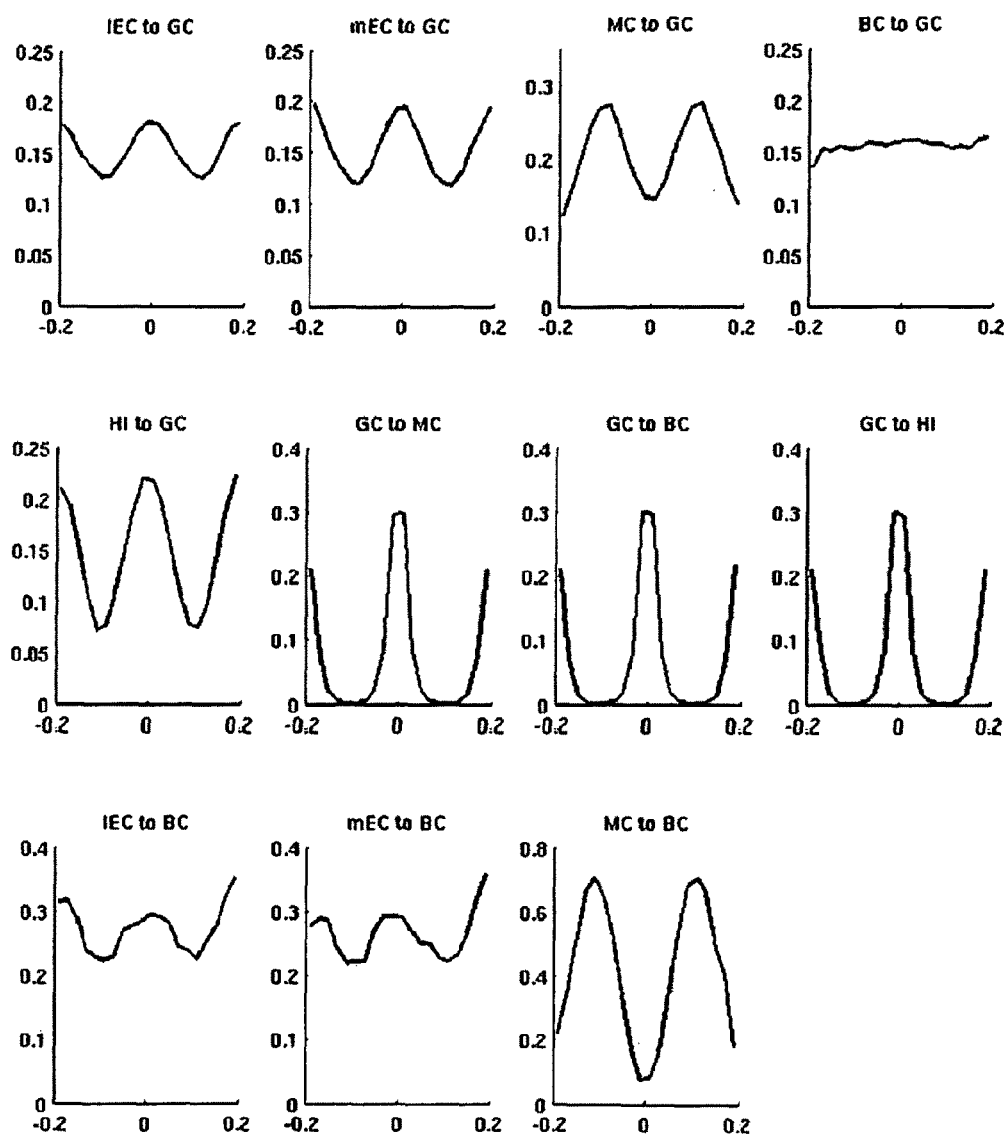
FIG. 7 is a series of panels illustrating network architecture. The probability that two neurons are connected is given as a function of relative distance. The x-axis of each panel refers to the difference between two neuron's location along the septo-temporal axis. The y-axis of each panel represents to the ratio of existing synapses to potential synapse sites. The increase of connection densities for long distances in some of the panels is due to the ringed layer structure—neurons on the edges of the network layers were permitted to project to the opposite edge FIG. 8 (A) is a series of charts showing the physiological maturation of granule cells in an artificial neural network model.

The model's architecture was principally based on several extensive reviews of DG anatomy (Amaral et al., 2007; Freund and Buzsaki, 1996; Patton and McNaughton, 1995). We maintained the proportional relationships between cell layers when scaling down the numbers of neurons and used the anatomical structure of the connections between different neuron classes. The scale of the model presented here consisted of 200 lEC, 200 mEC, 800 GC (initially), 120 basket cells (BC), 220 mossy cells (MC), and 220 hilar interneurons (HI). The GC layer grew continuously at a rate of 10 neurons per day, which corresponded to about 0.5%/day at the time of testing (FIG. 14C). Between 25% and 50% of the neurons died prior to maturing fully (FIG. 6A). Neurons were dispersed according to physical coordinates corresponding to the septotemporal (dorsal/ventral) axis, and most afferent projections onto GCs were topographical along this axis, with the exception of the mossy cells that had an "anti-topographical" terminal field (FIG. 7). The outputs of GCs obeyed a strict topography within the DG region. Full details of the model architecture are given in the model description of Example 3.

Neuronal Simulation

The long time-scales (months) over which neurogenesis acts and the availability of physiological data for immature neurons made conductance-based modeling of this network impractical. The best-characterized physiological parameters for interneurons and maturing GCs are the basic biophysical properties of the neurons: membrane resistance ($R_m$), capacitance (C), resting potential ($V_{rest}$), firing threshold ($V_{thresh}$), and maximum firing rates ($F_{max}$). Given these data for each neuron population (Example 3, Table III), we used a digitized firing rate model to simulate neuronal activity in our network (FIG. 6B). For any discrete time step, an ideal firing rate for the neuron was calculated and then converted into the number of spikes expected for that period. In our simulations, we used a time step of 25 ms.

For each 25-ms time step, the membrane voltage, $V_i(t)$ of each neuron i, at time t, was calculated as follows:

$$V_i(t) = e^{-t_{step}/\tau_i} \times V_i(t-1) + \sum_{j=1}^{J} E^*_{Glutamate,tie} \times f_j(t-1) \times w_{ji} + \sum_{k=1}^{K} E^*_{GAB,Ai} \times f_k(t-1) \times w_{ki} \quad (1)$$

where $t_{step}$ is the length of each discrete time step simulated, $\tau_i$ is the membrane time constant of neuron i, j=1 . . . J indexes over glutamatergic neurons, k=1 . . . K indexes over GABAergic neurons, $V_i$ is the voltage (relative to rest) of neuron i, $E^*_{Glutamate}$ and $e^*_{GABA}$ are maturation-dependent parameters that represent the neuron's sensitivity to glutamate and GABA, respectively, $f_j(t-1)$ and $f_k(t-1)$ are the firing of neurons j and k respectively at the previous time step, $w_{j,i}$ and $w_{k,I}$ are the strengths of the connections from neurons j and k respectively to neuron i.

The first term in this equation represents the neuron settling to its resting potential, and the second and third terms sum over all excitatory (j: 1 to J) and inhibitory (k: 1 to K) neurons that projected onto neuron i, weighted by the strength of each synapse ($w_{ij}$ & $w_{ki}$) and the response of neuron i to the neurotransmitter ($E^*_{Glutamate}$ & $E_{GABA}$).

The potential of a neuron to fire in a given time step, $P_{Fire}$, depends on its voltage, V(t) relative to the threshold voltage, $V_{threshold}$, given by the following equations:

$$\text{if } (V(t) > \Delta V_{threshold}) \longrightarrow P_{Fire} = \quad (2)$$
$$\text{minimum}\begin{pmatrix} F_{Max} \times t_{step}, \\ F_{Min} \times t_{step} + \kappa(t-1) + (V(t) - \Delta V_{threshold}) \times (dF/dV) \end{pmatrix}$$

$$\text{if } (V(t) \leq \Delta V_{threshold}) \longrightarrow P_{Fire} = \kappa(t-1) \quad (3)$$

$$f(t) = \text{round}(P_{Fire}) \quad (4)$$

$$\kappa(t) = P_{Fire} - f(t) \quad (5)$$

$$\text{if } (V(t) < -10\text{mV}) \longrightarrow V(t) = -10\text{mV} \quad (6)$$

$$\text{if } (V(t) > \Delta V_{threshold}) \longrightarrow V(t) = \Delta V_{threshold} \quad (7)$$

where $F_{Max}$ and $F_{Min}$ are the maximum and minimum firing rates for the neuron respectively, κ is a tracking variable that distributes spiking according to the firing rate, dF/dV is the change in firing rate for each mV above threshold.

When $P_{Fire}>0.50$, the neuron spikes (f(t)=1) and the tracking variable κ is lowered, thereby reducing the likelihood of a spike in the next time step. In the event that $0<P_{Fire}<0.5$, the neuron does not spike (f(t)=0) but K increases, raising the probability of a spike at the next time step. The K term was randomized within a narrow range at the beginning of each event to account for variations in the initial state of the neurons.

Creation of DG Networks

Each network was generated with all neuron layers fully populated with the exception of the GC layer, which was instead populated with a low number of "newborn" neurons. These GCs (and later neurons born into the network) were initialized with immature neuronal properties and lacked synaptic inputs and outputs. The networks were then grown while exposed to a series of environments presented for 40 days each (@10 events/day=400 events), during which time new neurons continued to be born and young neurons either matured or were removed (cell death) (FIG. 14D).

At the conclusion of this initial growth phase, networks were further developed in a fourth environment with different experimental conditions. Networks were replicated, and one replicate continued to grow with neurogenesis (NG) and the other replicate network lacked neurogenesis (No NG). Maturation and cell death of existing immature neurons continued in both experimental groups. Network testing was performed at the end of this experimental phase.

Neurogenesis and Maturation

Neurogenesis and subsequent maturation were implemented in the model by adapting the timeline observed in biological studies. New neurons were added to the network according to a neurogenesis rate and their maturation took place over several weeks. New neurons were initially born without synapses and were incapable of firing action potentials. Their maturation included the growth of dendritic arborizations (Zhao et al., 2006), spine formation (Toni et al., 2007), physiological dynamics (Esposito et al., 2005; Ge et al., 2006), and survival (Kempermann et al., 2003; Tashiro et al., 2007). The maturation paradigm is explained fully in the model description of Example 3.

The physiological properties of the neurons were dynamic during their maturation, and the following general relationships were used to determine the physiology of immature neurons (see the model description of Example 3 for specific algorithms and FIG. 8):

$$\text{Size} \propto \text{Activity} \tag{8}$$

$$R_{mem} \propto 1/\#\text{synapses} \tag{9}$$

$$C \propto \text{Volume} \tag{10}$$

$$\tau_{mem} = R_{mem} C \tag{11}$$

$$V_{rest} \propto 1/C \tag{12}$$

$$F_{Max} \propto \text{age} \tag{13}$$

$$E_{GABA} \propto \text{age} \tag{14}$$

Figure 5:
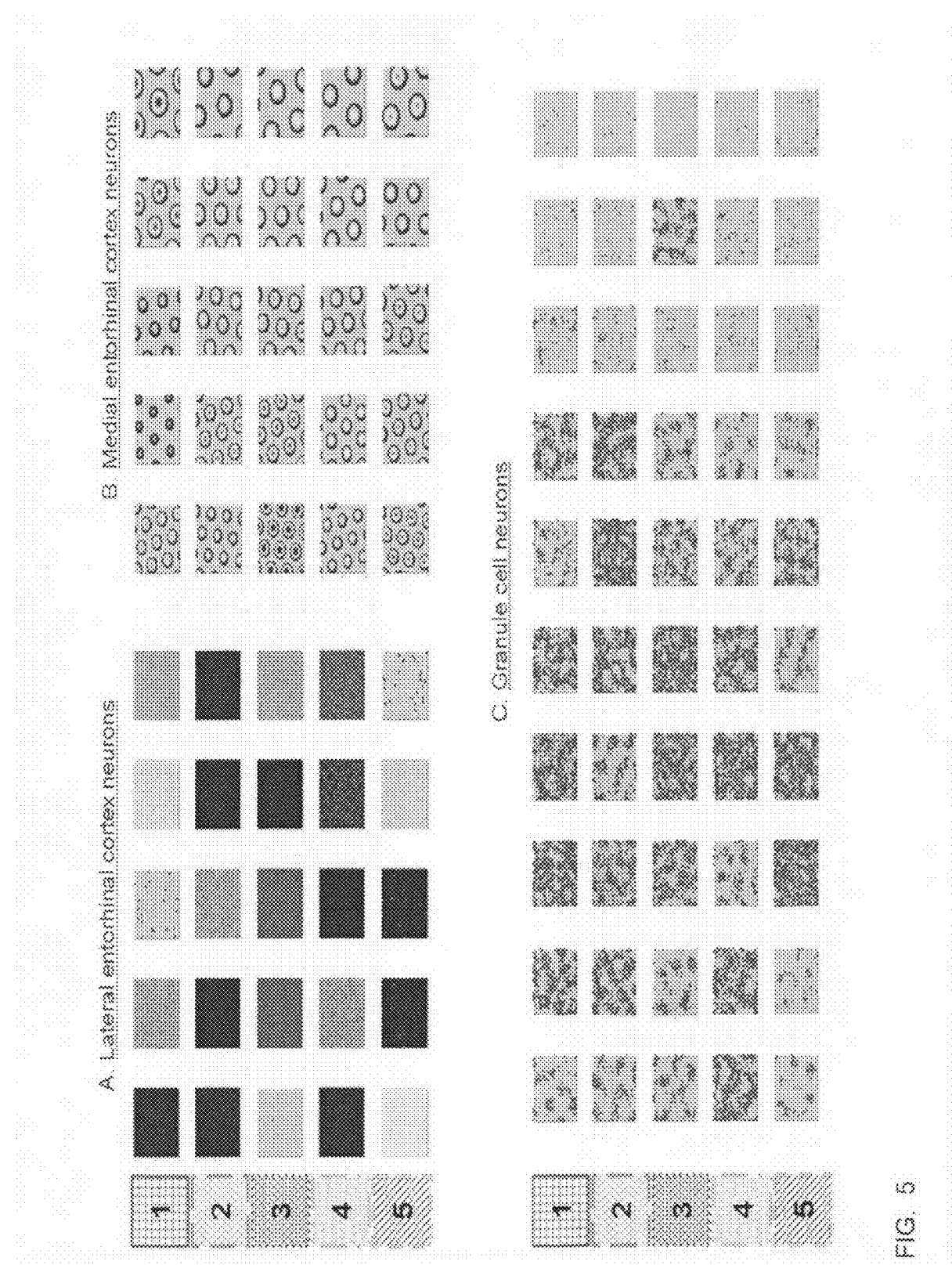
FIG. 5 is an illustration showing sample special response of model neurons.

Most parameters ultimately depended on either the age of the neuron, activity of the neuron, or both. All neurons aged at an equal rate (leading to increases in firing rate and GABA hyperpolarization for all immature cells). Activity of the neuron corresponded to depolarization of the neuron by local GABA interneurons initially and ultimately by glutamatergic inputs. After about four to six weeks, the neurons attained computational properties similar to those of mature neurons (FIG. 14B; FIG. 5).

The formation of synapses onto and from immature neurons was dependent on the physical size of the neuron. When newborn GC dendrites reached a size corresponding to an axon terminal field, they began to receive connections from the appropriate populations. Connections that were formed onto spines (from lEC, mEC, and MC) could be either de novo (entirely new) or involve competition with existing synapses (FIG. 6D). Aspiny connections (from inhibitory neurons and GC outputs) were non-competitive and all synapses were formed de novo.

Plasticity of Synapses

A spike timing-dependent plasticity (STDP) learning rule was used for all excitatory synapses onto GCs. Learning was implemented between individual neurons by correlating the input layer's spike train [filtered by a STDP profile observed in DG neurons (Lin et al., 2006)] with the firing of the downstream GC. According to this rule, synapses in which afferent activity preceded downstream activity were potentiated whereas those synapses whose afferent neuron typically fired after downstream spiking were depressed.

The plasticity of synapses decreased gradually over time, which focused plasticity on immature neurons since young neurons typically had much younger synapses than fully mature neurons. This spine age-dependent plasticity resulted in increased levels of learning for immature neurons relative to fully mature neurons, as observed in biological studies (Ge et al., 2007; Schmidt-Hieber et al., 2004) (FIG. 6E).

Input Structure and Experimental Design

The mEC and lEC layers served as the controlled input to the model. mEC neurons show a distinct "grid cell" behavior during spatial exploration (Hafting et al., 2005). We implemented properties of the mEC's spatial response, including the relationship of grid size to dorsal-ventral position and the fixed relationship between different grid cells across environments. lEC responses are less well understood, but it is likely that they provide the hippocampus highly processed representations of contextual feature and object information—the "what" to the mEC grid cells' "where." The lEC input was constant at different spatial locations but varied considerably across different contexts. The different control of the two inputs means that switching environments changed the spatial response of the grid cells and activated a different set of lEC neurons, whereas changing position within a single environment only affected the mEC neurons' response (FIG. 14E, FIG. 5).

During training and growth, each "event" experienced in the model involved the network "moving" along a path within that context for twenty seconds (FIG. 14F). The mEC neurons fired according to the spatial location at each instant, whereas the lEC neurons fired at rates determined by the environment.

During the testing phase, the network was successively placed in static locations within that environment for 500 ms. During this time, mEC and lEC firing rates remained constant. These trials tiled the environment uniformly and the responses of the model were recorded for each location.

Pattern Separation Task

Pattern separation was analyzed in the model by examining the similarity of the network responses across different sets of EC inputs. In the novel pattern separation task shown in FIG. 15, two initial contexts (lEC patterns) were designed to be nearly orthogonal and then 10 intermediate contexts were designed using varying proportions of neuron activities from each of the environments. This design allowed for the examination of several degrees of lEC overlap (contextual similarity). Within each context, the network was tested at many evenly spaced locations to vary mEC input (i.e., spatial similarity). The similarities between responses of each network at these different locations and contexts were then compared to the similarities of the input neurons.

The normalized dot product (NDP) was used to calculate similarity in the model.

NDP was determined by calculating the similarity, $\text{Sim}_{i,j}$ between the GC layer outputs in response to two different events, $X_i$ and $X_j$, as follows:

$$Sim_{i,j} = NDP(X_i, X_j) = \frac{X_i \cdot X_j}{\|X_i\| \times \|X_j\|} \quad (15)$$

where X is a 1 by N vector representing the response of the cell layer 'X' to the $i^{th}$ or $j^{th}$ event.

Temporal Separation

The impact of maturation on pattern separation was investigated by extending the pattern separation task over time. After testing the pattern separation ability, the networks continued to grow within a new environment for the model equivalent of one day (10 events). The networks were then tested on the same test environments. This procedure was repeated for a total of 10 days. After this testing, the similarities of the outputs from different days were compared.

Measuring Responses to Familiar and Novel Environments

Figure 17:
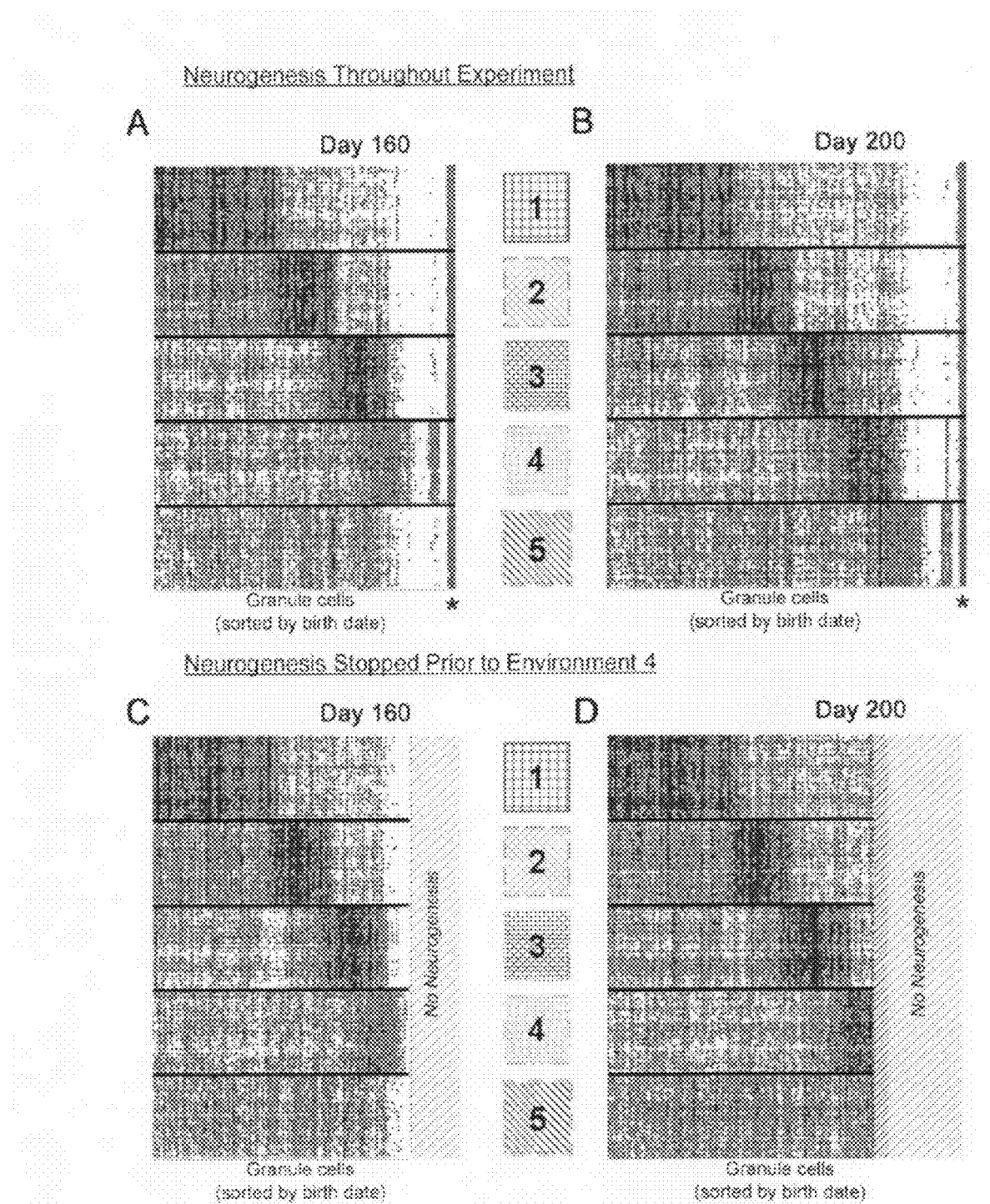
FIG. 17 is a panel showing the response of DG network to familiar and novel environments. Environments were examined in each of the environments used during network growth. Within each environment, firing rates in response to 400 spatial locations were determined.
Figure 17:
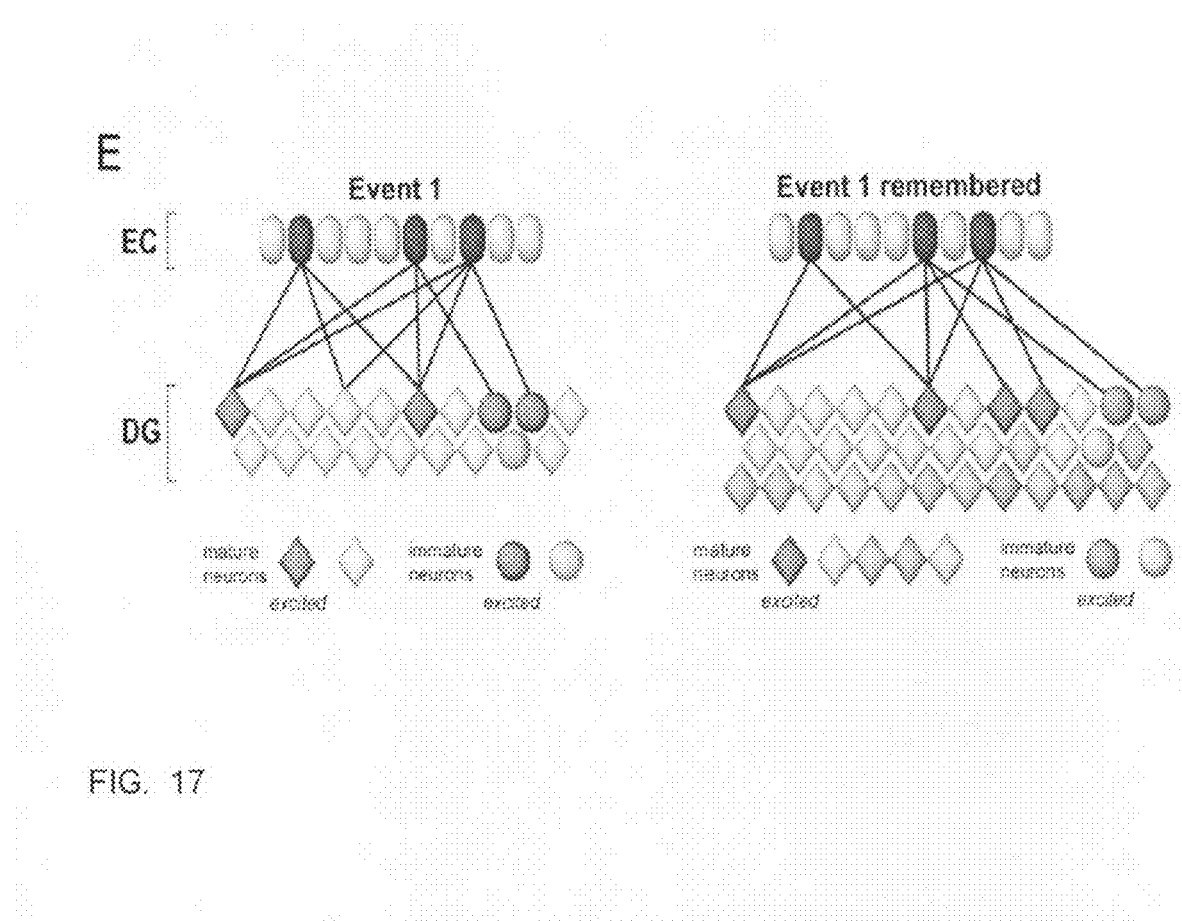

At day 160, the NG and No NG networks were tested (without learning or neurogenesis) at 400 different spatial locations within the four environments that it matured within (FEs) as well as a novel environment (NE). The firing rate for each GC neuron at each spatial location was measured, allowing the results to be compared across the different environments (FIG. 17). Each network then continued to grow within the NE until day 200, at which point the networks were tested in each of the FEs and NE again.

Aging and Stress Experiments

Figure 18:
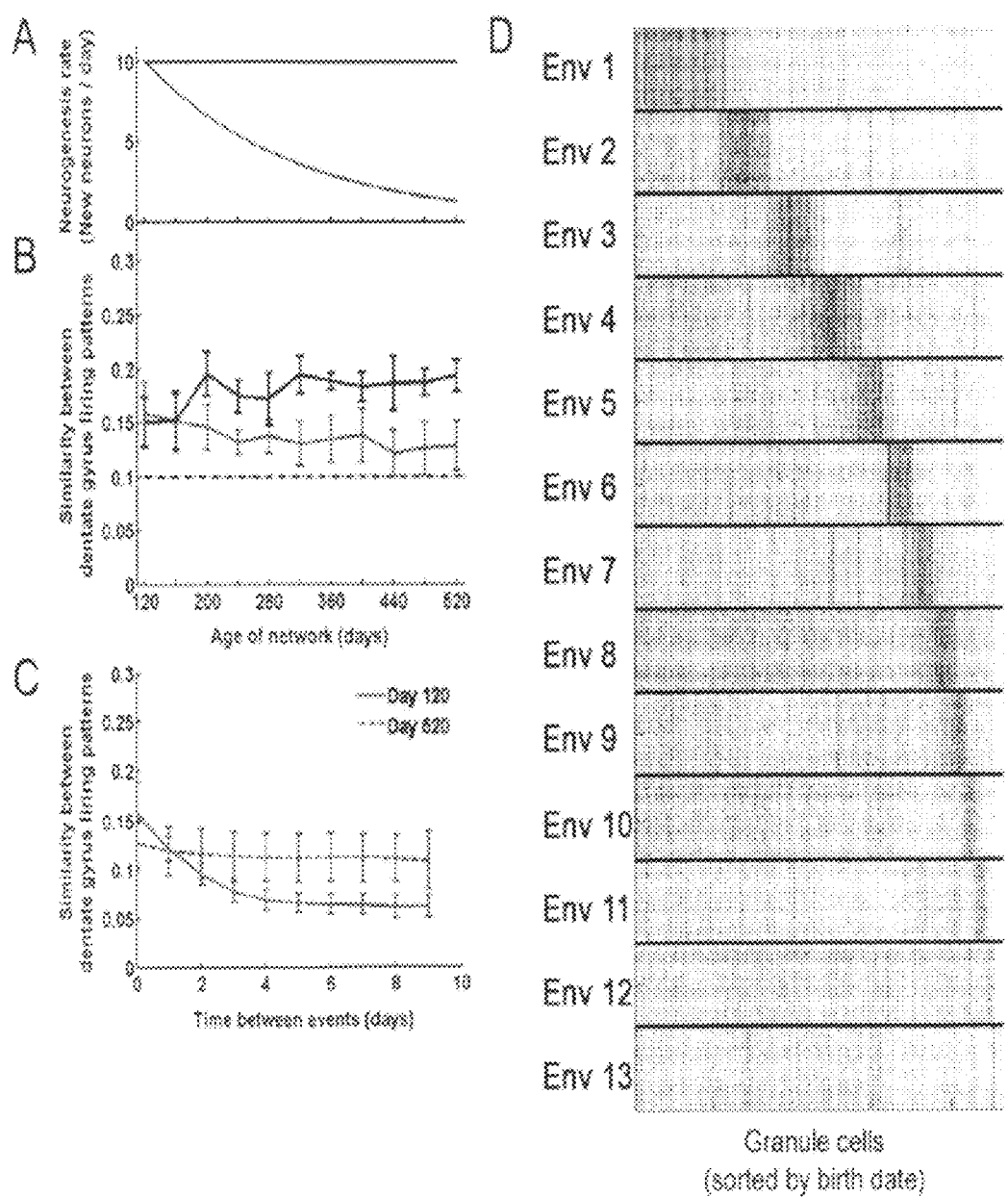
FIG. 18 is a panel showing the effect of neurogenesis modulation on function.
Figure 18:
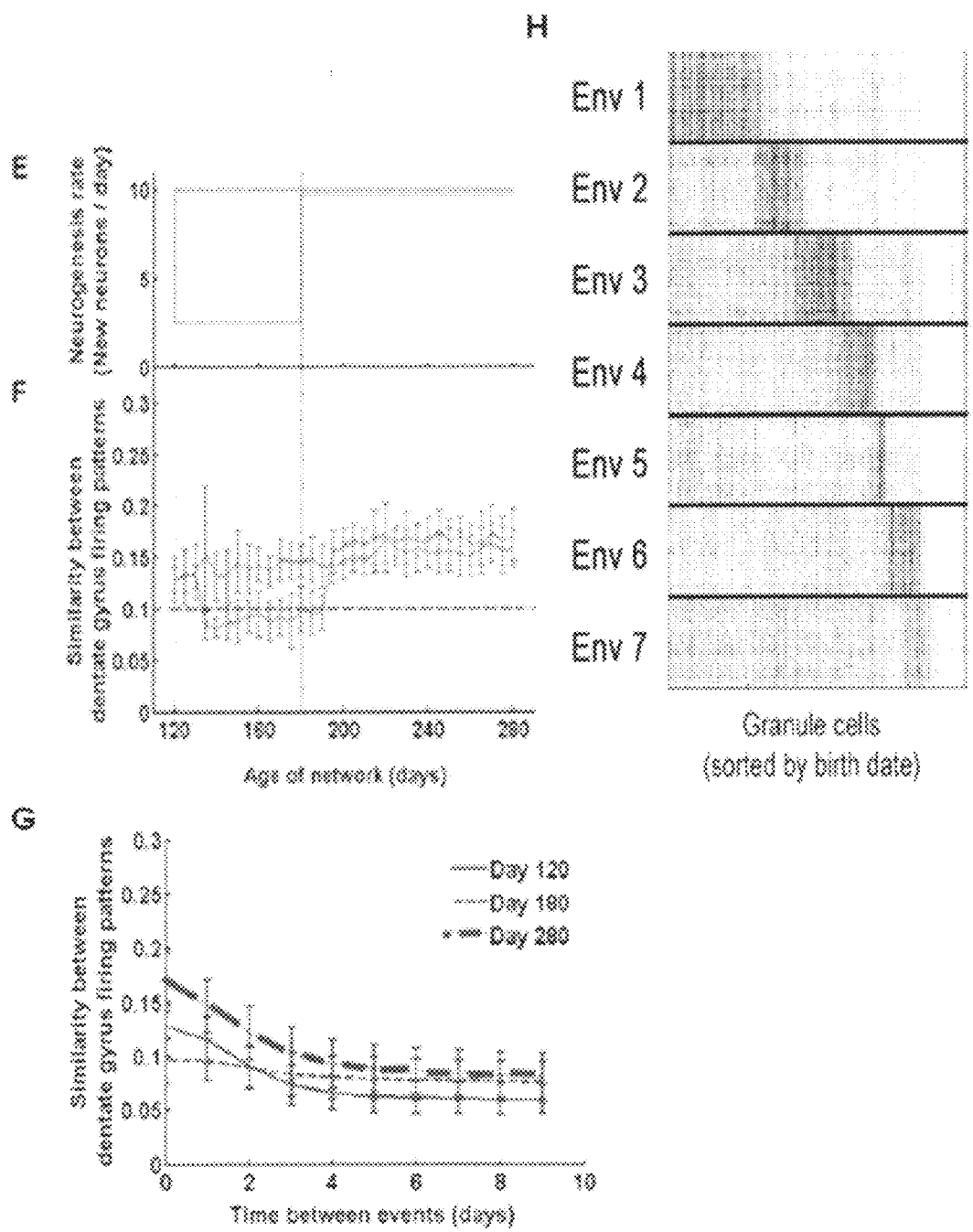

Aging was simulated by continuing to grow the network until day 520. In the aging network, the neurogenesis rate was decreased by 5% every 10 days starting on day 120 (FIG. 18A). Environments were changed every 40 days, for a total of 13 trained environments. Pattern separation was tested every 40 days, and the temporal dynamics of pattern separation was measured on day 120 (experiment onset) and day 520 (experiment end). A second group of networks was simulated with no decrease in neurogenesis.

Stress was simulated by decreasing neurogenesis to 2.5 neurons/day (from 10 neurons/day) on day 120 (FIG. 18E). On day 180, the neurogenesis rate returned to 10 neurons/day. As above, environments changed every 40 days. Pattern separation was measured every 5 days, with temporal dynamics measured on days 120 (experiment onset), 180 (end of stress period), and 280 (experiment end). A second group of networks was simulated with no stress-related decrease in neurogenesis.

Statistical Analysis

Simulations of the model were run in sets of eight networks. All error bars shown correspond to the standard deviation across the eight replicates. P-values were computed by 2-way ANOVA performed using the MATLAB Statistics toolbox.

Summary of Abbreviations Use:
DG: Dentate Gyrus;
GC: Granule Cell;
lEC: Lateral Entorhinal Cortex;
mEC: Medial Entorhinal Cortex;
LTP: Long-term Potentiation;
NG: Experimental Networks with Neurogenesis;
No NG: Experimental Networks with Stopped Neurogenesis;
FE: Familiar Environment;
NE: Novel Environment.

Results

Computational Model of DG Neurogenesis

We modeled adult neurogenesis by designing a complex neural network that included many of the specific details of adult neurogenesis and the DG (described in the methods and model description of Example 3). While there are many approaches to modeling neural systems, we hoped that this "bottom-up" approach would reveal possible functions that would otherwise go unnoticed in a simpler model. The DG networks we used contained six separate populations (layers) of cells. These included two input regions—the lateral and medial entorhinal cortex (lEC and mEC, respectively)—the neurogenic GC layer and three local interneuron populations: excitatory mossy cells (MC), inhibitory basket cells (BC) and hilar interneurons (HI) (FIG. 14A). Before experimentation, newly generated networks were "grown" to full size using a paradigm designed to reflect the developmental growth of the DG. The non-neurogenic cell layers (all but GC) and the connections between them were initialized fully when the network was generated. The GC layer was initialized with a large number of immature neurons, and these, as well as all later newborn neurons, matured and developed connections according to the maturation process (FIG. 14B; see Example 3). Initially the GC layer had twice the number of input EC neurons, 800 GC compared to 400 EC neurons (including both the mEC and lEC layers), but after full growth the GC layer had approximately five times the total number of EC neurons (FIG. 14C). This ratio corresponds to the ratio observed in the developed rat DG (200,000 EC neurons to 1 million GC; (Amaral et al., 2007). New neurons were born at a rate of 10 per day—though not all survived (FIG. 6A). At the time of testing, the model GC layer grew at roughly 10% per month, similar to what has been estimated in young rats (~6%; (Cameron and McKay, 2001).

After initialization, the input layers provided highly structured inputs representing different "environments" for the equivalent of 120 days, during which time each network grew by generating new neurons and integrating them in the circuit in an activity-dependent manner (FIG. 14D). On each training trial the model's inputs were determined by a random path through the environment that activated spatial grid cells (mEC) (Solstad et al., 2006) and context-specific neurons (lEC) (FIGS. 14E-F; FIG. 5), which in turn activated the GC population (FIG. 6B). At 120 days, the network was duplicated, with one network continuing to grow with neurogenesis ("NG" network) while the other network ceased to have new neurons born ("No NG" network). These two networks were presented with a fourth environment for 40 days before experimentation.

The afferent and efferent connections of new neurons were not formed immediately but rather gradually as the neuron matured within the network according to the rate of connectivity seen biologically (Toni et al., 2008; Zhao et al., 2006) (FIG. 6C). New GC competed with existing GC for many of their excitatory inputs (FIG. 6D) (Toni et al., 2007), and these synapses were the only plastic synapses in the model, experiencing LTP and long-term depression (LTD) at a rate determined by the age of the synapse (FIG. 6E). Due to having only young synapses, immature neurons exhibited the highest levels of LTP in the model, though mature neurons were capable of learning at lower levels. This finding is consistent with several studies of LTP and adult neurogenesis (Ge et al., 2007; Schmidt-Hieber et al., 2004). The connections formed within the network mimicked the general topography of the observed connectivity in vivo (Amaral et al., 2007) (FIG. 7). The maturation of the immature neuron physiology, including membrane resistance, resting potential, and firing rates, proceeded according to what has been observed biologically (Esposito et al., 2005; Ge et al., 2006) (FIG. 8).

Immature Neurons Contribute "Pattern Integration" to DG Pattern Separation

The first behavior we directly examined in the DG networks was pattern separation. Pattern separation is a computational process by which similar information entering a network results in distinct outputs. This process is believed to be critical in the formation of memories in the CA3's auto-associative network (Treves and Rolls, 1992) and has long been considered a natural function for the DG, due to its high density of sparsely active GC. Following the growth of the NG and No NG networks (FIG. 15A), we tested the output of the DG layer using different EC inputs that varied by changing the context (lEC input) and spatial location (mEC input), expecting that the DG's outputs from these events would be considerably more distinct from one another than the inputs were (O'Reilly and McClelland, 1994). For highly similar EC inputs (similar spatial and contextual information), the two networks performed comparably at pattern separation. However, when the inputs become more dissimilar, the orthogonalization of outputs was inversely related to the degree of neurogenesis, with the No NG network outputting the most separate signals whereas the NG networks actually appeared to blur together outputs for very dissimilar inputs (NG vs. No NG; $p<0.01$; FIGS. 15B-C).

The observation that pattern separation is affected by the presence of new neurons is consistent with our previous theory that the new neurons respond too broadly to be effective separators (Aimone et al., 2006). Furthermore, we had also predicted that the mature neurons in the neurogenic DG would still be separating the EC inputs. When the immature neurons were removed from the analysis, we indeed saw that it was the new neurons that were affecting this response, as fully mature neurons were still sparsely active and effective at separating the cortical inputs (FIG. 9A). Therefore, while new neurons appeared to affect the global pattern separation capability of the DG, the mature cells continued to perform as expected. The degree to which the outputs from NG networks were more similar than those from the No NG networks was dependent on the rate of neurogenesis: as expected, the greater the neurogenesis rate, the larger the pattern integration effect (FIG. 9B).

Based on these results, we speculate that the pattern separation function of the DG is more complex than previously considered: while mature GC effectively separate information arriving from EC, the immature GC provide associations between events (FIG. 15D). This latter role, which we refer to here as pattern integration, is most prominent when events are highly dissimilar and may help to form associations in the CA3 during memory formation. This pattern integration effect is different from the pattern completion function that has been proposed for downstream hippocampal areas. Pattern completion produces the same output from related but different inputs, allowing the reconstruction of a memory from a partial cue, whereas pattern integration, as described here, limits the amount of separation of very distinct inputs.

Dynamics of Adult Neurogenesis Result in "Temporal Separation" of Memories

The observation that immature neurons increase the similarity between DG outputs suggests that young GC are contributing information while the DG pattern separates. One possibility that we discussed in our previous report is that this added association relates to time (Aimone et al., 2006). Namely, the pattern integration effect observed with neurogenesis may represent information about the temporal relationship between two events. Whereas events close in time will encounter the same immature neurons, thus adding similarity to their DG representations, events encoded far apart in time will utilize distinct sets of immature neurons, making their representations more distinct.

Figure 16:
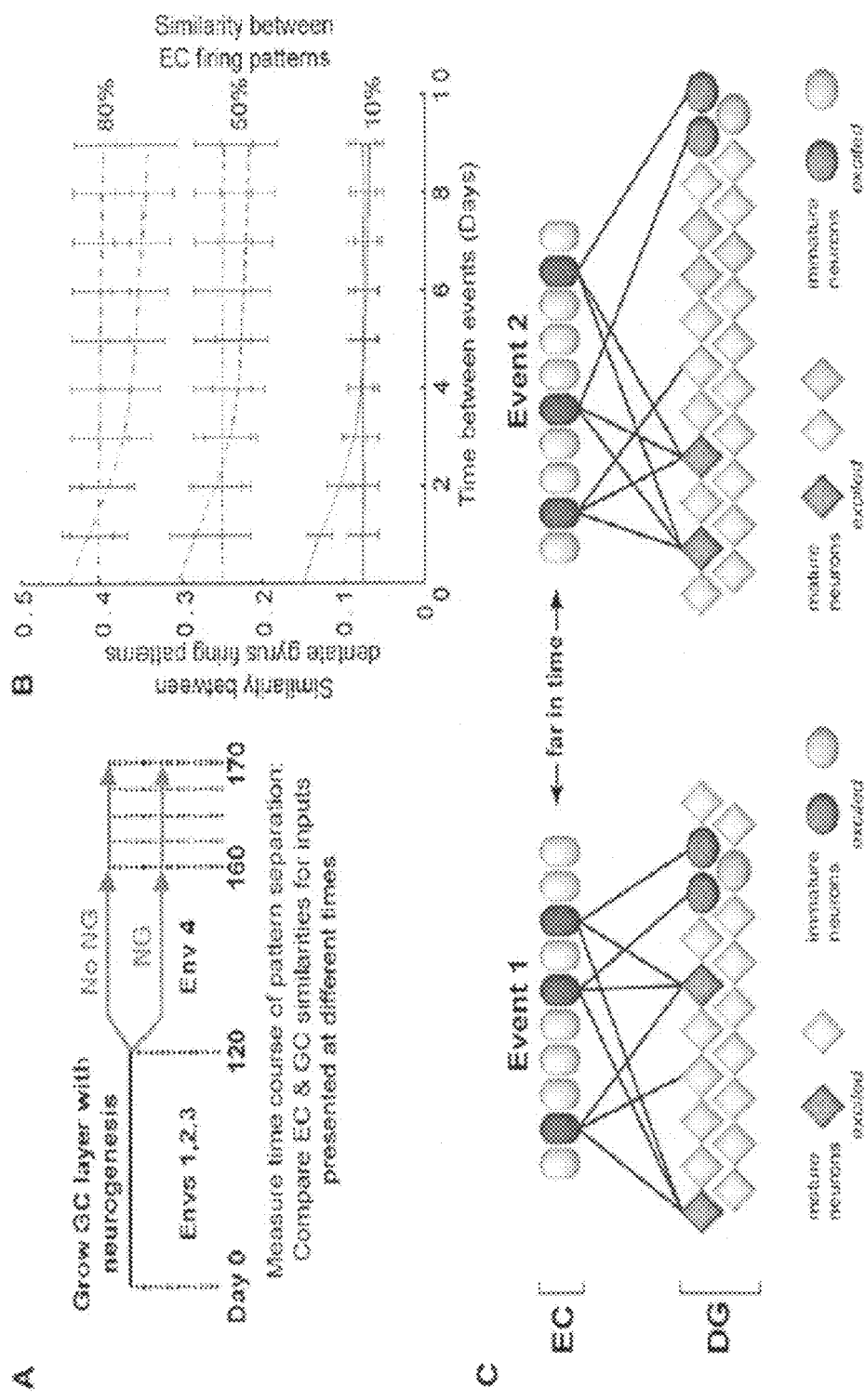
FIG. 16 is a panel showing the effect of time between events on pattern separation and pattern integration.

To examine whether the time between events presented to the network affects the decrease in pattern separation that is observed for events presented to the same network, we tested the network daily in one environment while continuing to grow it in a separate environment (FIG. 16A). Each day, after the growth phase, the network was tested in each of the previous test environments at 400 distinct positions (with plasticity disabled), and the outputs of the network were compared across time. The NG network's ability to separate two inputs strongly depended on the amount of time that elapsed between their presentations. If the two events occurred within a short time of one another (within 1-2 days), the resulting DG output demonstrated the same added similarity (when compared to the No NG networks) that was observed between events occurring at the same time (FIG. 16B). However, for events presented further apart in time, the influence of immature neurons reversed, and the separation of temporally distant events in NG networks was better than that of the No NG networks (interaction of neurogenesis and time; $p<0.01$). This improved separation was not a result of the network learning, as there was no plasticity in response to the test environments, but rather was a result of temporally separated events being encoded with distinct populations of immature neurons.

Figure 10:
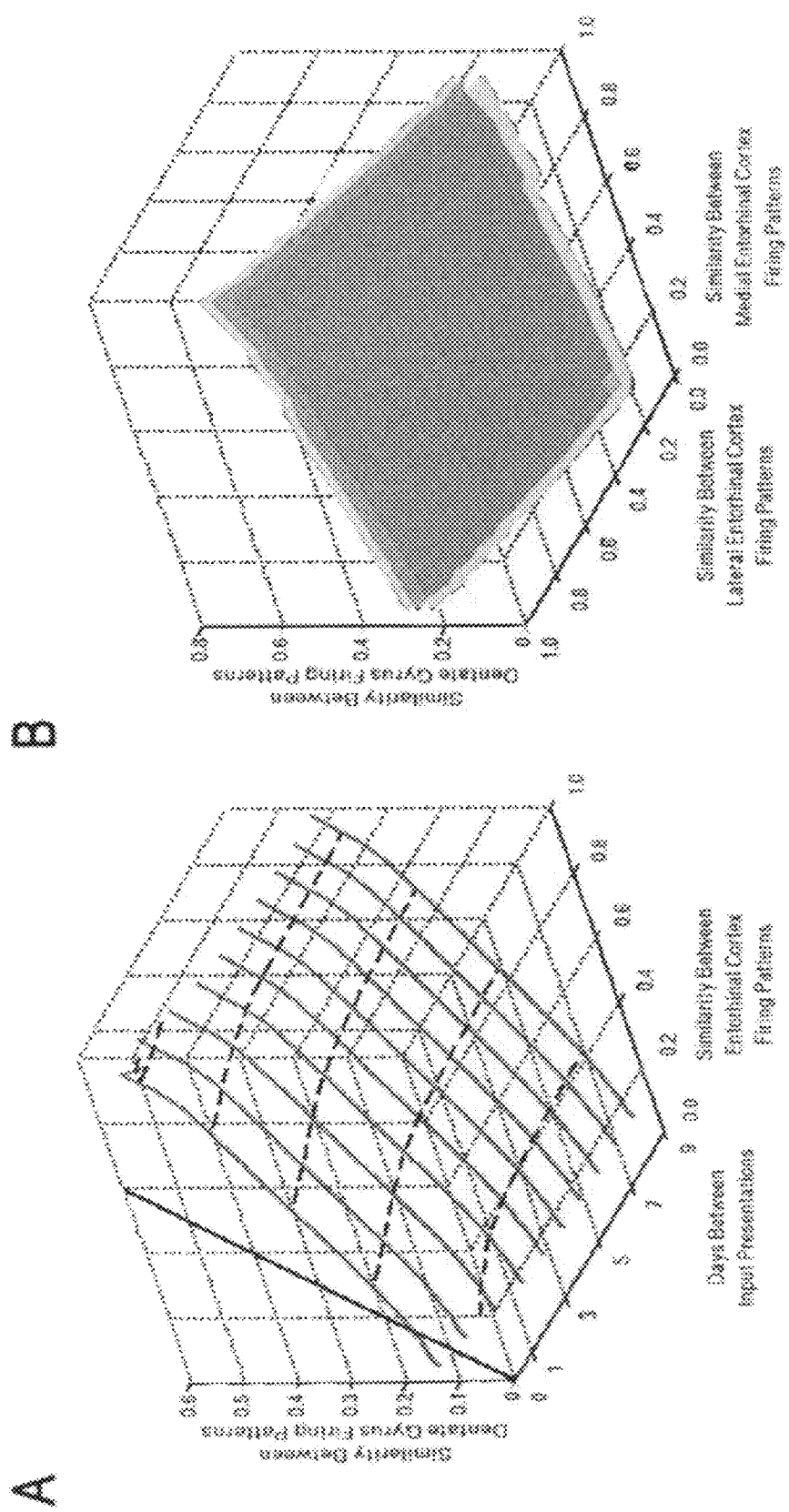
FIG. 10 is a panel showing temporal associations.
Figure 10:
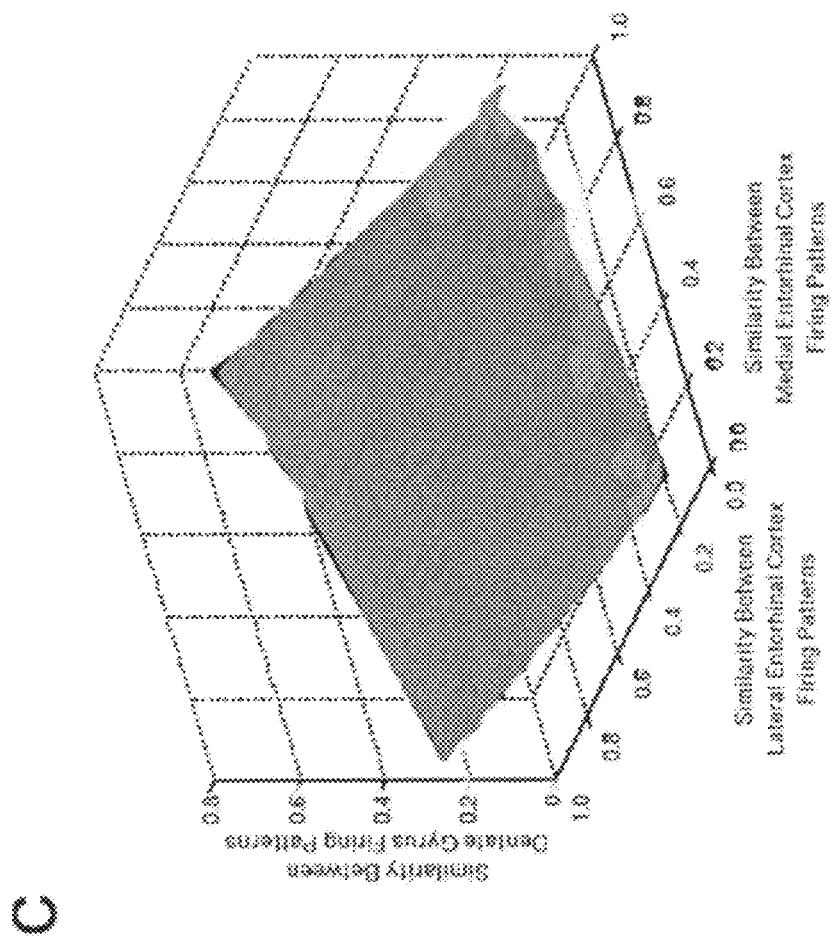

Interestingly, in addition to the time that elapsed between events, the degree that neurogenesis affected separation of these events was also a function of how similar the inputs were: inputs that were already well separated were more affected by the immature neuron population and appeared to retain a neurogenesis-dependent similarity for a longer time (FIG. 16B; FIG. 10). In contrast, immature neurons were not as effective at contributing similarity to events that were initially very similar, as these inputs were strongly separated by mature cells in the network. Although the pattern integration effect was strongest during the encoding of events with already separate EC representations, neurogenesis improved the separation of two events most profoundly at high levels of input similarity when the events were separated by several days.

The temporal dynamics observed in the pattern integration effect emerge from the continuously changing immature GC population, with attrition of older immature neurons through maturation and cell death and replenishment by the birth of new neurons (FIG. 16C). This dependence on time suggests that the pattern integration effect does not simply reduce pattern separation, but rather fundamentally changes the DG's separation function. Because of the changing immature neuron population, the DG not only separates events based on their contextual and spatial similarities, but also by their temporal relationship. This temporal separation is accomplished even though the "when" part of memory may not be explicitly part of the inputs.

New Neuron Maturation Allows Specialization in Encoding Familiar Environments

While our modeling results concerning pattern separation show that young GC have unique properties that may affect DG function, the long-term survival of these neurons suggests that adult-born GC continue to affect hippocampal function after they pass through this immature phase. The influence of environment on the survival of adult-born GC indicates that the ultimate function of these neurons is determined by their experience. To investigate this long-term function of neurogenesis, we examined the response of the network to the four environments that it was exposed to during the development of the network (familiar environments: "FEs") as well as a novel environment ("NE"; FIG. 17).

An inspection of one network's response to testing at different locations in each of the four different FEs and an NE after training in all four FEs revealed that each environment activated different groups of GC neurons (FIG. 17A). Exposure to the first three FEs resulted in the activation of large, separate fractions of the GC population, whereas the most recently experienced FE, environment 4, had a smaller, yet still grouped, response. Testing within the NE (environment 5), however, activated only a disperse set of neurons, with few GC showing a preference for the NE. As suggested by the results showing the temporal dependence of pattern integration, the population of immature neurons changed as the network passed through time. We allowed the network to grow and mature within the NE, and as a result, a population of GC that preferred the NE emerged (FIG. 17B). In addition, the response to the fourth FE (environment 4) was stronger, even though the network did not experience that environment again.

Figure 11:
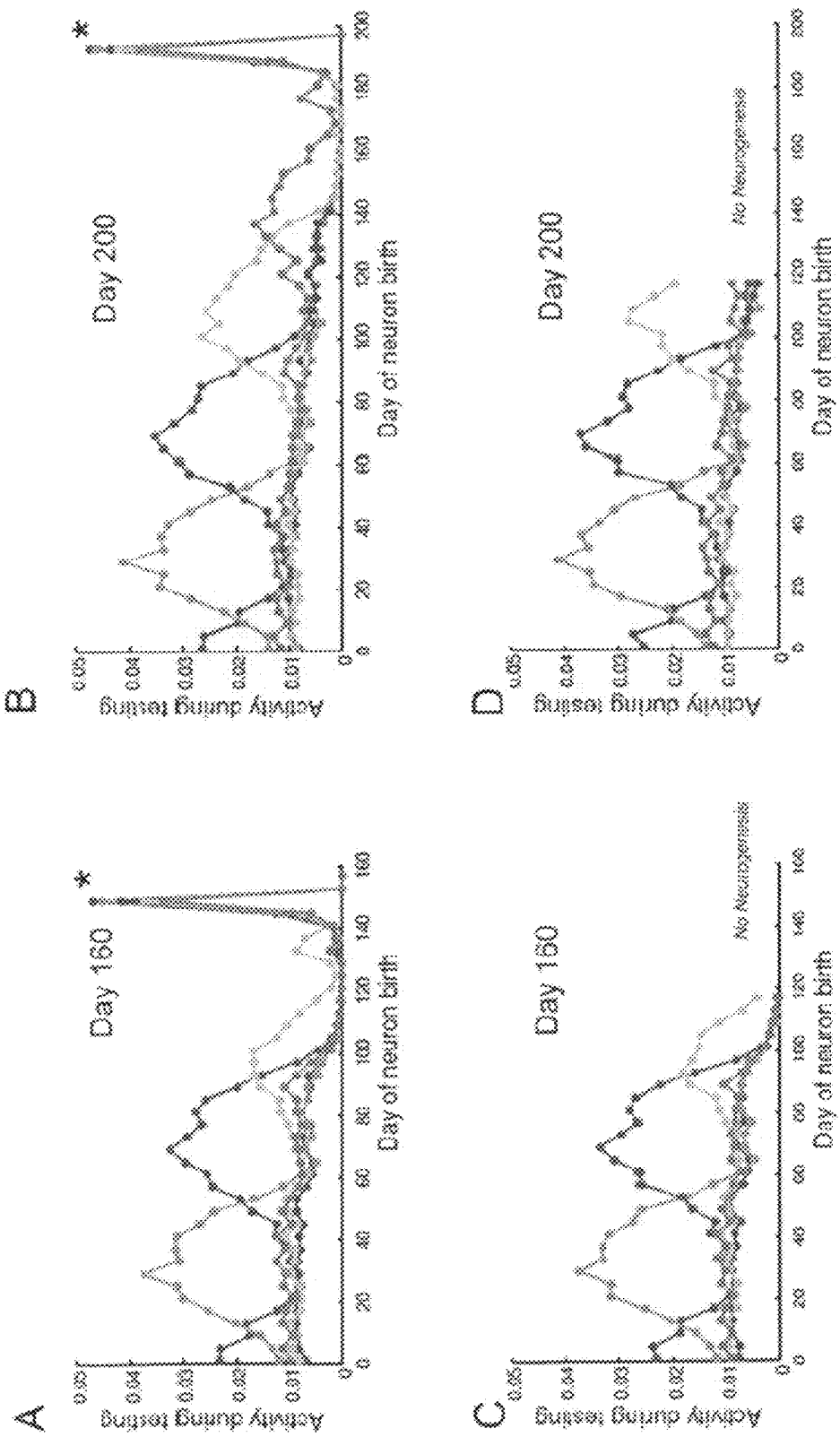
FIG. 11 is a panel illustrating the ages of neurons that respond to familiar and novel environments.

When considered by date of neuron birth, it is apparent that the GC that responded the most to an FE were those neurons that matured within that environment (FIGS. 11A-B). Neurons did not begin to acquire specificity to an environment until they were about 3 weeks old; when the environment changed, the existing population of immature neurons was the first to specialize, followed by the neurons being born. This population of immature neurons that has yet to specialize (labeled with an '*') responded to all environments, and it was this non-discriminating response that led to the pattern integration function observed only in the NG networks described earlier.

Figure 15:
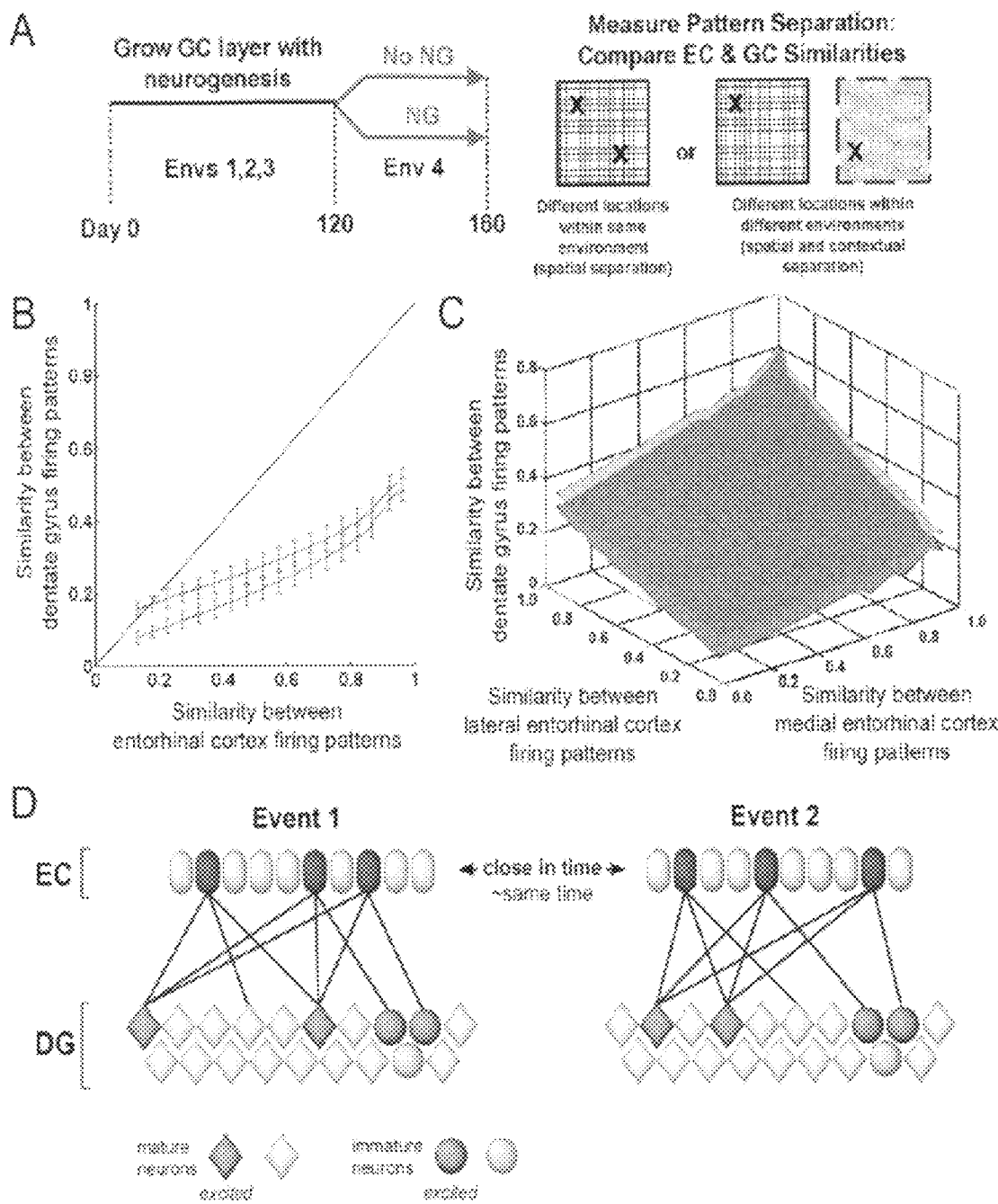
FIG. 15 is a panel showing pattern separation by dentate gyrus (DG) model.

We performed a similar analysis on networks where neurogenesis was halted after the third FE. While the No NG networks had specialized neurons that responded preferentially to the four FEs because new neurons continued to enter the network until day 120, the No NG networks did not have a group of neurons that responded preferentially to the NE on day 160 (FIG. 17C), and they failed to develop one even after extended exposure within that environment on day 200 (FIG. 17D). In addition, the No NG networks lacked the population of immature neurons observed in the NG networks (FIGS. 11C-D), explaining the lack of pattern integration by No NG networks (FIG. 15).

The development of these dedicated populations suggests that the continual growth of the DG is not simply the random addition of new dimensions, but rather a process by which young GC form dimensions specialized to environmental features experienced during maturation (FIG. 17E). Starting with the large population of GC maturing at birth, the DG appears to be growing into a structure designed to process information in the context of what the network has experienced in the past. In such a network, new events will be encoded using the dimensions defined by previous events. Importantly, because there may be aspects of new events that are fundamentally novel (thus cannot be accounted for by existing GC), neurogenesis allows the DG to adapt by adding new dimensions.

Aging and Stress Affect Adult Neurogenesis Function

One of the most pronounced features of adult neurogenesis is that it is heavily regulated by experience. We measured the role of neurogenesis modulation by approximating two conditions that decrease neurogenesis levels: aging, which results in a chronic decrease in the number of new neurons (Kuhn et al., 1996), and stress, which can induce a rapid decrease in neurogenesis rates (Gould et al., 1991). Both aging and stress are complex physiological states that affect many neural systems, and their interactions with other modulators of neurogenesis are likely complex. In this study, we have used simple decreases in neurogenesis rates to investigate what the general effects of changing neurogenesis rates are on memory formation.

Figure 13:
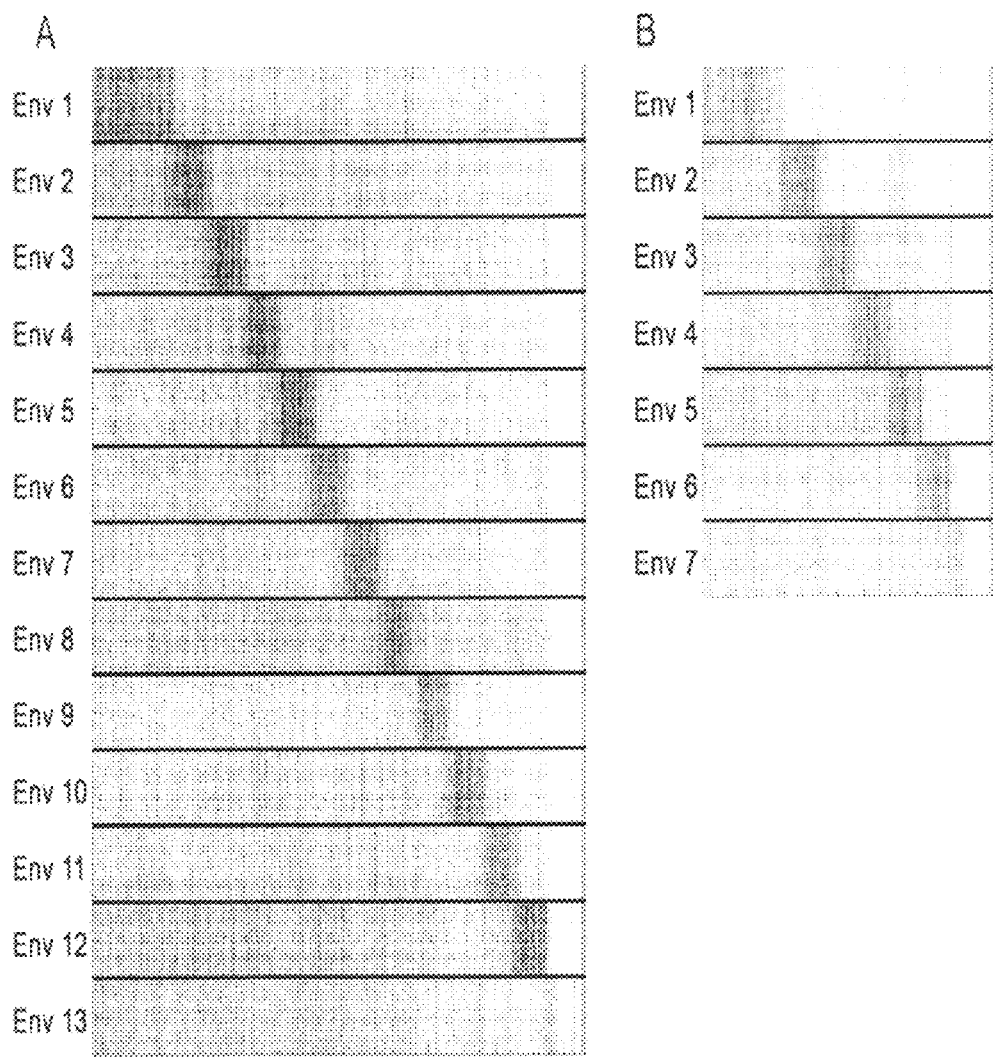
FIG. 13 is a panel showing the response of networks with full neurogenesis to familiar environments.

We simulated aging by gradually decreasing the rates at which new neurons are introduced to the model over time (FIG. 18A). Although the neurogenesis rates slowed, the network continued to grow in size throughout the experiment. We repeated the three studies described above at different points in the network's growth. Pattern integration is significantly lower in networks with decreasing neurogenesis than networks with a constant neurogenesis rate ($p<0.01$; FIG. 18B), though pattern separation is not as strong in aged networks with constant neurogenesis (FIG. 12). In contrast to young networks, the time between events did not affect pattern integration in networks with decreasing neurogenesis, suggesting that temporal associations in aged networks will be impaired (FIG. 18C). Temporal associations remained in networks that aged with full neurogenesis. Re-exposure of the aging networks to their FEs revealed that the groups of specialized GC are smaller in the FEs experienced later (FIG. 18D). This finding is in contrast to networks without decreasing neurogenesis rates, where the size of the specialized GC populations does not decrease substantially with aging (FIG. 13).

While aging is a chronic condition that results in a gradual decrease of proliferation, stress is one of several conditions that can result in a sharply decreased level of neurogenesis (Gould et al., 1991; Mirescu and Gould, 2006). We modeled stress by immediately decreasing the neurogenesis rate to 75% of its baseline amount, followed by a subsequent recovery 60 days later (FIG. 18E). While the rate changes were acute, the effects on DG function were gradual. The depletion of immature neurons shifted the DG pattern integration response (measured at 10% EC similarity) to pattern separation, and the response shifted back to pattern integration following recovery of neurogenesis (FIG. 18F). Importantly, both transitions took between 10 and 15 days to reach their steady state due to time required for new neuron maturation. Although the pattern integration was diminished in the stress condition, the dependence on time remained, albeit at a lower level (FIG. 18G). Similar to the aging results, re-exposure of the stress networks to their FEs revealed that the FEs experienced at the time of low neurogenesis have a diminished representation (FIG. 18H), though environments after recovery are represented well. This finding suggests that a transient lack of neurogenesis may affect the way memories are later encoded within environments associated with a stressful period, but that this effect can be reversed for future memories in subsequent environments.

Discussion

Adult-Born Neurons have Multiple Functions

Figure 19:
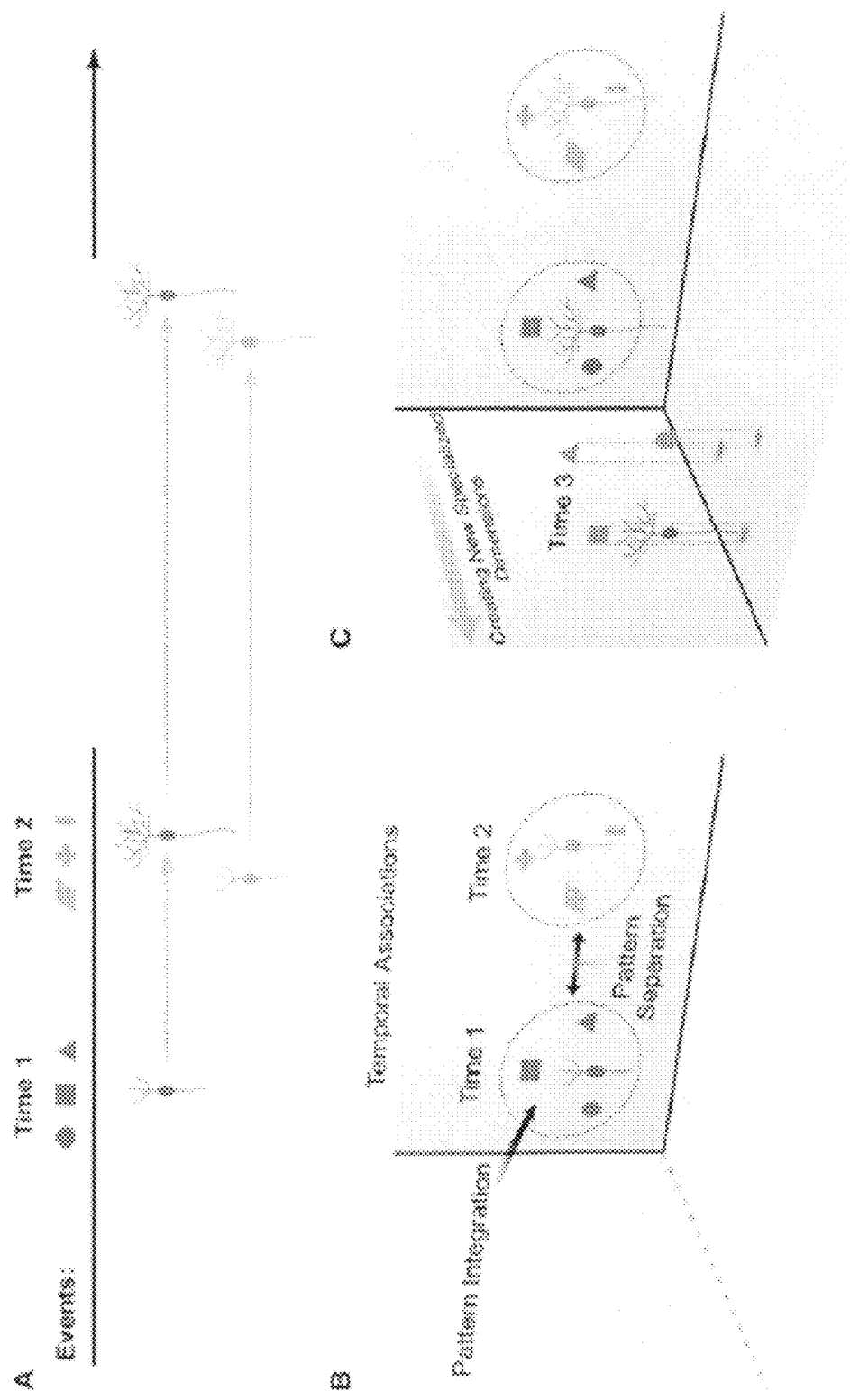
FIG. 19 is a schematic summarizing possible functions for adult-born neurons.

Our study suggests three possible functions for adult-born GC: 1) new GC provide a level of similarity to events that would otherwise be separated, a process we refer to as pattern integration; 2) this integration effect is temporally dependent, possibly leading to associations between contemporaneous events while increasing the separation of events further apart in time; and 3) the neurons involved in this integration effect mature into unique dimensions that may be used to improve the encoding of future memories. These functions are not independent; rather, they each emerge from the experience-dependent maturation process that new neurons undergo (FIG. 19). During maturation, new GC transition from progenitor cells to fully functional neurons. For the first few weeks of this process, the electrical properties of immature neurons are quite different from those of mature GC (Esposito et al., 2005). We observed that the population of immature neurons with increased excitability might actually decrease the separation function performed by the DG. Furthermore, because the maturation of immature GC is continuous, this pattern integration effect is dependent on the amount of time between two events, providing the mechanism for encoding the temporal relationship between events that we had proposed before (Aimone et al., 2006). Our data suggest that memories formed within a few days will utilize the same immature GC, allowing for associations between memories that occur at the same time.

Our earlier hypothesis did not address the role of the neurons that survive beyond this pattern integration stage. While a significant fraction of immature neurons dies before they are fully mature, a non-trivial proportion of them remains alive indefinitely (Kempermann et al., 2003; Kempermann et al., 1997; Tashiro et al., 2006). Our results show that the activity-dependent maturation of these surviving neurons results in the generation of specialized groups of GC that may improve the encoding of that environment in the future, consistent with biological studies using immediate-early genes that showed that neurons responded preferentially to events that occurred during their maturation (Kee et al., 2007; Tashiro et al., 2007). These populations of neurons represent new dimensions that the DG can use to encode new memories—dimensions that are "custom-built" for the information contained in those memories. Indeed, the same neurons that perform pattern integration between events when they are young ultimately comprise the new dimensions to better encode those events when they are older. While pattern integration is adding similarity to the encoding of current events, the new neurons are gaining specificity that will lead them to improve the encoding of future events.

Relationship of Current Hypotheses to Previous Theories of Hippocampal Function and Neurogenesis Function The idea that DG sparse coding leads to pattern separation has been developed over recent decades (Kesner et al., 2004; Leutgeb et al., 2007; McNaughton and Morris, 1987; O'Reilly and McClelland, 1994; Treves and Rolls, 1992). Our results support a pattern separation function of mature neurons in the DG, although the presence of neurogenesis in our model suggests that pattern separation is not as straightforward as previously considered. Instead, we propose that the separation effect of the DG is dependent on both the structure of inputs and when the inputs are presented. If two stimuli are very similar, the separation provided by the mature neurons outweighs the integration effect of immature neurons, but when inputs are already encoded separately, the pattern integration effect contributed by immature neurons is more evident. Pattern integration essentially acts as a lower bound to the pattern separation process for temporally proximal events, but for events occurring at different times, pattern separation dominates. Furthermore, while the hippocampus has long been considered critical for the encoding of temporal information, these studies have focused mostly on recurrent network dynamics in the CA3 and spike-timing dependent plasticity (Dan and Poo, 2004; Dragoi and Buzsaki, 2006). Both these effects operate at time scales considerably shorter (seconds and milliseconds) than the temporal associations proposed here (hours and days). These different temporal dynamics would not be redundant but rather complement one another in the addition of temporal context to new memories.

Several hippocampal studies have suggested that the DG's pattern separation function is only required during initial memory formation, with memory retrieval bypassing the DG via the direct EC-CA3 projection (Kesner et al., 2004; Treves and Rolls, 1992). Limiting the DG's involvement in this way would also confine the effects of neurogenesis to the encoding-phase of memory formation. This conclusion suggests that any temporal information contributed by immature neurons would be stored and ultimately recalled elsewhere in downstream hippocampal areas (CA subfields) or cortex. Accordingly, we have focused our study on the role of neurogenesis in the encoding of memories, though future work may reveal that the presence of neurogenesis affects the retrieval of memories.

Our approach to modeling adult neurogenesis differs considerably from that of previous models of adult neurogenesis (for review, see Aimone and Wiskott, 2008). These distinctions likely underlie the differences between our results and previous theoretical results. The model presented here has at least three major features that distinguish it from previous modeling studies: (1) the inclusion of details about the maturation process; (2) simulation over long time scales, allowing successive generations of new neurons to populate the DG; and (3) assaying DG function by measuring pattern separation while using biologically derived inputs. The extent of biological detail included in this model is in contrast to previous computational studies of neurogenesis that investigated the effect of either neuron addition or turnover on specific network functions in less complicated models. While those models have revealed several possible functions for the addition of new neurons in simple network architectures, we believe that the inclusion of biological details was important for our observation of several network behaviors heretofore not described.

In some cases, our results were similar to those of other models. For example, our results showing that FEs attain dimensional independence due to the maturation process are similar to the hypotheses put forth by two previous computational studies that suggested that new neurons protect old memories by increasing the capacity available for encoding new memories (Becker, 2005; Wiskott et al., 2006). However, these studies suggest that the acute effects of stopping neurogenesis would be substantial, potentially leading to the collapse of previously encoded memories, whereas our model predicts that the cessation of neurogenesis would result in a more subtle deficit: new environments would continue to be encoded using a combination of previous environments, but their transition to being familiar would be impaired.

Limitations of Our Computational Approach

While the complexity of this model was important for the generation of novel, behaviorally testable predictions, both the accuracy and completeness of the model are issues that remain to be addressed by both biological studies and future modeling work. Adult neurogenesis is a dynamic area of research and, as is the case with all computational models, future results may make it necessary to revisit certain assumptions made in the model. This caveat does not negate the validity of the results proposed here, but it underscores the importance of future biological investigation of these hypotheses, as described in the next section.

Our modeling and theoretical work has focused principally on the DG, and it is possible that neurogenesis has unknown implications on other hippocampal regions. For example, the relationship between GC and CA3 neurons is complex, as it appears that CA3 pyramidal neurons and interneurons respond differentially to bursting of GC (Henze et al., 2002; Lawrence and McBain, 2003). If new neurons do not fire in the same manner as mature cells, it is possible that the CA3 will not respond as predicted. Until the mossy fiber projection is fully investigated in vivo, the precise effect new neurons have on CA3 is not entirely clear, though recent work by our lab shows that they make functional connections (Toni et al., 2008).

In addition to mechanistic details, it is not yet clear how changing the pattern separation function in the DG will affect information processing in the rest of the hippocampus. While generally considered an associative network, the CA3 has been shown to also contribute to pattern separation, though this is believed to be fundamentally different from the separation function of the DG (Leutgeb et al., 2007). Neurogenesis would appear to be one source of this difference, as we are proposing that DG is separating inputs according to time as well as specific features of the events. In addition, further modeling work may reveal how neurogenesis affects the network dynamics of the DG. A more sophisticated understanding of the network dynamics associated with pattern separation in the DG network may clarify how this separation function affects the attractor dynamics in the CA3.

In addition to more complex analyses of the network dynamics, continued examination of the model's behavior considering other perspectives on hippocampal function will be revealing, particularly with regard to how neurogenesis affects the hippocampal representation of space and neurogenesis' relationship to depression. The DG is believed to be important in the formation of hippocampal place representations, and GC have distinct spatial behaviors, though how they affect hippocampal spatial processing is still unclear (Leutgeb et al., 2007). Similarly, the role of DG in affective conditions, such as depression, is unknown, though a strong relationship between neurogenesis and certain anti-depressant drugs suggests that adult-born neurons play a role in affective state (Sahay and Hen, 2007). The functional role of neurogenesis in encoding space and affect is unknown, and further work is required to relate the results of the model to these hippocampal functions.

Finally, as with other computational models, our study is limited by details of the system that have not yet been fully described. For instance, although the spatial properties of mEC neurons have been well characterized (Hafting et al., 2005), the structure of the lEC input to the DG remains unclear (Hargreaves et al., 2005). For instance, GC in our model have a spatial structure that is obviously influenced by the grid structure of the mEC neurons (FIG. 5C). While in vivo studies have shown spatial structure to GC responses, it has not been reported as significantly grid-like (Jung and McNaughton, 1993; Leutgeb et al., 2007). This difference in model behavior emerges from the grid cells being the only input population with a spatial structure. Furthermore, more examination is required to determine how immature neurons influence in vivo measurements of DG neurons during behaviors and exploration.

Comparison of Hypotheses to Biological Studies and Future Biological Predictions Because multiple assumptions were required in this model to arrive at the hypotheses presented here, testing the predictions of the model with biological studies is essential. While there have been many behavioral tests of neurogenesis knockdowns, the interpretation of these results has been difficult and the relevance to these specific hypotheses is unclear. Ultimately, since we are proposing that neurogenesis contributes to memory formation in manners not widely considered elsewhere, new behavioral tasks must be designed to directly test these new hypotheses.

Of the previous behavioral results using knockdown models of neurogenesis, perhaps the most relevant to our model is the observation that irradiated animals have improved performance on a working memory (Saxe et al., 2007). One prediction of the pattern integration hypothesis is that reducing neurogenesis might result in an increase of pattern separation during memory encoding. As a result, behaviors that benefit from greater separation may show an improvement after the elimination of new neurons. One interpretation of the working memory results is that normal mice have difficulty distinguishing between the current trial and recent trials, whereas irradiated mice have a better ability to segregate their current actions from those of the past. While pattern integration may make pattern separation more difficult, it may be necessary for other behaviors that require the animal to integrate information across several learning trials.

Explicit testing of these hypotheses will require the design of new behavioral tasks. While the design of new tasks is a considerable undertaking, we can anticipate the types of tasks that may be effective for studying each of these ideas. One possibility for testing the model is to simultaneously examine both pattern integration and temporal associations. The hypotheses suggest that events occurring close in time will be associated with one another, whereas events occurring several days apart will be encoded separately. An example behavioral paradigm using fear conditioning would be to present multiple contexts to an animal over time with one context coupled to an aversive stimulus (i.e., shock). The model would predict that animals would fear both the context where the shock occurred and those contexts that were proximal in time. One drawback to this specific example is that context fear conditioning is affected in neurogenesis knockdowns in certain conditions, so care must be taken to ensure the underlying fear memory is present.

The final hypothesis—that adult-born neurons mature to encode new dimensions—can also be examined behaviorally. One implication of developing specialized groups of GC may be an increased ability to acquire new memories that can utilize those new dimensions. Animals that live extensively within an enriched environment have an increased survival of new neurons that may specialize to features of that environment (Kempermann et al., 1997; Tashiro et al., 2007). Given the DG's presumed role in memory encoding, we would predict that that these animals may have a greater ability to learn within that environment than animals for which the environment is novel. One possible behavioral task would be to pre-expose an animal to several contexts over several weeks, which should induce populations of specialized GC. Later, the animal would be trained to fear one of these contexts, but not the others. We would anticipate that neurogenesis would improve the discrimination of the feared context from the other pre-exposed environments.

Relationship to Human Memory

While these behavioral studies may be effective at testing simple predictions that emerge from the model, the more complex aspects of the effect of neurogenesis on memory may prove too difficult to test in animal models. Examination of types of memory in humans predicted to be affected by neurogenesis may help reveal the role of new neurons in memory. Aging and stress are two conditions prevalent in the human population that have been correlated with low neurogenesis rates in rodent models. Our results indicate that the chronic and acute decreases in neurogenesis due to aging and stress, respectively, may affect memory formation significantly.

The discovery of functional imaging measures that correlate with human neurogenesis (Pereira et al., 2007) may permit the examination of the effect of neurogenesis on performance on psychological tasks that investigate the structure of human memories (Bakker et al., 2008; Schacter and Slotnick, 2004; Shohamy and Wagner, 2008). Although most hippocampal network theories assume the DG's role is limited to pattern separation, some more general ideas for the structure of human memories suggest a use for the added similarity that pattern integration provides. One example is the "constructive memory hypothesis," which postulates that memories are composed of distinct elements that are stored separately and reconstructed at the time of retrieval, as opposed to a pure reproduction of a past event (Schacter and Addis, 2007). If memories are indeed stored in a distributed form, there is probably a requirement for some additional information that binds the distributed pieces together. While the pattern completion circuitry in the hippocampus would be effective at forming and recapitulating associations between items that occur at the same time or in sequence (Rolls and Kesner, 2006), complex memories might require a different mechanism to bind distributed components together. Although the classical view of the DG is that it would separate context from this information, immature neurons may limit the amount of separation performed at the time of encoding. Memories encoded by the network would still be adequately separated to the extent that effective attractors could be formed, but the attractor states of these memories would remain related to one another. Additionally, such associations would only be meaningful if the added similarity was temporally constrained, as there would be little benefit if all memories were linked to one another.

We find that the acute drop in neurogenesis due to stress greatly eliminates the pattern integration provided during memory encoding. In the aforementioned constructive memory framework, we would anticipate that this lack of pattern integration may result in a decreased ability to combine distinct memory components into uniform memories and may be revealed by an improved performance on tasks designed to confuse information with contextual clues. The effect of aging on pattern integration is less dramatic in our model; however, the increased similarity occurring in older networks is not temporally dependent, suggesting that, while the ability to bind memories together remains with aging, this process loses its temporal precision.

In addition to a role for pattern integration, the possibility that novel environments are encoded using a combination of neurons previously used to encode familiar environments also fits nicely into the constructive memory framework. Consistent with the idea that memories are encoded in a distributed manner, we observed that the DG's representation of an FE included not only those neurons that matured within that environment but also neurons that showed a preference for other, previously experienced, environments (FIG. 17). One possibility is that those neurons that are used in multiple environments encode features that are invariant between the two contexts. Furthermore, in our study, NEs were initially encoded entirely by using "familiar" dimensions. Without having developed a set of neurons customized to the current inputs, it appears that the network approximated the entire context by utilizing other neurons that matured in previous environments. Such a process is similar to recent proposals about the process of imagination: that thinking about the future consists of constructing a new combination of old memories into a new package (Schacter and Addis, 2007). Our results suggest that recently experienced environments will not transition to being familiar after aging, as there are few new neurons to commit to those contexts. A failure of environments to transition to familiar may affect how memories are formed in aged or chronically stressed individuals; even environments that should be familiar may be considered novel if there is little neurogenesis available when previously experienced.

CONCLUSION

In conclusion, the results of our study suggest that neurogenesis may be acting on several different aspects of memory formation. The computational effects of immature neurons integrating into the network in this model were consistent with the hypothesis we outlined earlier regarding the inclusion of temporal context in new memories. In addition, we propose a new hypothesis that fully mature, adult-born neurons are important for the system's response to new environments to progress from novel to familiar. These hypotheses emerge from the features of the neurogenesis process as the anatomy and function is currently understood. While these hypotheses will be modified as more is learned about this system, they provide a new direction for future behavioral studies in both animal and human models seeking the function of adult neurogenesis.

REFERENCES

The following publications, referred to in this application, are incorporated by reference herein.

Aimone, J. B., Wiles, J., and Gage, F. H. (2006). Potential role for adult neurogenesis in the encoding of time in new memories. Nature Neuroscience 9, 723-727.

Aimone, J. B., and Wiskott, L. (2008). Computational Modeling of Adult Neurogenesis. In Adult Neurogenesis, F. H. Gage, G. Kempermann, and H. Song, eds. (Woodbury, N.Y., Cold Spring Harbor Laboratory Press), pp. 463-481.

Altman, J., and Das, G. D. (1965). Autoradiographic and histological evidence of postnatal hippocampal neurogenesis in rats. J Comp Neurol 124, 319-335.

Amaral, D. G., Scharfman, H. E., and Lavenex, P. (2007). The dentate gyrus: fundamental neuroanatomical organization (dentate gyrus for dummies). Prog Brain Res 163, 3-22.

Bakker, A., Kirwan, C. B., Miller, M., and Stark, C. E. (2008). Pattern separation in the human hippocampal CA3 and dentate gyms. Science 319, 1640-1642.

Becker, S. (2005). A computational principle for hippocampal learning and neurogenesis. Hippocampus 15, 722-738.

Cameron, H. A., and McKay, R. D. (2001). Adult neurogenesis produces a large pool of new granule cells in the dentate gyrus. J Comp Neurol 435, 406-417.

Chambers, R. A., Potenza, M. N., Hoffman, R. E., and Miranker, W. (2004). Simulated apoptosis/neurogenesis regulates learning and memory capabilities of adaptive neural networks. Neuropsychopharmacology 29, 747-758.

Dan, Y., and Poo, M. M. (2004). Spike timing-dependent plasticity of neural circuits. Neuron 44, 23-30.

Deisseroth, K., Singla, S., Toda, H., Monje, M., Palmer, T. D., and Malenka, R. C. (2004). Excitation-neurogenesis coupling in adult neural stem/progenitor cells. Neuron 42, 535-552.

Dragoi, G., and Buzsaki, G. (2006). Temporal encoding of place sequences by hippocampal cell assemblies. Neuron 50, 145-157.

Dupret, D., Revest, J. M., Koehl, M., Ichas, F., De Giorgi, F., Costet, P., Abrous, D. N., and Piazza, P. V. (2008). Spatial relational memory requires hippocampal adult neurogenesis. PLoS ONE 3, e1959.

Eriksson, P. S., Perfilieva, E., Bjork-Eriksson, T., Alborn, A. M., Nordborg, C., Peterson, D. A., and Gage, F. H. (1998). Neurogenesis in the adult human hippocampus. Nat Med 4, 1313-1317.

Esposito, M. S., Piatti, V. C., Laplagne, D. A., Morgenstern, N. A., Ferrari, C. C., Pitossi, F. J., and Schinder, A. F. (2005). Neuronal Differentiation in the Adult Hippocampus Recapitulates Embryonic Development. Journal of Neuroscience 25, 10074-10086.

Freund, T. F., and Buzsaki, G. (1996). Interneurons of the hippocampus. Hippocampus 6, 347-470.

Ge, S., Goh, E. L., Sailor, K. A., Kitabatake, Y., Ming, G. L., and Song, H. (2006). GABA regulates synaptic integration of newly generated neurons in the adult brain. Nature 439, 589-593.

Ge, S., Yang, C. H., Hsu, K. S., Ming, G. L., and Song, H. (2007). A critical period for enhanced synaptic plasticity in newly generated neurons of the adult brain. Neuron 54, 559-566.

Gould, E., Beylin, A., Tanapat, P., Reeves, A., and Shors, T. J. (1999). Learning enhances adult neurogenesis in the hippocampal formation. Nat Neurosci 2, 260-265.

Gould, E., Woolley, C. S., and McEwen, B. S. (1991). Adrenal steroids regulate postnatal development of the rat dentate gyrus: I. Effects of glucocorticoids on cell death. J Comp Neurol 313, 479-485.

Hafting, T., Fyhn, M., Molden, S., Moser, M. B., and Moser, E. I. (2005). Microstructure of a spatial map in the entorhinal cortex. Nature 436, 801-806.

Hargreaves, E. L., Rao, G., Lee, I., and Knierim, J. J. (2005). Major dissociation between medial and lateral entorhinal input to dorsal hippocampus. Science 308, 1792-1794.

Henze, D. A., Wittner, L., and Buzsaki, G. (2002). Single granule cells reliably discharge targets in the hippocampal CA3 network in vivo. Nat Neurosci 5, 790-795.

Jung, M. W., and McNaughton, B. L. (1993). Spatial selectivity of unit activity in the hippocampal granular layer. Hippocampus 3, 165-182.

Kee, N., Teixeira, C. M., Wang, A. H., and Frankland, P. W. (2007). Preferential incorporation of adult-generated granule cells into spatial memory networks in the dentate gyrus. Nat Neurosci 10, 355-362.

Kempermann, G., Gast, D., Kronenberg, G., Yamaguchi, M., and Gage, F. H. (2003). Early determination and long-term persistence of adult-generated new neurons in the hippocampus of mice. Development 130, 391-399.

Kempermann, G., Kuhn, H. G., and Gage, F. H. (1997). More hippocampal neurons in adult mice living in an enriched environment. Nature 386, 493-495.

Kesner, R. P., Lee, I., and Gilbert, P. (2004). A behavioral assessment of hippocampal function based on a subregional analysis. Rev Neurosci 15, 333-351.

Kuhn, H. G., Dickinson-Anson, H., and Gage, F. H. (1996). Neurogenesis in the dentate gyrus of the adult rat: age-related decrease of neuronal progenitor proliferation. J Neurosci 16, 2027-2033.

Lawrence, J. J., and McBain, C. J. (2003). Interneuron diversity series: containing the detonation—feedforward inhibition in the CA3 hippocampus. Trends Neurosci 26, 631-640.

Leuner, B., Gould, E., and Shors, T. J. (2006). Is there a link between adult neurogenesis and learning? Hippocampus 16, 216-224.

Leutgeb, J. K., Leutgeb, S., Moser, M. B., and Moser, E. I. (2007). Pattern separation in the dentate gyrus and CA3 of the hippocampus. Science 315, 961-966.

Lin, Y. W., Yang, H. W., Wang, H. J., Gong, C. L., Chiu, T. H., and Min, M. Y. (2006). Spike-timing-dependent plasticity at resting and conditioned lateral perforant path synapses on granule cells in the dentate gyrus: different roles of N-methyl-D-aspartate and group I metabotropic glutamate receptors. Eur J Neurosci 23, 2362-2374.

McHugh, T. J., Jones, M. W., Quinn, J. J., Balthasar, N., Coppari, R., Elmquist, J. K., Lowell, B. B., Fanselow, M. S., Wilson, M. A., and Tonegawa, S. (2007). Dentate gyrus NMDA receptors mediate rapid pattern separation in the hippocampal network. Science 317, 94-99.

McNaughton, B. L., and Morris, R. G. (1987). Hippocampal synaptic enhancement and information storage within a distributed memory system. Trends in Neurosciences 10, 408-415.

Mirescu, C., and Gould, E. (2006). Stress and adult neurogenesis. Hippocampus 16, 233-238.

Nakashiba, T., Young, J. Z., McHugh, T. J., Buhl, D. L., and Tonegawa, S. (2008). Transgenic Inhibition of Synaptic Transmission Reveals Role of CA3 Output in Hippocampal Learning. Science 319, 1260-1264.

O'Reilly, R. C., and McClelland, J. L. (1994). Hippocampal conjunctive encoding, storage, and recall: avoiding a trade-off. Hippocampus 4, 661-682.

Patton, P. E., and McNaughton, B. (1995). Connection matrix of the hippocampal formation: I. The dentate gyrus. Hippocampus 5, 245-286.

Pereira, A. C., Huddleston, D. E., Brickman, A. M., Sosunov, A. A., Hen, R., McKhann, G. M., Sloan, R., Gage, F. H., Brown, T. R., and Small, S. A. (2007). An in vivo correlate of exercise-induced neurogenesis in the adult dentate gyrus. Proc Natl Acad Sci USA 104, 5638-5643.

Rolls, E. T., and Kesner, R. P. (2006). A computational theory of hippocampal function, and empirical tests of the theory. Prog Neurobiol 79, 1-48.

Sahay, A., and Hen, R. (2007). Adult hippocampal neurogenesis in depression. Nat Neurosci 10, 1110-1115.

Saxe, M. D., Battaglia, F., Wang, J. W., Malleret, G., David, D. J., Monckton, J. E., Garcia, A. D., Sofroniew, M. V., Kandel, E. R., Santarelli, L., et al. (2006). Ablation of hippocampal neurogenesis impairs contextual fear conditioning and synaptic plasticity in the dentate gyrus. Proc Natl Acad Sci USA 103, 17501-17506.

Saxe, M. D., Malleret, G., Vronskaya, S., Mendez, I., Garcia, A. D., Sofroniew, M. V., Kandel, E. R., and Hen, R. (2007). Paradoxical influence of hippocampal neurogenesis on working memory. Proc Natl Acad Sci USA 104, 4642-4646.

Schacter, D. L., and Addis, D. R. (2007). The cognitive neuroscience of constructive memory: remembering the past and imagining the future. Philos Trans R Soc Lond B Biol Sci 362, 773-786.

Schacter, D. L., and Slotnick, S. D. (2004). The cognitive neuroscience of memory distortion. Neuron 44, 149-160.

Schmidt-Hieber, C., Jonas, P., and Bischofberger, J. (2004). Enhanced synaptic plasticity in newly generated granule cells of the adult hippocampus. Nature 429, 184-187.

Shohamy, D., and Wagner, A. D. (2008). Integrating memories in the human brain: hippocampal-midbrain encoding of overlapping events. Neuron 60, 378-389.

Shors, T. J., Townsend, D. A., Zhao, M., Kozorovitskiy, Y., and Gould, E. (2002). Neurogenesis may relate to some but not all types of hippocampal-dependent learning. Hippocampus 12, 578-584.

Snyder, J. S., Hong, N. S., McDonald, R. J., and Wojtowicz, J. M. (2005). A role for adult neurogenesis in spatial long-term memory. Neuroscience 130, 843-852.

Solstad, T., Moser, E. I., and Einevoll, G. T. (2006). From grid cells to place cells: a mathematical model. Hippocampus 16, 1026-1031.

Tashiro, A., Makino, H., and Gage, F. H. (2007). Experience-specific functional modification of the dentate gyrus through adult neurogenesis: a critical period during an immature stage. J Neurosci 27, 3252-3259.

Tashiro, A., Sandler, V. M., Toni, N., Zhao, C., and Gage, F. H. (2006). NMDA-receptor-mediated, cell-specific integration of new neurons in adult dentate gyrus. Nature 442, 929-933.

Toni, N., Laplagne, D. A., Zhao, C., Lombardi, G., Ribak, C. E., Gage, F. H., and Schinder, A. F. (2008). Neurons born in the adult dentate gyms form functional synapses with target cells. Nat Neurosci.

Toni, N., Teng, E. M., Bushong, E. A., Aimone, J. B., Zhao, C., Consiglio, A., van Praag, H., Martone, M. E., Ellisman, M. H., and Gage, F. H. (2007). Synapse formation on neurons born in the adult hippocampus. Nat Neurosci 10, 727-734.

Treves, A., and Rolls, E. T. (1992). Computational constraints suggest the need for two distinct input systems to the hippocampal CA3 network. Hippocampus 2, 189-199.

van Praag, H., Kempermann, G., and Gage, F. H. (1999). Running increases cell proliferation and neurogenesis in the adult mouse dentate gyrus. Nat Neurosci 2, 266-270.

van Praag, H., Schinder, A. F., Christie, B. R., Toni, N., Palmer, T. D., and Gage, F. H. (2002). Functional neurogenesis in the adult hippocampus. Nature 415, 1030-1034.

Wiskott, L., Rasch, M. J., and Kempermann, G. (2006). A functional hypothesis for adult hippocampal neurogenesis: avoidance of catastrophic interference in the dentate gyrus. Hippocampus 16, 329-343.

Zhang, C. L., Zou, Y., He, W., Gage, F. H., and Evans, R. M. (2008). A Role for Adult TLX-positive Neural Stem Cells in Learning and Behaviour. Nature 451, 1004-1007.

Zhao, C., Teng, E. M., Summers, R. G., Jr., Ming, G. L., and Gage, F. H. (2006). Distinct morphological stages of dentate granule neuron maturation in the adult mouse hippocampus. J Neurosci 26, 3-11.

Ambrogini P, Lattanzi D, Ciuffoli S, Agostini D, Bertini L, Stocchi V, Santi S, Cuppini R (2004) Morpho-functional characterization of neuronal cells at different stages of maturation in granule cell layer of adult rat dentate gyrus. Brain Res 1017:21-31.

Anderson P, Morris R, Amaral D G, Bliss T, J. O K, eds (2007) The Hippocampus Book. New York: Oxford University Press.

Esposito M S, Piatti V C, Laplagne D A, Morgenstern N A, Ferrari C C, Pitossi F J, Schinder A F (2005) Neuronal Differentiation in the Adult Hippocampus Recapitulates Embryonic Development. Journal of Neuroscience 25:10074-10086.

Freund T F, Buzsaki G (1996) Interneurons of the hippocampus. Hippocampus 6:347-470.

Ge S, Yang C H, Hsu K S, Ming G L, Song H (2007) A critical period for enhanced synaptic plasticity in newly generated neurons of the adult brain. Neuron 54:559-566.

Ge S, Goh E L, Sailor K A, Kitabatake Y, Ming G L, Song H (2006) GABA regulates synaptic integration of newly generated neurons in the adult brain. Nature 439:589-593.

Jinno S, Ishizuka S, Kosaka T (2003) Ionic currents underlying rhythmic bursting of ventral mossy cells in the developing mouse dentate gyrus. Eur J Neurosci 17:1338-1354.

Jung M W, McNaughton B L (1993) Spatial selectivity of unit activity in the hippocampal granular layer. Hippocampus 3:165-182.

Leutgeb J K, Leutgeb S, Moser M B, Moser E I (2007) Pattern separation in the dentate gyrus and C A3 of the hippocampus. Science 315:961-966.

Lin Y W, Yang H W, Wang H J, Gong C L, Chiu T H, Min M Y (2006) Spike-timing-dependent plasticity at resting and conditioned lateral perforant path synapses on granule cells in the dentate gyrus: different roles of N-methyl-D-aspartate and group I metabotropic glutamate receptors. Eur J Neurosci 23:2362-2374.

Lubke J, Frotscher M, Spruston N (1998) Specialized electrophysiological properties of anatomically identified neurons in the hilar region of the rat fascia dentata. J Neurophysiol 79:1518-1534.

Overstreet-Wadiche L S, Westbrook G L (2006) Functional maturation of adult-generated granule cells. Hippocampus 16:208-215.

Patton P E, McNaughton B (1995) Connection matrix of the hippocampal formation: I. The dentate gyms. Hippocampus 5:245-286.

Santhakumar V, Aradi I, Soltesz I (2005) Role of mossy fiber sprouting and mossy cell loss in hyperexcitability: a network model of the dentate gyms incorporating cell types and axonal topography. J Neurophysiol 93:437-453.

Schmidt-Hieber C, Jonas P, Bischofberger J (2004) Enhanced synaptic plasticity in newly generated granule cells of the adult hippocampus. Nature 429:184-187.

Solstad T, Moser E I, Einevoll G T (2006) From grid cells to place cells: a mathematical model. Hippocampus 16:1026-1031.

Soltesz I, Smetters D K, Mody I (1995) Tonic inhibition originates from synapses close to the soma. Neuron 14:1273-1283.

van Praag H, Schinder A F, Christie B R, Toni N, Palmer T D, Gage F H (2002) Functional neurogenesis in the adult hippocampus. Nature 415:1030-1034.

Zhao C, Teng E M, Summers R G, Jr., Ming G L, Gage F H (2006) Distinct morphological stages of dentate granule neuron maturation in the adult mouse hippocampus. J Neurosci 26:3-11.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A method of profiling a user-defined event, comprising:
providing a trained artificial neural network that produces new trainable nodes by creating a first subset of new trainable nodes based on data representative of a first event, the first event occurring at a first time instant, and by creating a second subset of new trainable nodes based on data representative of a second event, the second event occurring at a second time instant different from the first time instant, such that input data representative of the first event and input data representative of the second event both activate a same set of the new trainable nodes if the first event and the second event are within a threshold time of each other;
generating from the artificial neural network an output that is influenced by the input data of both events; and
profiling a user-defined event based on the output of the artificial neural network.

2. The method of claim 1, wherein the input data representative of the first event and the input data representative of the second event are each representative of a person or a physical object.

3. The method of claim 1, wherein the user-defined event relates to information processing, or to an activity having observable dynamics over long time scales.

4. The method of claim 3, wherein the user-defined event relates to: a) demand for or usage of area codes, zip codes, telephones, cell phones, internet services, power infrastructure, or traffic patterns and flow; b) dynamics of financial systems, stock markets, commodities markets, or options markets; c) profiling systems for use in homeland security, advertising, or medical records applications; d) data compression or encryption; e) sports forecasting; f) weather forecasting; g) genomic analysis; h) brain networks or brain network modeling; i) robotics; or j) military applications.

5. The method of claim 1, wherein the trainable nodes are continually produced.

6. The method of claim 1, wherein the trainable nodes are trainable for a predetermined time period.

7. The method of claim 1, wherein, after being produced, the new trainable nodes show decreasing trainability over time.

8. The method of claim 7, wherein the new trainable nodes are sequentially produced such that, at a particular point in time, newer produced nodes are more trainable than earlier produced nodes.

9. A computer system for profiling an event, comprising:
  system memory;
  a trained artificial neural network stored on the system memory and configured to produce new trainable nodes by creating a first subset of new trainable nodes based on data representative of a first event, the first event occurring at a first time instant, and by creating a second subset of new trainable nodes based on data representative of a second event, the second event occurring at a second time instant different from the first time instant, such that input data representative of the first event and input data representative of the second event both activate a same set of the new trainable nodes if the first event and the second event are within a threshold time of each other, and wherein an output of the artificial neural network is influenced by the input data of both events; and
  one or more processors configured to implement the trained artificial neural network;
  wherein the computer system profiles a user-defined event based on outputs of the artificial neural network.

10. The computer system of claim 9, wherein the user-defined event relates to information processing, or to an activity having observable dynamics over long time scales.

11. The computer system of claim 10, wherein the user-defined event relates to: a) demand for or usage of area codes, zip codes, telephones, cell phones, internet services, power infrastructure, or traffic patterns and flow; b) dynamics of financial systems, stock markets, commodities markets, or options markets; c) profiling systems for use in homeland security, advertising, or medical records applications; d) data compression or encryption; e) sports forecasting; f) weather forecasting; g) genomic analysis; h) brain networks or brain network modeling; i) robotics; or j) military applications.

12. The computer system of claim 9, wherein the trainable nodes are continually produced.

13. The computer system of claim 9, wherein the trainable nodes are trainable for a predetermined time period.

14. The computer system of claim 9, wherein, after being produced, the new trainable nodes show decreasing trainability over time.

15. The computer system of claim 14, wherein the new trainable nodes are sequentially produced such that, at a particular point in time, newer produced nodes are more trainable than earlier produced nodes.

16. A non-transitory computer-readable storage medium with computer executable instructions stored thereon, the instructions for performing a method of profiling a user-defined event, the method comprising:
  providing a trained artificial neural network that produces new trainable nodes by creating a first subset of new trainable nodes based on data representative of a first event, the first event occurring at a first time instant, and by creating a second subset of new trainable nodes based on data representative of a second event, the second event occurring at a second time instant different from the first time instant, such that input data representative of the first event and input data representative of the second event both activate a same set of the new trainable nodes if the first event and the second event are within a threshold time of each other;
  generating from the artificial neural network an output that is influenced by the input data of both events; and
  profiling a user-defined event based on the output of the artificial neural network.

17. The computer-readable storage medium of claim 16, wherein the user-defined event relates to information processing, or to an activity having observable dynamics over long time scales.

18. The computer-readable storage medium of claim 17, wherein the user-defined event relates to: a) demand for or usage of area codes, zip codes, telephones, cell phones, internet services, power infrastructure, or traffic patterns and flow; b) dynamics of financial systems, stock markets, commodities markets, or options markets; c) profiling systems for use in homeland security, advertising, or medical records applications; d) data compression or encryption; e) sports forecasting; f) weather forecasting; g) genomic analysis; h) brain networks or brain network modeling; i) robotics; or j) military applications.

19. The computer-readable storage medium of claim 16, wherein the trainable nodes are continually produced.

20. The computer-readable storage medium of claim 16, wherein the trainable nodes are trainable for a predetermined time period.

21. The computer-readable storage medium of claim 16, wherein, after being produced, the new trainable nodes show decreasing trainability over time.

22. The computer-readable storage medium of claim 21, wherein the new trainable nodes are sequentially produced such that, at a particular point in time, newer produced nodes are more trainable than earlier produced nodes.

* * * * *